(12) United States Patent
Kimrey, Jr. et al.

(10) Patent No.: US 9,282,594 B2
(45) Date of Patent: Mar. 8, 2016

(54) WOOD HEATER WITH ENHANCED MICROWAVE LAUNCHING SYSTEM

(75) Inventors: Harold Dail Kimrey, Jr., Knoxville, TN (US); David Carl Attride, Jonesborough, TN (US); Brad William Overturf, Kingsport, TN (US); Mark Robert Shelton, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 650 days.

(21) Appl. No.: 13/323,140

(22) Filed: Dec. 12, 2011

(65) Prior Publication Data

US 2012/0160836 A1    Jun. 28, 2012

Related U.S. Application Data

(60) Provisional application No. 61/427,030, filed on Dec. 23, 2010, provisional application No. 61/427,042, filed on Dec. 23, 2010, provisional application No. 61/427,053, filed on Dec. 23, 2010, provisional (Continued)

(51) Int. Cl.
*H05B 6/70* (2006.01)
*H05B 6/80* (2006.01)
*C08H 8/00* (2010.01)

(Continued)

(52) U.S. Cl.
CPC .. *H05B 6/80* (2013.01); *C08H 8/00* (2013.01); *F26B 3/347* (2013.01); *H05B 6/707* (2013.01); *H05B 6/763* (2013.01); *F26B 2210/16* (2013.01); *H05B 2206/046* (2013.01)

(58) Field of Classification Search
CPC .......... H05B 6/707; H05B 6/705; H05B 6/80; H05B 6/6402
USPC ......... 219/678, 690, 702, 725, 729, 730, 736, 219/738, 692, 697, 698; 34/79, 259, 245, 34/264, 265
See application file for complete search history.

(56) References Cited

U.S. PATENT DOCUMENTS

| 2,417,995 A | 3/1947 | Stamm et al. |
| 2,820,127 A | 1/1958 | Argento et al. |
| 2,909,635 A | 10/1959 | Haagensen |

(Continued)

FOREIGN PATENT DOCUMENTS

| CN | 201357467 Y | 12/2009 |
| DE | 4008770 A1 | 9/1991 |

(Continued)

OTHER PUBLICATIONS

Abbey Woods, "A Giant Step Forwood in Timber Cladding and Joinery"; (no date), retrieved at http://garenberg.co.uk/downloads/Accoya.pdf.

(Continued)

*Primary Examiner* — David Angwin
*Assistant Examiner* — Lawrence Samuels
(74) *Attorney, Agent, or Firm* — Hovey Williams LLP

(57) ABSTRACT

A microwave heater capable of heating a bundle of wood and equipped with an optimized system for launching and/or dispersing microwave energy. The microwave launching system can include one or more split microwave launchers at least partly disposed in the interior of the heater. The microwave dispersing system can include one or more moving reflectors for rastering microwave energy emitted from the split launchers.

13 Claims, 25 Drawing Sheets

Related U.S. Application Data application No. 61/427,056, filed on Dec. 23, 2010, provisional application No. 61/427,064, filed on Dec. 23, 2010, provisional application No. 61/427,067, filed on Dec. 23, 2010, provisional application No. 61/427,070, filed on Dec. 23, 2010, provisional application No. 61/427,072, filed on Dec. 23, 2010, provisional application No. 61/427,075, filed on Dec. 23, 2010, provisional application No. 61/427,076, filed on Dec. 23, 2010, provisional application No. 61/427,079, filed on Dec. 23, 2010, provisional application No. 61/427,080, filed on Dec. 23, 2010.

(51) Int. Cl.
*F26B 3/347* (2006.01)
*H05B 6/76* (2006.01)

(56) References Cited

U.S. PATENT DOCUMENTS

| | | | | |
|---|---|---|---|---|
| 3,094,431 | A | 6/1963 | Goldstein et al. | |
| 3,263,052 | A | 7/1966 | Jeppson et al. | |
| 3,446,929 | A | 5/1969 | Smith | |
| 3,461,261 | A | 8/1969 | Lewis et al. | |
| 3,597,566 | A | 8/1971 | Johnson et al. | |
| 3,597,567 | A | 8/1971 | Johnson | |
| 3,619,536 | A | 11/1971 | Boehm | |
| 3,622,733 | A * | 11/1971 | Smith et al. | 219/692 |
| 3,632,945 | A * | 1/1972 | Johnson | 219/692 |
| 3,673,370 | A | 6/1972 | Johnson | |
| 3,721,013 | A | 3/1973 | Miller | |
| 3,739,130 | A * | 6/1973 | White | 219/696 |
| 3,745,291 | A | 7/1973 | Peterson et al. | |
| 3,775,860 | A | 12/1973 | Barnes et al. | |
| 3,810,248 | A | 5/1974 | Risman et al. | |
| 3,848,106 | A | 11/1974 | Berggren et al. | |
| 3,916,137 | A | 10/1975 | Jurgensen | |
| 3,986,268 | A | 10/1976 | Koppelman | |
| 3,993,886 | A * | 11/1976 | Imberg | H01P 5/04 219/746 |
| 4,027,133 | A | 5/1977 | Dygve et al. | |
| 4,033,048 | A | 7/1977 | Van Ike | |
| 4,045,639 | A | 8/1977 | Meisel | |
| 4,153,328 | A * | 5/1979 | Wang | 385/28 |
| 4,179,595 | A | 12/1979 | Chiron | |
| 4,189,629 | A | 2/1980 | Krage | |
| 4,258,240 | A | 3/1981 | Pless | |
| 4,276,462 | A | 6/1981 | Risman | |
| 4,336,434 | A | 6/1982 | Miller | |
| 4,427,867 | A | 1/1984 | Dills | |
| 4,485,564 | A * | 12/1984 | Iverlund | F26B 21/086 34/265 |
| 4,488,361 | A | 12/1984 | Lööf | |
| 4,626,640 | A | 12/1986 | van der Heijden | |
| 4,629,849 | A | 12/1986 | Mizutani et al. | |
| 4,631,380 | A | 12/1986 | Tran | |
| 4,640,020 | A | 2/1987 | Wear et al. | |
| 4,690,156 | A * | 9/1987 | Kikuchi et al. | 607/154 |
| 4,714,812 | A | 12/1987 | Haagensen et al. | |
| 4,728,910 | A | 3/1988 | Owens | |
| 4,771,153 | A | 9/1988 | Fukushima et al. | |
| 4,771,156 | A | 9/1988 | Strattan et al. | |
| 4,777,336 | A | 10/1988 | Asmussen | |
| 4,795,871 | A | 1/1989 | Strattan et al. | |
| 4,804,384 | A | 2/1989 | Rowell et al. | |
| 4,851,788 | A | 7/1989 | Ives et al. | |
| 4,861,956 | A | 8/1989 | Courneya | |
| 4,882,851 | A | 11/1989 | Wennerstrum et al. | |
| 4,999,591 | A * | 3/1991 | Koslover et al. | 333/21 R |
| 5,003,152 | A | 3/1991 | Matsuo et al. | |
| 5,072,692 | A | 12/1991 | Ikeda | |
| 5,075,131 | A | 12/1991 | Hattori et al. | |
| 5,103,575 | A | 4/1992 | Yokoo et al. | |
| 5,107,602 | A | 4/1992 | Lööf | |
| 5,111,111 | A | 5/1992 | Stevens et al. | |
| 5,142,114 | A | 8/1992 | Briggs et al. | |
| 5,195,251 | A | 3/1993 | Gyurcsek et al. | |
| 5,228,947 | A | 7/1993 | Churchland | |
| 5,245,154 | A | 9/1993 | Sato et al. | |
| 5,272,299 | A | 12/1993 | Ovadia | |
| 5,280,216 | A * | 1/1994 | Mourier | 315/5 |
| 5,302,803 | A * | 4/1994 | Stevens et al. | 219/121.43 |
| 5,324,485 | A | 6/1994 | White | |
| 5,399,999 | A | 3/1995 | Eisenhart | |
| 5,488,681 | A * | 1/1996 | Deacon et al. | 385/37 |
| 5,532,462 | A | 7/1996 | Butwell et al. | |
| 5,541,612 | A | 7/1996 | Josefsson | |
| 5,555,642 | A | 9/1996 | Rem et al. | |
| 5,558,800 | A | 9/1996 | Page | |
| 5,608,051 | A | 3/1997 | Nelson et al. | |
| 5,630,004 | A | 5/1997 | Deacon et al. | |
| 5,632,921 | A | 5/1997 | Risman et al. | |
| 5,703,710 | A * | 12/1997 | Brinkman et al. | 359/283 |
| 5,714,920 | A | 2/1998 | Ivanov et al. | |
| 5,750,969 | A | 5/1998 | Lee | |
| 5,756,975 | A | 5/1998 | Harris et al. | |
| 5,777,101 | A | 7/1998 | Nelson et al. | |
| 5,834,744 | A | 11/1998 | Risman | |
| 5,834,746 | A | 11/1998 | Pedersen et al. | |
| 5,843,236 | A | 12/1998 | Yoshiki et al. | |
| 5,852,688 | A * | 12/1998 | Brinkman et al. | 385/16 |
| 5,859,412 | A | 1/1999 | Yagi | |
| 5,864,123 | A | 1/1999 | Keefer | |
| 5,869,817 | A | 2/1999 | Zietlow et al. | |
| 5,874,706 | A * | 2/1999 | Ishii et al. | 219/121.43 |
| 5,892,208 | A * | 4/1999 | Harris et al. | 219/696 |
| 5,910,268 | A | 6/1999 | Keefer | |
| 5,970,624 | A * | 10/1999 | Moriya | 34/411 |
| 5,973,305 | A | 10/1999 | Kim et al. | |
| 5,977,529 | A * | 11/1999 | Willert-Porada et al. | 219/698 |
| 5,979,073 | A | 11/1999 | Fuls et al. | |
| 5,994,686 | A | 11/1999 | Salina | |
| 6,020,579 | A | 2/2000 | Lewis et al. | |
| 6,020,580 | A * | 2/2000 | Lewis et al. | 219/696 |
| 6,033,481 | A * | 3/2000 | Yokogawa et al. | 156/345.41 |
| 6,034,363 | A | 3/2000 | Barmatz et al. | |
| 6,054,696 | A | 4/2000 | Lewis et al. | |
| 6,072,167 | A | 6/2000 | Lewis et al. | |
| 6,072,168 | A | 6/2000 | Feher et al. | |
| 6,104,018 | A * | 8/2000 | Varma et al. | 219/746 |
| 6,105,278 | A * | 8/2000 | Gerrish | F26B 3/343 219/697 |
| 6,121,595 | A | 9/2000 | Lewis et al. | |
| 6,124,584 | A | 9/2000 | Blaker et al. | |
| 6,191,402 | B1 | 2/2001 | Ekemar | |
| 6,204,606 | B1 | 3/2001 | Spence et al. | |
| 6,242,726 | B1 | 6/2001 | Harris et al. | |
| 6,246,039 | B1 | 6/2001 | Omori et al. | |
| 6,288,379 | B1 | 9/2001 | Greene et al. | |
| 6,297,479 | B1 | 10/2001 | Wefers | |
| 6,323,470 | B2 | 11/2001 | Schmidt et al. | |
| 6,333,496 | B1 | 12/2001 | Risman et al. | |
| 6,365,240 | B1 | 4/2002 | Banerjee et al. | |
| 6,392,350 | B1 | 5/2002 | Amano | |
| 6,393,172 | B1 * | 5/2002 | Brinkman et al. | 385/16 |
| 6,396,037 | B1 | 5/2002 | Rossouw et al. | |
| 6,473,994 | B1 | 11/2002 | Dedieu et al. | |
| 6,546,646 | B1 | 4/2003 | Thomas | |
| 6,581,299 | B1 | 6/2003 | Dedieu et al. | |
| 6,632,326 | B1 | 10/2003 | Hirano et al. | |
| 6,674,056 | B2 | 1/2004 | Lee | |
| 6,675,495 | B2 | 1/2004 | Dedieu et al. | |
| 6,702,969 | B2 | 3/2004 | Matuana et al. | |
| 6,723,766 | B1 | 4/2004 | Hirano et al. | |
| 6,740,858 | B2 | 5/2004 | Tracy et al. | |
| 6,742,278 | B2 | 6/2004 | Vinden et al. | |
| 6,751,887 | B2 | 6/2004 | Hanhi | |
| 6,797,929 | B2 | 9/2004 | Drozd et al. | |
| 6,821,631 | B2 | 11/2004 | Grantham et al. | |
| 6,831,259 | B2 | 12/2004 | Muegge et al. | |
| 6,833,537 | B2 * | 12/2004 | Risman et al. | 219/690 |
| 6,870,123 | B2 | 3/2005 | Suzuki et al. | |
| 6,933,482 | B2 | 8/2005 | Fagrell et al. | |

(56) References Cited

U.S. PATENT DOCUMENTS

| | | | |
|---|---|---|---|
| 6,960,747 | B2 | 11/2005 | Risman |
| 7,002,122 | B2 | 2/2006 | Eves, II et al. |
| 7,046,099 | B2 | 5/2006 | Ivanov et al. |
| 7,057,479 | B2 * | 6/2006 | Furuya et al. ............... 333/202 |
| 7,089,685 | B2 | 8/2006 | Torgovnikov et al. |
| 7,091,457 | B2 | 8/2006 | Gregoire et al. |
| 7,122,772 | B2 | 10/2006 | Feher et al. |
| 7,129,453 | B2 * | 10/2006 | Dalton .......................... 219/759 |
| 7,202,453 | B2 | 4/2007 | Charlier De Chily et al. |
| 7,208,710 | B2 * | 4/2007 | Gregoire et al. ............. 219/697 |
| 7,256,665 | B2 | 8/2007 | Harris |
| 7,300,705 | B2 | 11/2007 | Neogi et al. |
| 7,466,467 | B2 | 12/2008 | Jolivet |
| 7,518,092 | B2 | 4/2009 | Purta et al. |
| 7,666,235 | B2 | 2/2010 | Learey et al. |
| 7,688,132 | B2 | 3/2010 | Kirshner et al. |
| 7,692,593 | B2 * | 4/2010 | Rao et al. ..................... 343/703 |
| 7,846,295 | B1 | 12/2010 | Medoff |
| 8,299,408 | B2 | 10/2012 | Kimrey, Jr. |
| 8,487,223 | B2 | 7/2013 | Kimrey, Jr. |
| 2002/0017033 | A1 * | 2/2002 | Wefers ............................ 34/263 |
| 2002/0036201 | A1 * | 3/2002 | Dalton .......................... 219/759 |
| 2002/0152633 | A1 | 10/2002 | Park et al. |
| 2003/0037458 | A1 * | 2/2003 | Dedieu et al. .................. 34/245 |
| 2003/0209539 | A1 * | 11/2003 | Dalton .......................... 219/634 |
| 2003/0209542 | A1 * | 11/2003 | Harris ........................... 219/696 |
| 2003/0224082 | A1 | 12/2003 | Akopyan |
| 2004/0008943 | A1 | 1/2004 | Berini |
| 2004/0101635 | A1 | 5/2004 | Ortlieb et al. |
| 2004/0108313 | A1 * | 6/2004 | Cutler et al. .................. 219/730 |
| 2004/0115460 | A1 | 6/2004 | Torgovnikov et al. |
| 2004/0206755 | A1 | 10/2004 | Hadinger |
| 2004/0258941 | A1 | 12/2004 | Neogi et al. |
| 2005/0153152 | A1 | 7/2005 | Kelsoe |
| 2005/0212626 | A1 * | 9/2005 | Takamatsu .................... 333/212 |
| 2006/0101755 | A1 * | 5/2006 | Harris ........................... 52/404.3 |
| 2006/0289529 | A1 | 12/2006 | Ito et al. |
| 2007/0068939 | A1 | 3/2007 | Harris |
| 2007/0079522 | A1 * | 4/2007 | Kimrey ............................ 34/79 |
| 2007/0079523 | A1 * | 4/2007 | Kimrey ............................ 34/79 |
| 2007/0184196 | A1 | 8/2007 | Wallace et al. |
| 2007/0194016 | A1 | 8/2007 | Dalton |
| 2007/0224839 | A1 * | 9/2007 | Shimizu ........................ 438/795 |
| 2008/0191949 | A1 * | 8/2008 | Rao et al. ..................... 343/703 |
| 2008/0233020 | A1 | 9/2008 | Purta et al. |
| 2008/0302787 | A1 | 12/2008 | Erskine et al. |
| 2009/0045891 | A1 | 2/2009 | Okamoto et al. |
| 2009/0266487 | A1 * | 10/2009 | Tian et al. ................. 156/345.41 |
| 2009/0291229 | A1 * | 11/2009 | Wallace et al. ............... 427/553 |
| 2010/0000110 | A1 | 1/2010 | Li |
| 2010/0059510 | A1 | 3/2010 | Ristola et al. |
| 2010/0060391 | A1 | 3/2010 | Ristola et al. |
| 2010/0096295 | A1 * | 4/2010 | Pringle et al. ................... 208/14 |
| 2010/0255212 | A1 | 10/2010 | Treu et al. |
| 2011/0212273 | A1 * | 9/2011 | Holm ............................ 427/532 |

FOREIGN PATENT DOCUMENTS

| | | | |
|---|---|---|---|
| DE | 19822355 | A1 | 11/1999 |
| DE | 10109306 | A1 | 9/2002 |
| EP | 0 014 121 | A1 | 8/1980 |
| EP | 0 909 618 | A2 | 4/1999 |
| EP | 1 444 867 | B1 | 1/2006 |
| GB | 1 364 734 | | 8/1974 |
| GB | 2 071 833 | A | 9/1981 |
| JP | 06-045098 | | 2/1994 |
| JP | 2005 298290 | A | 10/2005 |
| RU | 2 057 404 | C1 | 3/1996 |
| RU | 2 113 666 | C1 | 6/1998 |
| RU | 2 133 933 | C1 | 7/1999 |
| RU | 2 203 459 | C1 | 4/2003 |
| SU | 391923 | | 12/1973 |
| WO | WO 98/01497 | A1 | 1/1998 |
| WO | WO 02/37043 | A1 | 5/2002 |
| WO | WO 2009/040656 | A2 | 4/2009 |
| WO | WO 2009040656 | A2 * | 4/2009 ............... B27K 5/04 |
| WO | WO 2009/095687 | A1 | 8/2009 |
| WO | WO 2009/134406 | A1 | 11/2009 |
| WO | WO 2010/116262 | A1 | 10/2010 |
| WO | WO 2011/090448 | A1 | 7/2011 |

OTHER PUBLICATIONS

Accys Technologies, "Acetylated Wood: Durable, Stable, Sustainable Wood for Windows, Doors & Siding"; Presentation to American Institute of Architects; 2010; retrieved online at http://atlaslumber.com/atlas_lumber/wp-content/uploads/2010/10/accoya-aia-presentation.pdf.

Antti, A. L.; "Microwave drying of hardwood; simultaneous measurements of pressure, temperature, and weight reduction"; Forest Products Journal; Jun. 1992; vol. 42, No. 6; pp. 49-54.

Antti, A. L.; "Microwave drying of pine and spruce"; Holz als Roh- und Werkstoff (European Journal of Wood Products); 1995; vol. 53, No. 5; pp. 333-338.

Barnes, Derek et al.; "Continuous System for the Drying of Lumber with Microwave Energy"; Forest Products Journal; May 1976; vol. 26, No. 5; pp. 31-42.

Brelid, P. Larsson et al.; "Acetylation of solid wood using microwave heating—Part 1: Studies of dielectric properties"; Holz als Roh- und Werkstoff (European Journal of Wood and Wood Products); Oct. 1999; vol. 57, No. 5; pp. 259-263.

Brelid, P. Larsson and Simonson, R., "Acetylation of Solid wood using microwave heating—Part 2: Experiments in laboratory scale"; Holz als Roh- und Werkstoff (European Journal of Wood and Wood Products); Oct. 1999; vol. 57, No. 5; pp. 383-389.

Cividini, R. and Travan, L.; "MIcrowave Heating in Vacuum-Press Drying of Tiber: Practical Investigation"; Proceedings of 8$^{th}$ International IUFRO Wood Drying Conference; 2003; pp. 150-155.

Daian, M.; Doctoral Thesis "The Development and Evaluation of New Microwave Equipment and its Suitability for Wood Modiciation" Industrial Research Institute Swinburne, Swinburne University of Technology; 2006; retrieved online at researchbank,swinburne.edu.au.

Hansson, L. and Antti, A. L.; "Design and performance of an industrial microwave drier for on-line drying of wood components"; Proceedings of 8$^{th}$ International IUFRO Wood Drying Conference; 2003; pp. 156-159.

Hansson, Lars: Doctorial Thesis "Microwave Treatment of Wood"; Luiea University of Technology (LTU) Division of Wood Physics; 2007.

Homan, Waldemar J. and Jorissen, Andre J.M.; "Wood modification developments"; Heron; 2004; vol. 49, No. 4; pp. 361-386.

Jeni, Kusturee et al.; "Design and analysis of the commercialized drier processing using a combined unsymmetrical double-feed microwave and vacuum system (case study: tea leaves)"; Chemical Engineering and Processing; 2010; vol. 49; pp, 389-395.

Kaneko, Tomoyuki et al.; "Study on the Utilization of Micro-wave Heating to Acetylation Treatment of Wood"; Kogel Gijutsubu, Shizuoka Ind. Res. Inst. Shizuoka Prefect., Supplied by the British Library—"The world's knowledge"; 1997; vol. 42; pp. 1-5.

Lee, Andy W. C. and Harris, Robert A.; "Properties of red oak lumber dried by radio-frequency/vacuum process and dehumidification process"; Forest Products Journal; May 1984; vol. 34, No, 3; pp. 56-58.

Lehne, M. et al.; "Comparison of Experimental and Modelling Studies for the Microwave Dying of Ironbark Timber": Drying Technology: An International Journal; 1999; vol. 17, No. 10; pp. 2219-2235.

Leiker, M. et al.; "Accelerated Drying of Single Hardwood Boards by Combined Vacuum-Microwave Application"; Proceedings of 9$^{th}$ International IUFRO Wood Drying Conference; 2005; Nanjing, China; pp. 185-190.

Leiker, Matthis et al.; "Vacuum Microwave Drying of Beech; Property Profiles and Energy Efficiency"; Proceedings of COST E15 Conference; Apr. 2004; Athens; Greece; pp, 128-137.

Leiker, M. and Adamska, M, A.; "Energy efficiency and drying rates during vacuum microwave drying of wood"; Holz Roh Werkst; Apr. 2004; vol. 62; pp. 203-208.

(56) References Cited

OTHER PUBLICATIONS

Leonelli, Cristina and Mason, Timothy J.; "Microwave and ultrasonic processing: Now a realistic option for industry"; Chemical Engineering and Processing; 2010; vol. 49; pp. 855-900.
Rowell, Roger M.; "Acetylation"; Forest Product Journal: Sep. 2006; vol. 56, No. 9; pp. 4-12.
Rowell, Roger M.; "Chapter 14 Chemical Modification of Wood"; in Rowell, eel Handbook of Wood Chemistry and Wood Composites; 2005; pp. 381-420.
Seyfarth, R. et al.; "Continuous Drying of Lumber in a Microwave Vacuum Kiln"; Proceedings of $8^{th}$ International IUFRO Wood Drying Conference; 2003; pp. 159-163.
Teratani, Fumiyuki et al.; "Solubility of Acetylated Wood Meal in Cellulose Solvents"; Bull, Fac. Agr. Shizuoka Univ.; 1988; No. 38; pp. 21-28.
Timar, Maria Cristina et al.; "Preparation of Wood with Thermoplastic Properties, Part 2, Simplified Technologies"; Holzforschung; 2000; vol. 54, No. 1; pp. 77-82.
Voss, W. A. Geoffrey; "Factors Affexting the Operation of High-Power Microwave Heating Systems for Lumber Processing"; IEEE Transactions on Industry and General Applications; May/Jun. 1966; vol. IGA-2, No. 234-243.
Notification of Transmittal of the International Search Report and the Written Opinion of the International Searching Authority, or the Declaration date of mailing Aug. 14. 2012 received in International Application No. PCT/US2011/065732.
Notification of Transmittal of the International Search Report and the Written Opinion of the International Searching Authority, or the Declaration date of mailing Aug. 22, 2012 received in International Application No. PCT/US2011/065725.
Notification of Transmittal of the International Search Report and the Written Opinion of the International Searching Authority, or the Declaration date of mailing Aug. 22, 2012 received in International Application No. PCT/US2011/065728.
Notification of transmittal of the International Search Report and the Written Opinion of the International Searching Authority, or the Declaration date of mailing Aug. 31, 2012 received in International Application No. PCT/US2011/065740.
Notification of Transmittal of the International Search Report and the Written Opinion of the International Searching Authority, or the Declaration date of mailing Aug. 31, 2012 received in International Application No. PCT/US2011/065741.
Notification of Transmittal of the International Search Report and the Written Opinion of the International Searching Authority, or the Declaration date of mailing Sep. 17, 2012 received in International Application No. PCT/US2011/065737.
Notification of Transmittal of the International Search Report and the Written Opinion of the International Searching Authority, or the Declaration date of mailing Sep. 25, 2012 received in International Application No. PCT/US2011/065745.
Co-pending U.S. Appl. No. 13/323,104, filed Dec. 12, 2011; Kimrey, Jr. et al, now U. S. Patent Publication No. 2012/0160841.
Co-pending U.S. Appl. No. 13/323,133, filed Dec. 12, 2011; Kimrey, Jr. et al, now U. S. Patent Publication No. 2012/0160835.
Co-pending U.S. Appl. No. 13/323,140, filed Dec. 12, 2011; Kimrey, Jr. et al, now U. S. Patent Publication No. 2012/01608036.
Co-pending U.S. Appl. No. 13/323,164, filed Dec. 12, 2011; Kimrey, Jr. et al, now U. S. Patent Publication No. 2012/0160839.
Co-pending U.S. Appl. No. 13/323,184, filed Dec. 12, 2011; Shelton et al, now U. S. Patent Publication No. 2012/0160843
Co-pending U.S. Appl. No. 13/323,194, filed Dec. 12, 2011; Kimrey, Jr. et al, now U. S. Patent Publication No. 2012/0160840.
Co-pending U.S. Appl. No. 13/323,239, filed Dec. 12, 2011; Kimrey, Jr. et al, now U. S. Patent Publication No. 2012/0160,838.
Office Action notification date Oct. 14, 2014 received in U.S. Appl. No. 13/323,104.
Office Action notification date Nov. 7, 2014 received in U.S. Appl. No. 13/323,239.
Office Action notification date Oct. 23, 2014 received in U.S. Appl. No. 13/323,133.
Office Action notification date Oct. 29, 2014 received in U.S. Appl. No. 13/323,164.
Office Action notification date Nov. 18, 2014 received in U.S. Appl. No. 13/323,184.
Office Action notification date Nov. 25, 2014 received in U.S. Appl. No. 13/323,194.
Office Action dated Oct. 5, 2015 for related U.S. Appl. No. 13/323,239, filed Dec. 12, 2011, 7 pages.
Office Action dated May 13, 2015 from related U.S. Appl. No. 13/323,239, filed Dec. 12, 2011, 7 pages.
Election-Restriction Requirement dated Jul. 11, 2014 from related U.S. Appl. No. 131323,239, filed Dec. 12, 2011, 8 pages.
Office Action dated Jun. 22, 2015 from related U.S. Appl. No. 13/323,184, filed Dec. 12, 2011, 20 pages.
Chinese Office Action dated Dec. 1, 2014 from Related Chinese Application No. 201180062047.5, 37 pages.
Chinese Office Action dated Jul. 30, 2015 from Related Chinese Application No. 201180062047.5, 39 pages.
Chinese Office Action dated Nov. 25, 2014 from Related Chinese Application No. 201180062079.5, 5 pages.
Chinese Office Action dated Jul. 13, 2015 from Related Chinese Application No. 201180062079.5, 3 pages.
Election-Restriction Requirement dated Apr. 25, 2014 from related U.S. Appl. No. 13/323,184, filed Dec. 12, 2011, 6 pages.

\* cited by examiner

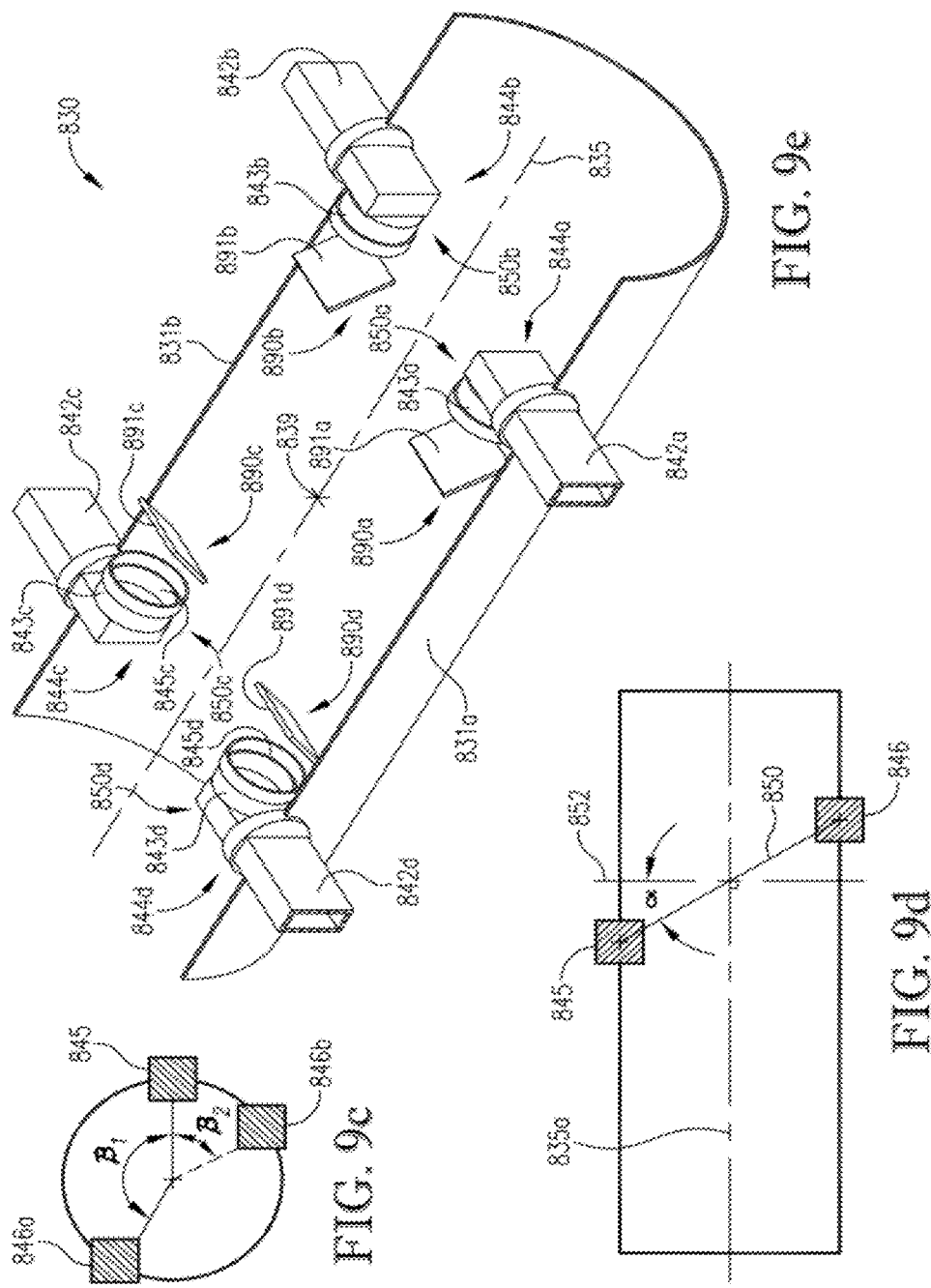

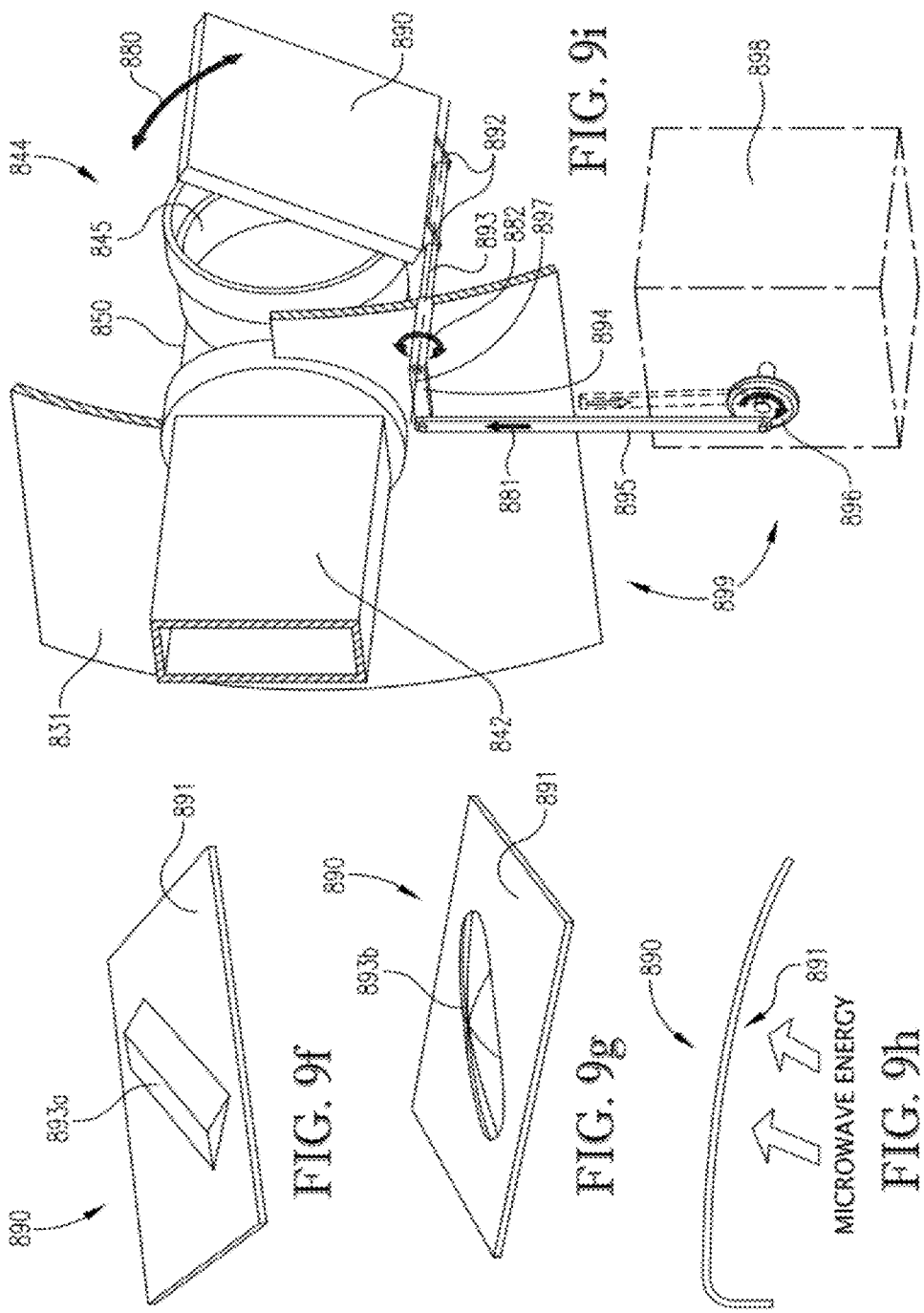

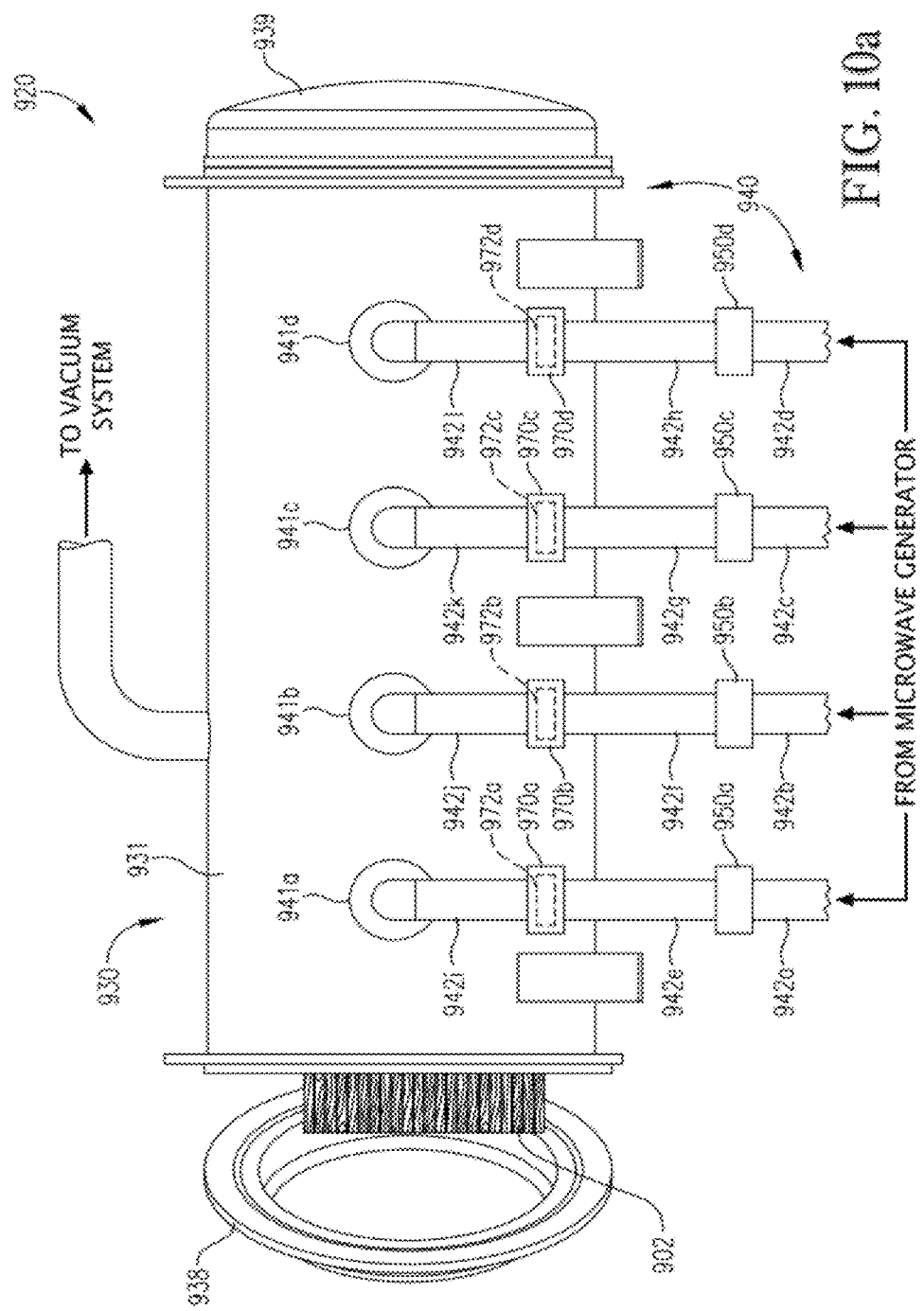

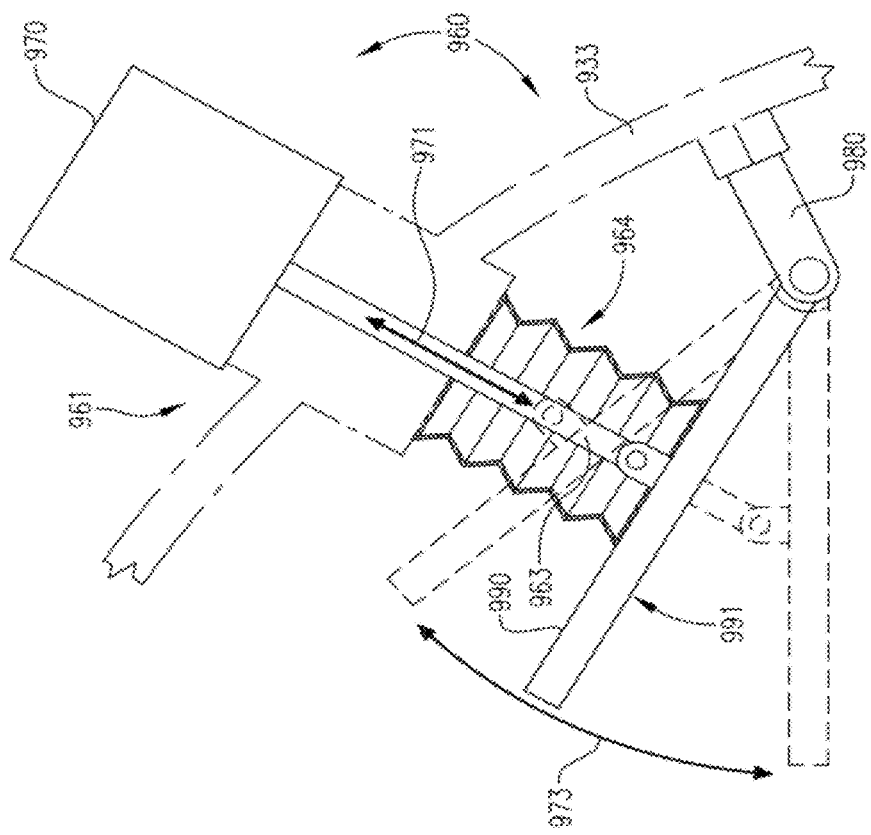
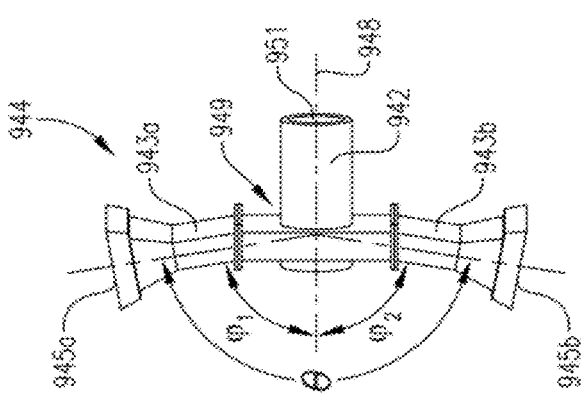

WOOD HEATER WITH ENHANCED MICROWAVE LAUNCHING SYSTEM

CROSS-REFERENCE TO RELATED APPLICATIONS

This application claims priority to U.S. Provisional Patent Application Nos. 61/427,030; 61/427,042; 61/427,053; 61/427,056; 61/427,064; 61/427,067; 61/427,070; 61/427,072; 61/427,075; 61/427,076; 61/427,079; and 61/427,080, filed Dec. 23, 2010.

FIELD OF THE INVENTION

This invention generally relates to microwave heating systems suitable for heating wood.

BACKGROUND

Electromagnetic radiation, such as microwave radiation, is a known mechanism for delivering energy to an object. The ability of electromagnetic radiation to penetrate and heat an object both rapidly and effectively has proven advantageous in many chemical and industrial processes. Further, because the use of microwave energy as a heat source is generally non-invasive, microwave heating is particularly useful in processing 'sensitive' dielectric materials, such as food and pharmaceuticals, and can even be useful for heating materials having a relatively poor thermal conductivity, such as wood. However, the complexities and nuances of safely and effectively applying microwave energy, especially on a commercial scale, have severely limited its application in several types of industrial processes.

Because of its wide suitability for a variety of applications, its renewable nature, and its relatively low cost, wood is one of the most widely used building materials in existence. However, because wood is a natural product, its physical and structural properties can vary substantially, not only amongst different species, but also amongst different trees, or even different locations within the same piece of wood. Further, wood is generally hygroscopic, which affects its dimensional stability, and its biochemical composition makes it susceptible to attack by insects and fungi. As a result, several types of wood treatment processes have been developed to increase the stability of wood through modification of its chemical, physical, and/or structural properties. Examples of treatment processes include impregnation treatments, coating treatments, thermal modification, and chemical modification. The latter two treatment processes generally alter the properties of wood to a more drastic degree than the others and, consequently, these types of processes typically involve more complex schemes and systems. For example, many chemical and thermal treatment processes can be carried out under vacuum and/or in the presence of one or more treatment chemicals. As a result, commercialization of these types of technologies has been limited, and multiple challenges remain to be overcome in order for these processes to be industrialized on a wide scale.

Thus, a need exists for a more efficient and cost effective commercial-scale system suitable for chemically or thermally treating wood. A need also exists for an efficient and cost effective industrial-scale microwave heating system suitable for use in a wide variety of processes and applications, including the treatment of wood.

SUMMARY OF THE INVENTION

One embodiment of the present invention concerns a system for producing chemically-modified, dried, and/or thermally-modified wood, the system comprising at least one microwave generator for generating microwave energy; a microwave heater for receiving a bundle of wood; and a microwave distribution system for directing at least a portion of the microwave energy from the at least one microwave generator to the microwave heater. The microwave distribution system comprises at least a first split launcher at least partly disposed within the interior of the microwave heater. The first split launcher comprises a $TM_{ab}$ waveguide segment, at least two $TE_{xy}$ waveguide segments, and a mode converting splitter coupled between the $TM_{ab}$ waveguide segment and the at least two $TE_{xy}$ waveguide segments. The mode converting splitter is configured to convert $TM_{ab}$ mode microwave energy received from the $TM_{ab}$ waveguide segment into at least two separate fractions of $TE_{xy}$ mode microwave energy that are each directed to one of the at least two $TE_{xy}$ waveguide segments, wherein a and y are 0 and b and x are integers between 1 and 5.

Another embodiment of the present invention concerns a system for producing chemically-modified, dried, and/or thermally-modified wood, the system comprising at least one microwave generator for generating microwave energy; a microwave heater for receiving a bundle of wood; and a microwave distribution system for directing at least a portion of the microwave energy from the at least one microwave generator into the microwave heater. The microwave distribution system comprises at least a first microwave launcher and a second microwave launcher operable to emit at least a portion of the microwave energy into the microwave heater, wherein the first and the second microwave launchers are located on generally opposite sides of the microwave heater. The microwave heater comprises at least a first movable reflector and a second movable reflector, wherein the first movable reflector and the second movable reflector are configured to raster microwave energy emitted from the first and second microwave launchers, respectively.

Still another embodiment of the present invention concerns a process for producing chemically-modified, dried, and/or thermally-modified wood, the process comprising: (a) generating microwave energy; (b) passing at least a portion of the microwave energy in a $TM_{ab}$ mode through a first single opening in a first side wall location of a microwave heater, wherein a is 0 and b is an integer between 1 and 5; (c) converting the microwave energy passed through the first single opening into at least two separate $TE_{xy}$ mode microwave portions in the microwave heater, wherein x is an integer between 1 and 5 and y is 0; (d) simultaneously emitting the at least two separate $TE_{xy}$ mode microwave portions into the interior of the microwave heater; and (e) heating at least a portion of a bundle of wood with at least a portion of the at least two separate $TE_{xy}$ mode microwave portions emitted into the microwave heater.

Yet another embodiment of the present invention concerns a process for producing chemically-modified, dried, and/or thermally-modified wood, the process comprising: (a) generating microwave energy; (b) directing at least a portion of the microwave energy into a microwave heater, wherein the directing includes passing the microwave energy through a first pair of microwave launchers, wherein the microwave launchers of the first pair are located on generally opposite sides of the microwave heater from one another; (c) emitting the microwave energy from at least one of the microwave launchers into the interior of the microwave heater; and (d) rastering at least a portion of the microwave energy emitted into the microwave heater with at least one movable reflector to thereby heat a bundle of wood.

BRIEF DESCRIPTION OF THE DRAWINGS

FIG. 9c is a diagram illustrating what is meant by the terms "opposite side" and "same side";

FIG. 9d is a diagram illustrating what is meant by the term "axially aligned";

FIG. 9e is a partial cut-away isometric view of a microwave launching and reflecting or dispersing system configured in accordance with one embodiment of the present invention, particularly illustrating a launch system similar to that depicted in FIG. 9b but also including a movable reflector associated with each microwave launcher;

FIG. 9f is an isometric view of one embodiment of a reflector suitable for use in a microwave heating system as described herein, particularly illustrating the reflector as having a non-planar reflecting surface with a concavity of a first configuration;

FIG. 9g is an isometric view of another embodiment of a reflector suitable for use in a microwave heating system described herein, particularly illustrating the reflector as having a non-planar reflecting surface with a concavity of a second configuration;

FIG. 9h is a side elevation view of one embodiment of a reflector suitable for use in a microwave heating system described herein, particularly illustrating the curvature of the reflector surface;

FIG. 9i is an enlarged, cut-away, isometric view of a microwave launcher and reflector pair previously depicted in FIG. 9e, particularly illustrating an actuator system for providing oscillating movement of the reflector;

FIG. 10a is a side view of a microwave heating system configured in accordance with one embodiment of the present invention, particularly illustrating a microwave distribution system equipped with a plurality of $TM_{ab}$ barrier assemblies;

FIG. 10d is an enlarged side view of one of the split launchers depicted in FIG. 10c, particularly illustrating the launch angle for the two separate microwave energy fractions emitted from the split launcher;

FIG. 10e is an enlarged view of one embodiment of a system for moving a reflector, particularly illustrating an actuator used to cause oscillation of the reflector and a bellows for inhibiting fluid leakage at the location where the actuator penetrates the wall of the microwave heater;

DETAILED DESCRIPTION

Figure 1:
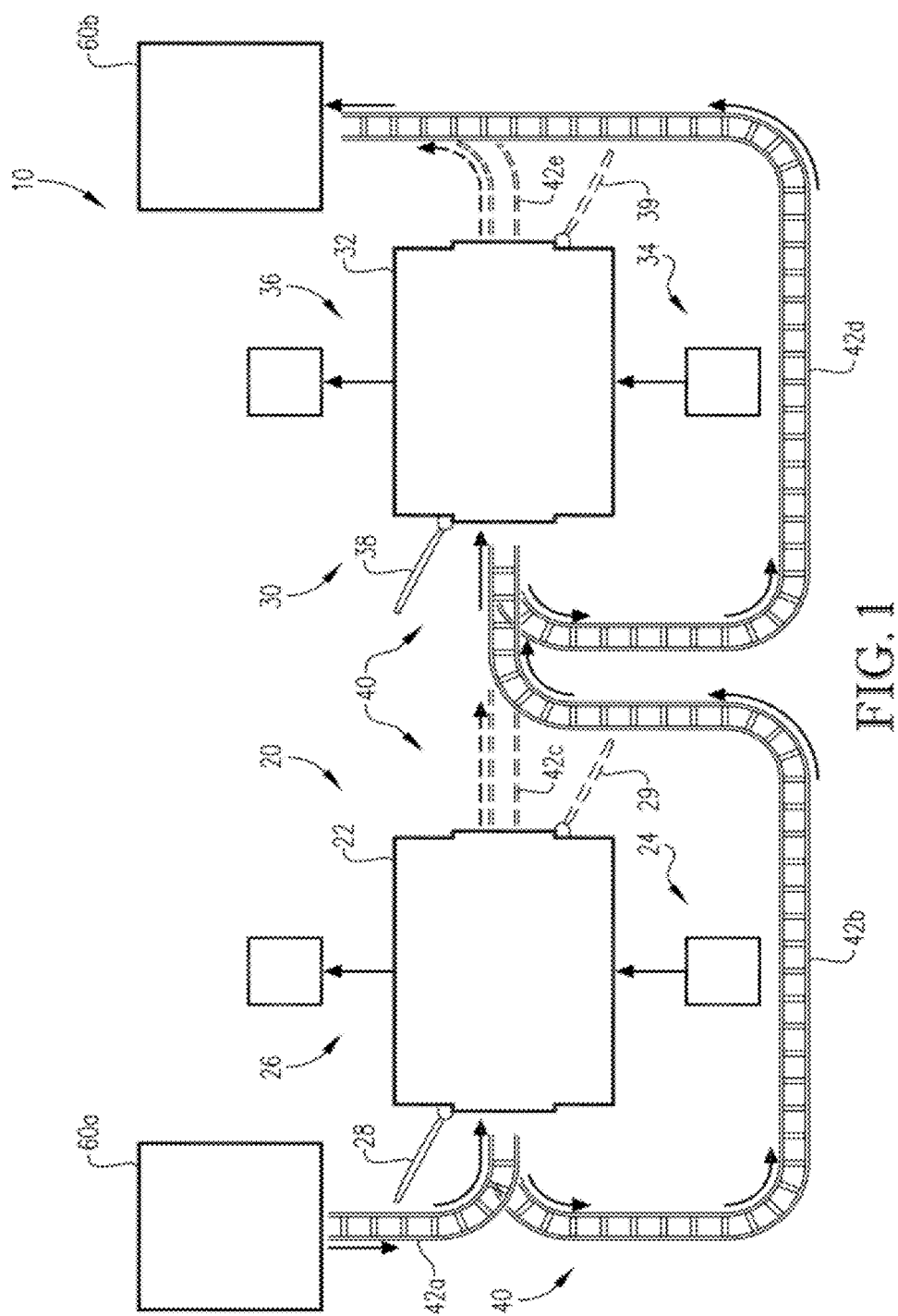
FIG. 1 is a top view of a wood treatment system configured in accordance with one embodiment of the present invention, particularly illustrating a rail system for transporting bundles of wood to and from a chemical modification reactor and a wood heater.

In accordance with one embodiment of the present invention, a heating system is provided. Heating systems configured according to various embodiments of the present invention can comprise a heat source, a heating vessel (e.g., a heater), and an optional vacuum system. Typically, heating systems configured according to one embodiment of the present invention can be suitable for use as stand-alone heating units, or can be employed as, or in conjunction with, chemical reactors in a variety of processes. Heating systems configured according to several embodiments of the present invention will now be described in detail below, with reference to the Figures.

In one embodiment, a heating system of the present invention can be used to heat lignocellulosic materials. Lignocellulosic materials can include any material comprising cellulose and lignin and, optionally, other materials such as hemicelluloses. Examples of lignocellulosic materials can include, but are not limited to, wood, bark, kenaf, hemp, sisal, jute, crop straws, nutshells, coconut husks, grass and grain husks and stalks, corn stover, bagasse, conifer and hardwood barks, corn cobs, and other crop residuals, and any combination thereof.

In one embodiment, the lignocellulosic material can be wood. The wood can be a softwood or a hardwood. Examples of suitable wood species can include, but are not limited to, pine, fir, spruce, poplar, oak, maple, and beech. In one embodiment, wood can comprise red oak, red maple, German beech, or Pacific albus. In another embodiment, the wood can comprise a pine species including, for example, Radiata pine, Scots pine, Loblolly pine, Longleaf pine, Shortleaf pine, or Slash pine, the latter four of which can be collectively referred to as "Southern Yellow Pine." The wood processed by heating systems according to one embodiment of the present invention can be in any suitable form. Non-limiting examples of suitable forms of wood can include, but are not limited to, shredded wood, wood fibers, wood flour, wood chips, wood particles, wood flakes, wood strands, and wood excelsior. In one embodiment, the wood processed in one or more heating systems of the present invention can comprise sawn timber, debarked tree trunks or limbs, boards, planks, veneers, beams, profiles, squared timber, or any other cut of lumber.

Typically, the size of the wood can be defined by two or more dimensions. The dimensions can be actual "measured" dimensions or can be nominal dimensions. As used herein, the term "nominal dimension" refers to the dimensions calculated using the size designation for the wood. The nominal size can be larger than the measured dimensions. For example, a dried "2×4" can have actual dimensions of 1.5 inches by 3.5 inches, but the nominal dimensions of "2×4" are still used. It should be understood that the dimensions referred to herein are generally nominal dimensions, unless otherwise noted.

In one embodiment, the wood can have three dimensions: a length, or longest dimension; a width, or second longest dimension; and a thickness, or shortest dimension. Each of the dimensions can be substantially the same, or, one or more of the dimensions can be different from one or more of the other dimensions. According to one embodiment, the length of the wood can be at least about 6 inches, at least about 1 foot, at least about 3 feet, at least about 4 feet, at least about 6 feet, or at least about 10 feet. In another embodiment, the width of the wood can be at least about 0.5 inches, at least about 1 inch, at least about 2 inches, at least about 4 inches, at least about 8 inches, at least about 12 inches, or at least about 24 inches and/or no more than about 10 feet, no more than about 8 feet, no more than about 6 feet, no more than about 4 feet, no more than about 3 feet, no more than about 2 feet, no more than about 1 foot, or no more than about 6 inches. In yet another embodiment, the thickness of the wood can be at least about 0.25 inches, at least about 0.5 inches, at least about 0.75 inches, at least about 1 foot, at least about 1.5 feet, or at least about 2 feet and/or no more than about 4 feet, no more than about 3 feet, no more than about 2 feet, no more than about 1 foot, and/or no more than about 6 inches.

According to one embodiment, the wood can comprise one or more pieces of solid wood, engineered solid wood, or a combination thereof. As used herein, the term "solid wood" refers to wood that measures at least about 10 centimeters in at least one dimensions but that is otherwise of any dimension (e.g., lumber having dimensions as described previously). As used herein, the term "engineered solid wood" refers to a wooden body having the minimum dimensions of solid wood (e.g., at least one dimension of at least about 10 cm), but that is formed of smaller bodies of wood and at least one binder. The smaller bodies of wood in engineered solid wood may or may not have one or more of the dimensions described previously with respect to solid wood. Non-limiting examples of engineered solid wood can include wood laminates, fiberboard, oriented strand board, plywood, wafer board, particle board, and laminated veneer lumber.

In one embodiment, the wood can be grouped in a bundle. As used herein, the term "bundle" refers to two or more pieces of wood stacked, placed, and/or fastened together in any suitable fashion. According to one embodiment, a bundle can comprise a plurality of boards stacked and coupled to one another via a belt, strap, or other suitable device. In one embodiment, the two or more pieces of wood can be in direct contact or, in another embodiment, the wood pieces can be at least partially spaced using at least one spacer or "sticker" disposed therebetween.

In one embodiment, the bundle can have any suitable dimensions and/or shape. In one embodiment, the bundle can have a total length, or longest dimension, of a least about 2 feet, at least about 4 feet, at least about 8 feet, at least about 10 feet, at least about 12 feet, at least about 16 feet, or at least about 20 feet and/or no more than about 60 feet, no more than about 40 feet, or no more than about 25 feet. The bundle can have a height, or second longest dimension, of at least about 1 foot, at least about 2 feet, at least about 4 feet, at least about 6 feet, at least about 8 feet, and/or no more than about 16 feet, no more than about 12 feet, no more than about 10 feet, no more than about 8 feet, no more than about 6 feet, or no more than about 4 feet. In one embodiment, the bundle can have a width, or shortest dimension, of at least about least about 1 foot, at least about 2 feet, at least about 4 feet, at least about 6 feet, and/or no more than about 20 feet, no more than about 16 feet, no more than about 12 feet, no more than about 10 feet, no more than about 8 feet, or no more than about 6 feet. The total volume of the bundle, including the spaces between the boards, if any, can be at least about 50 cubic feet, at least about 100 cubic feet, at least about 250 cubic feet, at least about 375 cubic feet, or at least about 500 cubic feet. According to one embodiment, the weight of the bundle of wood (or cumulative weight of one or more objects, articles, or loads to be treated) introduced into the reactor and/or heater of one or more heating systems of the present invention (e.g., prior to heating or treatment) can be at least about 100 pounds, at least about 500 pounds, at least about 1,000 pounds, or at least about 5,000 pounds. In one embodiment, the bundle can be cubical or cuboidal in shape.

In another embodiment, one or more heating systems of the present invention can be used to chemically modify, dry, and/or thermally modify wood, thereby producing chemically-modified, dried, and/or thermally-modified wood. Wood that has been dried and/or thermally-modified wood may referred to as "thermally-treated" wood, such that the term "thermally-treated wood" refers to wood that has been heated, dried, and/or thermally-modified. As used herein, the term "thermally modify" means to at least partially modify the chemical structure of at least a portion of one or more pieces of wood in the absence of an exogenous treating agent. In one embodiment, a heating system, specific configurations of which will be described in detail shortly, can be used to heat and/or dry wood in a thermal modification process to thereby provide a bundle of thermally-modified wood. According to one embodiment, thermal modification can occur simultaneously with heating and/or drying of wood in a wood heater and/or dryer, while, in another embodiment, wood can be heated and/or dried in a wood heater or dryer without being thermally modified. As used herein, the term "dry" means to cause or accelerate vaporization of or to otherwise remove at least a portion of one or more liquid or otherwise heat-removable components from the wood via the addition of heat or other suitable form of energy. Thermal modification processes can include a step of contacting wood with one or more heat transfer agents such as, for example, steam, heated inert vapors like nitrogen or air, or even liquid heat transfer media such as heated oils. In another embodiment, a radiant heat source may be used during thermal modification. Thermally-modified wood can have a substantially lower moisture content than untreated wood and can have enhanced physical and/or mechanical properties such as, for example, increased flexibility, higher resistance to decay and biological attacks, and increased dimensional stability.

In yet another embodiment, heating systems configured according to various embodiments of the present invention can be used to chemically modify wood. As used herein, the term "chemically modify" means to at least partially modify the chemical structure of at least a portion of one or more pieces of wood in the presence of one or more exogenous treating agents. Specific types of chemical modification processes can include, but are not limited to, acetylation and other types of esterification, epoxidation, etherification, furfurlyation, methylation, and/or melamine treatment. Non-limiting examples of suitable treatment agents can include anhydrides (e.g., acetic, phthalic, succinic, maleic, propionic, or butyric); acid chlorides; ketenes; carboxylic acids; isocyanates; aldehydes (e.g., formaldehyde, acetyldehyde, or difunctional aldehydes); chloral; dimethyl sulfate; alkyl chlorides; beta-propiolacetone; acrylonitrile; epoxides (e.g., ethylene oxide, propylene oxide, or butylenes oxides); difunctional epoxides; borates; acrylates; silicates; and combinations thereof.

Processes for chemically modifying wood can include a chemical modification step followed by a heating step. During the chemical modification or reaction step, which can be carried out in a chemical modification reactor, wood can be exposed to one or more of the exogenous treatment agents described previously, which can react with at least a portion of the functional groups (e.g., hydroxyl groups) of the untreated wood to thereby provide chemically-modified wood. During the chemical modification step, one or more heat-initiated chemical reactions can take place, which may or may not be initiated by an external source of energy (e.g., thermal energy or electromagnetic energy, including, for example, microwave energy.) Specific details of chemical modification processes vary amongst the many types of chemical modification, but most chemically-modified wood can have enhanced structural, chemical, and/or mechanical properties including lower moisture sorption, higher dimensional stability, more biological and pest resistance, increased decay resistance, and/or higher weather resistance as compared to untreated wood.

In one embodiment, wood can be acetylated in a wood acetylation reactor. Acetylation can include replacement of surface or near-surface hydroxyl groups with acetyl groups. In one embodiment, the treatment agent utilized during acetylation can comprise acetic anhydride in a concentration of at least about 50 weight percent, at least about 60 weight percent, at least about 70 weight percent, at least about 80 weight percent, at least about 90 weight percent, at least about 98 weight percent, or about 100 weight percent, with the balance, if any, comprising acetic acid and/or one or more diluents or optional acetylation catalysts. In one embodiment, the treatment agent for acetylation can comprise mixtures of acetic acid and acetic anhydride having an anhydride-to-acid weight ratio of at least about 80:20, at least about 85:15, at least about 90:10, or at least about 95:5.

Prior to acetylation, the wood can be dried to reduce its moisture (e.g., water) content to no more than about 25 weight percent, no more than about 20 weight percent, no more than about 15 weight percent, no more than about 12 weight percent, no more than about 9 weight percent, or no more than about 6 weight percent using kiln drying, vacuum degassing, or other suitable methods. During acetylation, the wood can be contacted with the treatment agent via any suitable method. Examples of suitable contact methods can include, but are not limited to, vapor contacting, spraying, liquid immersion, or combinations thereof. In one embodiment, the temperature of the treatment vessel can be no more than about 50° C., no more than about 40° C., or no more than about 30° C., while the pressure can be at least about 25 psig, at least about 50 psig, at least about 75 psig and/or no more than about 500 psig, no more than about 250 psig, or no more than about 150 psig during the time the wood is contacted with the treatment agent.

Once the contacting step is complete, at least a portion of the liquid treatment agent, if present, can optionally be drained from the reactor and heat can be added to initiate and/or catalyze the reaction. In one embodiment, microwave energy, thermal energy, or combinations thereof can be introduced into the vessel in order to increase the temperature of the wood to at least about 50° C., at least about 65° C., at least about 80° C. and/or to no more than about 175° C., no more than about 150° C., or no more than about 120° C., while maintaining a pressure in the reactor of at least about 750 torr, at least about 1,000 torr, at least about 1,200 torr, or at least about 2,000 torr and/or no more than about 7,700 torr, no more than about 5,000 torr, no more than about 3,500 torr, or no more than about 2,500 torr. According to one embodiment, least a portion of the heat added to the reactor can be transferred to the wood from a non-microwave source, such as, for example, a hot vapor stream comprising at least about 50, at least about 75, at least about 90, or at least about 95 weight percent acetic acid, with the balance comprising acetic anhydride and/or diluents. In one embodiment, the hot vapor, a portion of which can condense on at least a portion of the bundle of wood being treated, is introduced into the reaction vessel for at least about 20 minutes, at least about 35 minutes or, at least about 45 minutes and/or no more than about 180 minutes, no more than about 150 minutes, or no more than about 120 minutes.

After the reaction step, the "chemically-wet" chemically-modified wood can comprise at least one chemical component capable of being removed by heat and/or vaporization. As used throughout this application, the terms "chemically-wet" or "chemical-wet" refers to wood containing one or more chemicals present at least partially in a liquid phase as a result of a chemical treatment or modification. A "chemically-wet" bundle of wood can refer to a bundle of wood of which at least a portion is at least partially chemically-wet. Some examples of the one or more chemicals can include reactants, impregnants, reaction products, or the like. For example, when wood is acetylated, at least a portion of the residual acetic acid and/or anhydride can be removed by vaporization. As used herein, the term "acid-wet" refers to wood containing residual acetic acid and/or anhydride. An "acid-wet" bundle of wood refers to a bundle of wood of which at least a portion is at least partially acid-wet. According to one embodiment of the present invention, the chemical-wet or acid-wet wood can comprise at least about 20 weight percent, at least about 30 weight percent, at least about 40 weight percent, or at least about 45 weight percent and/or no more than about 75 weight percent, no more than about 60 weight percent, or no more than about 50 weight percent of one or more heat-removable or vaporizable chemicals, such as, for example, acetic acid and/or anhydride. As used herein, the term "heat-removable" or "vaporizable" chemical component refers to a component that can be removed by heat and/or vaporization. In one embodiment, the vaporizable or heat-removable component or chemical can comprise acetic acid.

At least a portion of one or more heat-removable chemicals can then be removed via flash vaporization from the chemical-wet wood. In one embodiment, the flash vaporization step can be accomplished by reducing the pressure in the reactor from a pressure of at least about 1,000 torr, at least about 1,200 torr, at least about 1,800 torr, or at least about 2,000 torr and/or no more than about 7,700 torr, no more than about 5,000 torr, no more than about 3,500 torr, no more than about 2,500 torr, or no more than about 2,000 torr to atmospheric pressure. In another embodiment, the flash vaporization step can be accomplished by reducing the pressure of the reactor from an elevated pressure, as described above, or atmospheric pressure, to a pressure of no more than about 100 torr, no more than about 75 torr, no more than about 50 torr, or no more than about 35 torr. According to one embodiment, the amount of one or more heat-removable chemical components (e.g., the chemical content) remaining in the chemical-wet wood after the flash vaporization step can be at least about 6 weight percent, at least about 8 weight percent, at least about 10 weight percent, at least about 12 weight percent, or at least about 15 weight percent and/or no more than about 60 weight percent, no more than about 40 weight percent, no more than about 30 weight percent, no more than about 25 weight percent, no more than about 20 weight percent, or no more than about 15 weight percent.

According to one embodiment, a heating step can be carried out subsequent to the chemical modification step to further heat and/or dry the chemically-modified (or chemical-wet) wood to thereby provide a heated and/or dried bundle of chemically-modified wood. As used herein, a bundle or other article or material is referred to as "heated" simply as a convenience to indicate that a temperature of at least a portion of the bundle has been elevated above ambient temperature. Similarly, as used throughout this application, a bundle or other article or material is referred to as "dried" simply as a convenience to indicate that at least some heat-removable chemicals have been removed from at least a portion of the bundle by, in some embodiments, heating. In one embodiment, the heating step can be operable to further reduce the level of one or more heat-removable chemical components present in the wood. The energy source utilized during the heating step can be any source of radiative, conductive, and/or convective energy suitable for heating and/or drying wood. In one embodiment, the heater can be a microwave heater employing a microwave energy. In another embodiment, another heat source can be utilized to directly or indirectly (via, for example, a hot gas injection, a jacketed or heat-traced vessel, or other means) heat at least a portion of the vessel, such as, for example, one or more side walls. In this embodiment, the side walls can be heated to a temperature of at least about 45°, at least about 55° C., or at least about 65° C. and/or not more than about 115° C., not more than about 105° C., or not more than about 95° C. The heating step can be carried out under any suitable conditions, including pressures above, at, or near atmospheric pressure. Specific embodiments of various heating systems suitable for use in producing chemically-modified and/or thermally-modified wood will be discussed in detail shortly.

The heating step can be carried out such that at least about 50 percent, at least about 65 percent, at least about 75 percent, or at least about 95 percent of the total amount of the one or more heat-removable chemical components remaining in the chemical-wet wood is removed. In one embodiment, this can correspond to at least about 100 pounds, at least about 250 pounds, at least about 500 pounds, or at least about 1,000 pounds of total liquid removed. As a result of the heating step, in one embodiment, the heated or dried chemically-modified wood can comprise no more than about 5 weight percent, no more than about 4 weight percent, no more than about 3 weight percent, no more than about 2 weight percent, or no more than about 1 percent, based on the initial (pre-heated) weight of the bundle, of the one or more heat-removable chemicals (e.g., acetic acid). In addition, the heated or dried chemically-modified wood can have a water content of no more than about 6 weight percent, no more than about 5 weight percent, no more than about 3 weight percent, no more than about 2 weight percent, or no more than about 1 weight percent, or no more than about 0.5 weight percent based on the initial (pre-heated) weight of the wood. In one embodiment, the wood can have a water content of approximately 0 percent subsequent to the heating step.

Figure 2:
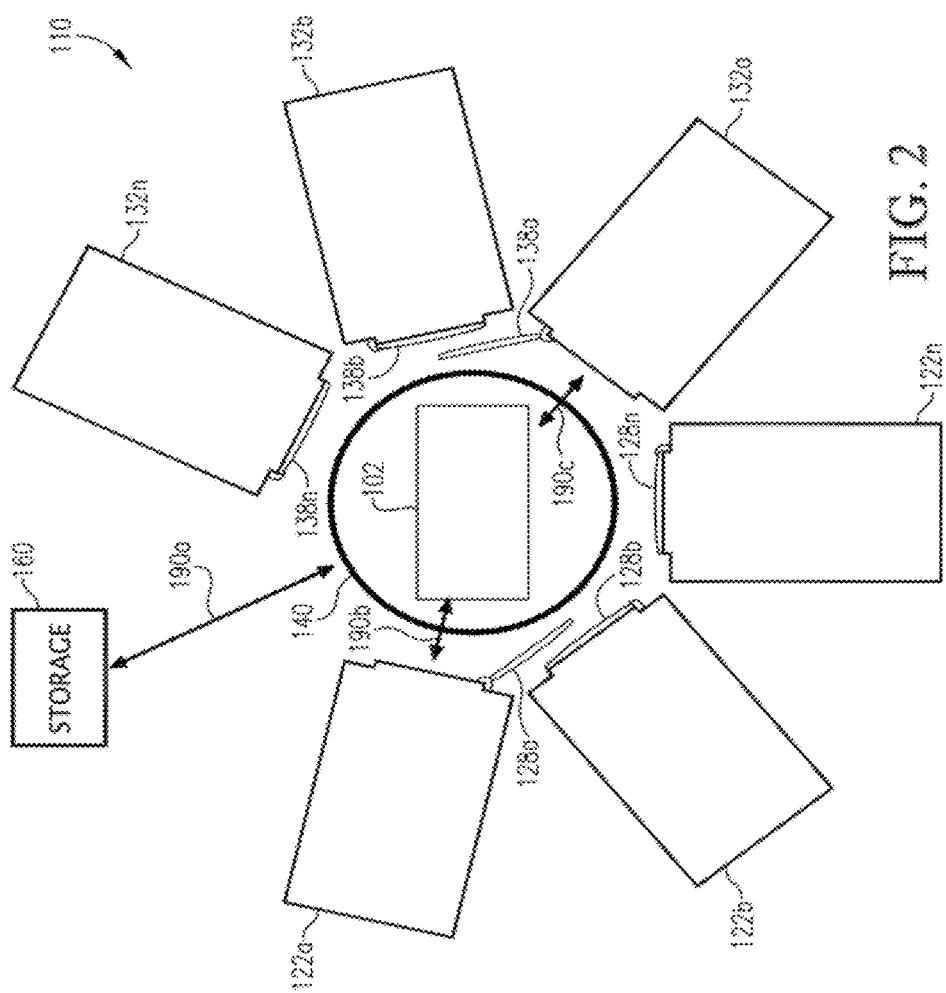
FIG. 2 is a top view of a wood treatment system configured in accordance with an alternative embodiment of the present invention, particularly illustrating a turntable system for transporting bundles of wood to and from a plurality of chemical modification reactors and a plurality of wood heaters.
Figure 3:
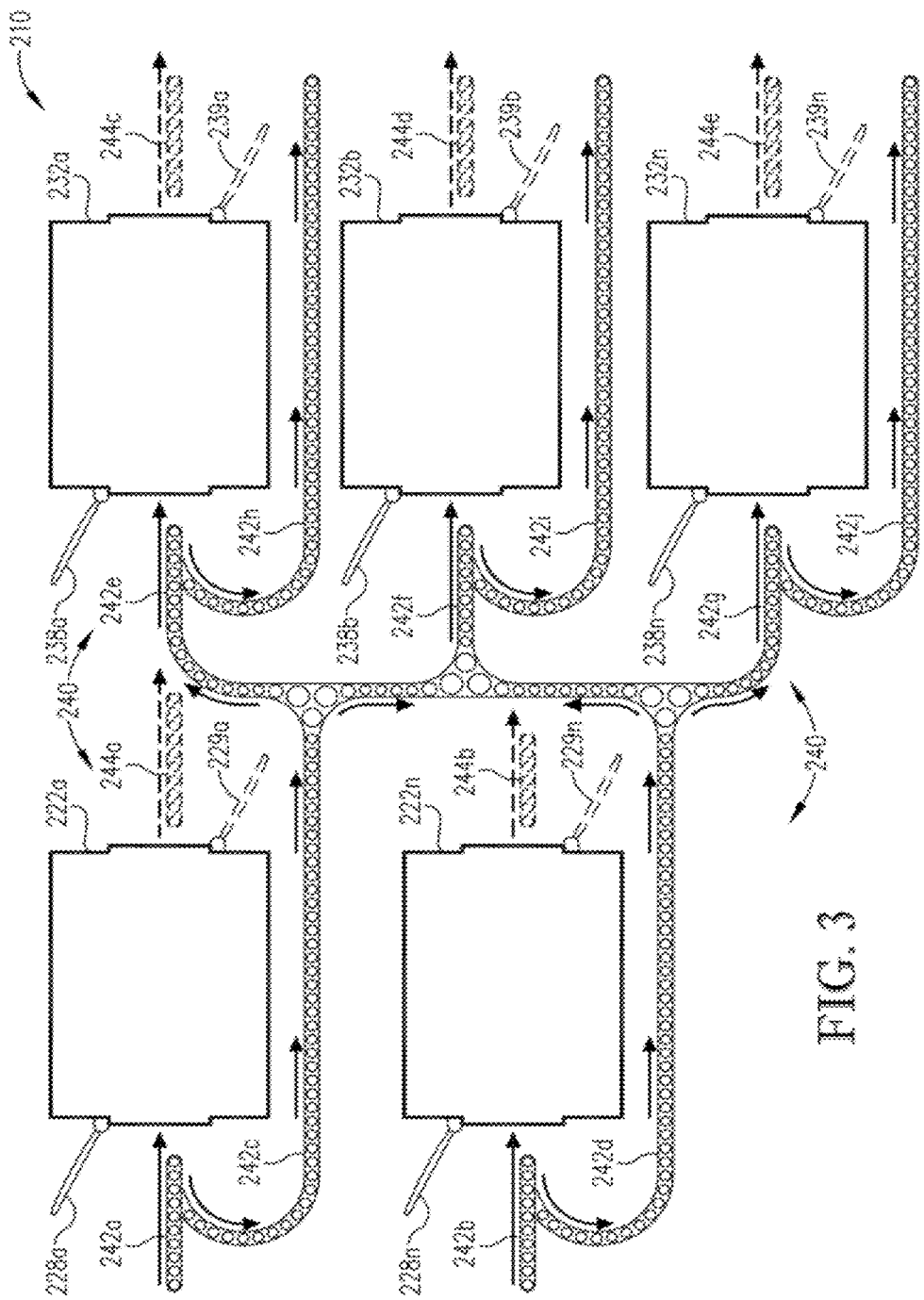
FIG. 3 is a top view of a wood treatment system configured in accordance with an alternative embodiment of the present invention, particularly illustrating a roller system for transporting bundles of wood to and from a plurality of chemical modification reactors and a plurality of wood heaters.

In one embodiment, the chemical modification step and the heating step can take place in a single vessel. In another embodiment, the chemical modification step and the heating step can be carried out in separate vessels, such that the internal volumes of the chemical modification reactor and the heater are locationally distinct. As used herein, the "internal volume" of a vessel refers to the entirety of the space encompassed by the vessel, including any volume defined by or within the door or doors of the vessel when closed. As used herein, the term "locationally distinct" means that the internal volumes are not overlapping. When the chemical modification reactor and heater comprise separate vessels, various types of wood transportation systems can be utilized in order to transport the wood between the two vessels. In one embodiment, the transportation system can comprise rails (as illustrated in FIG. 1), tracks, belts, hooks, rollers (as illustrated in FIG. 3), bands, carts, motorized vehicles, fork trucks, pulleys, turntables (as illustrated in FIG. 2), and any combination thereof. Various embodiments of wood treatment facilities capable of producing chemically-modified and/or thermally-modified wood will now be discussed in detail, with respect to FIGS. 1-3.

Referring now to FIG. 1, one embodiment of a wood treatment facility 10 is illustrated as comprising a chemical modification system 20, a heating system 30, a transportation system 40, and raw and finished material storage areas 60a,b. Chemical modification system 20 comprises a chemical modification reactor 22, a reactor heating system 24, and an optional reactor pressurization/depressurization system 26. Heating system 30 comprises a heater 32, an energy source 34, and an optional heater pressurization/depressurization system 36. Transportation system 40 comprises a plurality of transport segments 42a-e for transporting wood between storage areas 60a,b, reactor 22, and heater 32, as described in detail below.

In operation, one or more bundles of wood can be removed from raw material storage area 60a via transport segment 42a. Although illustrated in FIG. 1 as comprising tracks or rails, it should be understood that transport segment 42a can comprise any type of transportation mechanism suitable for moving wood between storage area 60a and reactor 22. As shown in FIG. 1, the wood can then be introduced or loaded into reactor 22 via an open reactor entrance door 28. Thereafter, first reactor entrance door 28 can be closed in order to allow the wood disposed within reactor 22 to be chemically-modified according to one or more processes described above.

Once the reaction is complete, the chemical-wet wood can be withdrawn from reactor 22 and be transported to heater 32. According to one embodiment, the chemical-wet wood can be removed from reactor 22 via reactor entrance door 28 and transported to heater 32 via transport segment 42b. In another embodiment, the wood can be removed via an optional reactor exit door 29 and transported to heater 32 via transport segment 42c, as shown in FIG. 1. The chemical-wet wood can then be introduced or loaded into heater 32 via an open heater entrance door 38, which can then be closed to thereby form a fluid seal between heater entrance door 38 and the body of heater 32 prior to initiating the heating of the wood. When optional reactor and heater exit doors 29, 39, are present, exit doors 29, 39 can be located on generally opposite ends of reactor 22 and heater 32 than respective reactor and heater entrance doors 28, 38.

In various embodiments, during the heating of the wood within heater 32, pressurization system 36 can be used to maintain a pressure within heater 32 of no more than about 550 torr, no more than about 450 torr, no more than about 350 torr, no more than about 250 torr, no more than about 200 torr, no more than about 150 torr, no more than about 100 torr, or no more than about 75 torr. In one embodiment, the vacuum system can be operable to reduce the pressure in heater 32 to no more than about 10 millitorr ($10^{-3}$ torr), no more than about 5 millitorr, no more than about 2 millitorr, no more than about 1 millitorr, no more than about 0.5 millitorr, or no more than about 0.1 millitorr. In addition, when heater 32 comprises a microwave heater, one or more features described in detail shortly, including for example, an optional microwave choke, one or more microwave launchers, and the like can be used to introduce energy into the interior of heater 32, thereby heating and/or drying at least a portion of the bundle of wood contained therein.

According to one embodiment, the wood treatment facility 10 can comprise multiple reactors and/or heaters. Any number of reactors and/or heaters can be employed, and the reactors and/or heaters can be arranged in any suitable configuration. For example, wood treatment facility 10 can utilize at least 1, at least 2, at least 3, at least 5 and/or no more than 10, no more than 8, or no more than 6 reactors and/or heaters. When multiple reactors and/or heaters are employed, the vessels can be paired in any suitable combination or ratio. For example, the ratio of reactors to heaters can be 1:1, 1:2, 2:1, 1:3, 3:1, 2:3, 3:2, 1:4, 4:1, 4:2, 2:4, 3:4, 4:3 or any feasible combination. According to one embodiment, one or more of reactors and/or heaters can comprise separate entrance and exit doors, while, in another embodiment, one or more of the reactors and/or heaters can comprise a single door for loading and unloading wood. In one embodiment, the heated and/or dried wood can be removed from heater 34 via heater entrance door 38, and transported to storage area 60b via transport segment 42d. Alternatively, the wood can be withdrawn via an optional heater exit door 39, if present, and transported via segment 42e to storage area 60b, as illustrated in FIG. 1. Various configurations of wood treatment facilities employing multiple reactors and heaters configured according to several embodiments of the present invention will be described briefly with respect to FIGS. 2 and 3.

Turning now to FIG. 2, a wood treatment facility 110 configured according to one embodiment of the present invention is illustrated. Wood treatment facility 110 comprises a plurality of reactors illustrated as 122a, 122b, 122n and plurality of heaters illustrated as 132a, 132b, 132n. According to one embodiment, each of the reactors 122a, 122b, 122n and each of the heaters 132a, 132b, 132n comprise a single door 128a, 128b, 128n, 138a, 138b, 138n, for selectively permitting the passage of wood into and out of each vessel. In addition, wood treatment facility 110 can comprise a rotatable platform (illustrated as a turntable 140) operable to position a bundle of wood 102 such that it can be transported between reactors 122a, 122b, 122n, heaters 132, 132b, 132n, and a storage area 160, in various directions generally indicated by arrows 190a-c.

Referring now to FIG. 3, another embodiment of a wood treatment facility 210 is shown as comprising a plurality of chemical modification reactors illustrated as 222a, 222n and a plurality of heaters illustrated as 232a, 232b, 232n. As shown in FIG. 3, each of the reactors comprises a respective reactor entrance door 228a, 228n and an optional reactor exit door 229a, 229n. Similarly, each of the heaters 232a, 232b, 232n comprises a heater entrance door 238a, 238b, 238n and an optional heater exit door 239a, 239b, 239n. Transportation system 240 shown in FIG. 3 comprises a plurality of segments 242a-j and 244a-e operable to transport wood to, from, and between reactors 222a, 222n and heaters 232a, 232b, 232n. Although illustrated as comprising continuous belt segments, transportation system 240 can comprise one or more segments comprising any suitable transportation mechanism, as discussed in detail previously.

According to one embodiment, in operation, wood loaded into first reactor 222a via transport segment 242a can be introduced through reactor entrance door 228a. Once the chemical modification process is complete, chemical-wet wood can be removed from reactor 222a via reactor entrance door 228a and can subsequently be transported to one of heaters 232a, 232b, or 232n via respective transport segments 242e, 242f, 242g. In an alternative embodiment, wood removed from reactor 222a can be removed through reactor exit door 229a via transport segment 244a prior to being transported to heater 232a, 232b, or 232n as described previously. In addition, wood treated in reactor 222n can be loaded, chemically-modified, and transported to one of heaters 232a, 232b, 232n, in a similar manner as previously described.

Thereafter, the bundle or bundles of chemically-wet wood transported to heaters 232a, 232b, and 232n can be heated and/or dried according to one or more methods described herein. In one embodiment, at least one of heaters 232a, 232b, and 232n can comprise a microwave heater. Once the heating step is completed, heated and/or dried bundles can be withdrawn from heaters 232a, 232b, and 232n via respective entrance doors 238a, 238b, 238n, or, optionally, from respective exit doors 239a, 239b, 239n, when present. Subsequently, the modified bundles can be transported to subsequent processing and/or or storage via transport segments 242h,i,j or 244c,d,e, depending on whether the bundles were removed from heater entrance doors 238a, 238b, 238n or heater exit doors 239a, 239b, 239n.

The chemical modification process previously discussed can be carried out at any suitable scale. For example, the above-described wood treatment facilities can comprise lab-scale, pilot plant-scale, or commercial-scale wood treatment facilities. In one embodiment, the wood treatment facility used to produce chemically-modified and/or thermally-modified wood can be a commercial-scale facility having an annual production capacity of at least about 500,000 board feet, at least about 1 million board feet, at least about 2.5 million board feet, or at least about 5 million board feet. As used herein, the term "board feet" refers to a volume of wood expressed in units measuring 144 cubic inches. For example, a board having dimensions of 2 inches by 4 inches by 36 inches has a total volume of 288 cubic inches, or 2 board feet. In various embodiments, the internal volume of a single chemical modification reactor (i.e., the "internal reactor volume") and/or the internal volume of a single heater (i.e., the "internal heater volume") can be at least about 100 cubic feet, at least about 500 cubic feet, at least about 1,000 cubic feet, at least about 2,500 cubic feet, at least about 5,000 cubic feet, or at least about 10,000 cubic feet in order to accommodate commercial-scale operation.

Even when carried out on a commercial scale, chemical and/or thermal modification processes as described herein can be carried out with relatively short overall cycle times. For example, according to one embodiment, the total cycle time of the chemical and/or thermal modification processes carried out using one or more systems of the present invention, measured from the time the modification step is initiated to the time the heating step is completed, can be no more than about 48 hours, no more than about 36 hours, no more than about 24 hours, or no more than about 12 hours, no more than about 10 hours, no more than about 8 hours, or no more than about 6 hours. This is in contrast to many conventional wood treatment processes, which can have overall cycle times that last several days or even weeks.

In accordance with one embodiment of the present invention, wood treatment facilities of the present invention can comprise one or more vapor containment rooms and/or ventilation structures for substantially isolating the external environment (i.e., the environment immediately outside the chemical modification reactor and the heater) from the chemically-wet chemically-modified wood during transport of the wood. The vapor containment rooms and/or ventilation structures can be connected to a ventilation system that removes at least a portion of the gaseous environment out of the containment/ventilation area, thereby minimizing leakage one or more undesirable vapor-phase chemicals into the external environment. Additional details and one embodiment of a wood treatment facility employing vapor containment rooms and/or ventilation structures will now be described in greater detail with respect to FIGS. 4a-d.

Figure 4:
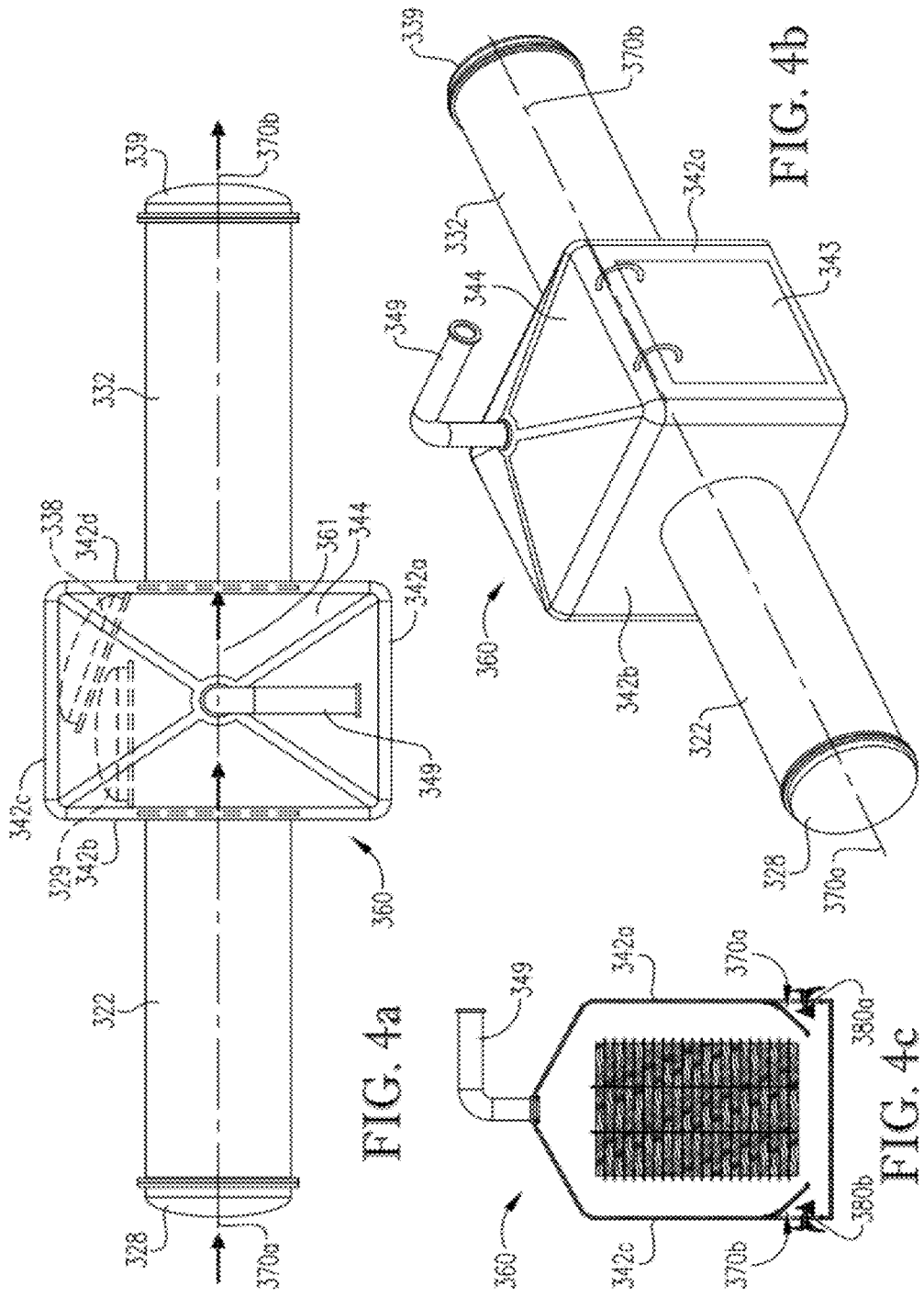
FIG. 4a is a top view of a pass-through wood treatment system suitable for use in producing chemically-modified wood and configured in accordance with one embodiment of the present invention, particularly illustrating a chemical modification reactor and a wood heater that comprise separate, axially-aligned, two-door vessels and include a vapor containment room located between the reactor and heater vessels.
FIG. 4b is an isometric view of the pass-through wood treatment system of FIG. 4a, particularly illustrating an exemplary blast panel/wall of the vapor containment room.
FIG. 4c is a sectional view of the vapor containment room depicted in FIGS. 4a and 4b, particularly illustrating an exemplary pair of one-way vents for allowing fluid (e.g., air) from the external environment to flow into the vapor containment room.
FIG. 4d is a side view of the pass-through wood treatment system of FIG. 4a, but also illustrating a ventilation system for drawing vapors and gasses in through the vapor containment room and in through a product vapor removal structure located at the outlet of the heater.

FIG. 4a is a top view of a vapor containment room 360 coupled to a chemical modification reactor 322 and a heater 332. Vapor containment room 360 can be operable to partially, or almost completely, isolate the external environment from a chemically-modified bundle of wood as the wood is transported from chemical modification reactor 322 to heater 332 via a transfer region 361 located between reactor 322 and heater 332. As used herein, the term "isolate" refers to the inhibition of fluid communication between one or more areas, zones, or regions. According to one embodiment, vapor containment room 360 can be coupled to a ventilation system (not shown in FIG. 4a) operable to remove at least a portion of the vapor and gases from the interior of vapor containment room 360, thereby reducing, minimizing, or preventing leakage of one or more heat-removable chemical components contained within the interior of reactor 322, within the interior of heater 332, and/or from the chemically-modified bundle of wood to the external environment.

In one embodiment, chemical modification reactor 322 can comprise a reactor entrance door 328 for receiving a bundle of wood from an external environment and a reactor exit door 329 for discharging the bundle of wood from chemical modification reactor 322 after chemical modification. In addition, heater 332 can comprise a heater entrance door 328 for receiving the bundle of chemically-modified, chemical-wet wood discharged from chemical modification reactor 322. According to one embodiment, heater 332 can also include a heater exit door 339 separate from heater entrance door 338 for discharging a bundle of wood from heater 332. In one embodiment, respective reactor and heater entrance doors 328, 338 and reactor or heater exit doors 329, 339, when present, can be positioned on a generally opposite end of reactor 322 or heater 332 such that the respective central axes of elongation of reactor 322 and heater 332, represented as axes 370a,b in FIG. 4b, can extend through respective entrance 328, 338 and exit 329, 339 doors. In one embodiment, reactor 322 and heater 332 are axially aligned with one another such that the central axes of elongation 370a,b in FIG. 4b, are substantially aligned with one another, while, in other one embodiment, axes 370a,b can be parallel to each other. As used herein, the term "substantially aligned" refers to two or more vessels configured such that the maximum acute angle formed between the intersection of their respective central axes of elongation is not more than about 20°. In some embodiments, the maximum acute angle between the intersection of the two axes of elongation of substantially aligned vessels can be not more than about 10°, not more than about 5°, not more than about 2°, or not more than about 1°. In some embodiments, reactor 322 and heater 332 can be arranged in a side-by-side configuration (not shown).

According to one embodiment shown in FIG. 4a, vapor containment room 360 can be sealingly coupled to reactor 322 and heater 332 such that the external environment is substantially isolated from transfer region 361 during transport of the bundle of wood from reactor 322 to heater 332. As used herein, the term "sealingly coupled" refers to two or more objects attached, fastened, or otherwise associated such that leakage of fluid is substantially reduced or nearly prevented from the junction of such objects. In one embodiment, reactor entrance door 328 and/or heater exit door 339, when present, can open to the external environment, while reactor exit door 329 and/or heater entrance door 338 can open to the interior of vapor containment room 360, thereby isolating the external environment from vapor or gases from chemical reactor 322, heater 332, and/or the bundle of chemical-wet wood during transport between reactor 322 and heater 332 via transfer region 361.

Vapor containment room 360 can be configured in any manner suitable manner. In one embodiment depicted in FIGS. 4a and 4b, vapor containment room 360 comprises four generally upright walls 342a-d coupled to a ceiling structure 344 and a floor (not shown). Although illustrated in FIGS. 4a and 4b as being generally attached to ceiling structure 344, a vapor outlet conduit 349 for removing vapors and gases from the interior of vapor containment room 360 could alternatively be attached to one of walls 342a-d or to the floor. Additional details regarding the removal of vapors and gases from vapor containment room 360 will be described in more detail shortly.

In one embodiment of the present invention, at least one of walls 342a-d can comprise at least one blast panel or blast wall 343 for controlling the direction of a pressure release in the event of an explosion or rapid pressurization within vapor containment room 360. In one embodiment, blast panel 343 can be attached to the ceiling 344 and/or floor (not shown) of vapor containment room 360. Blast panel or wall 343 can be hinged, tethered, or otherwise fastened to another structure of vapor containment room 360 in order to prevent or reduce the likelihood that blast panel or wall 343 will be freely projected at an undesirable velocity away from vapor containment room 360 by an explosion. Blast panel or wall 343 can have a substantially solid surface, as shown in FIG. 4b, or can comprise a plurality of slats or slots (not shown). Typically, the sections of walls 342a-d that are not blast panels/walls 343 are construction of a high-strength materials such as, for example, precast concrete panels, concrete blocks, or steel panels. Although illustrated herein as having four walls, it should be understood that vapor containment rooms having various other shapes can also be employed.

As depicted in FIG. 4c, vapor containment room 360 can be equipped with one or more vents 370a,b for selectively permitting fluid flow from the external environment into the interior of vapor containment room 360. In one embodiment, vents 370a,b are one-way vents that permit fluid flow from the external environment into vapor containment room 360, as indicated by arrows 380a,b in FIG. 4c, but reduce, inhibit, or substantially prevent fluid flow from the interior of vapor containment room 360 out into the external environment. Examples of external fluids that can flow into vapor containment room 360 via vents 370a,b include ambient air or one or more inert gases such as nitrogen.

In one embodiment, vents 370a,b, can be configured to maintain a predetermined pressure difference between the interior of vapor containment room 360 and the external environment. By maintaining a predetermined pressure difference between the interior of vapor containment room 360 and the external environment, vents 370a,b can control the rate at which a fluid from the external environment is drawn into vapor containment room 360. To maintain a relatively constant pressure difference between the interior of vapor containment room 360 and the external environment, vents 370a,b can be equipped with a control mechanism (e.g., an electronic actuator, a hydraulic actuator, a pneumatic actuator, or a mechanical spring) for varying the degree of openness of vents 370a,b based on the pressure difference across vents 370a,b. When the pressure difference between the external environment and the interior of the vapor containment room 360 is too high, vents 370a,b open wider, and, analogously, when the pressure difference is too low, vents 370a,b move towards a closed position. In one embodiment, vents 370a,b, can be spring loaded and biased towards the closed position, so that when the pressure difference between the vapor containment room 360 and the external environment is below a threshold value, vents 370a,b are closed, but when the pressure in vapor containment room 360 is lower than the pressure of the external environment by an amount exceeding the threshold pressure difference value, vents 370a,b open to allow an external fluid to be drawn into vapor containment room 360.

Further, when vents 370a,b are spring loaded, the vents help maintain a substantially constant pressure difference between the interior of vapor containment room 360 and the external environment by automatically opening wider when the pressure difference is high and automatically moving towards the closed position when the pressure difference is low. In one embodiment, vapor containment room 360 is maintained at a sub-atmospheric pressure during transport and can be maintained at a vacuum of at least about 0.05 inches of water, at least about 0.1 inches of water, or at least about 0.15 inches of water and/or no more than about 10 inches of water, no more than about 1 inch of water, or no more than about 0.5 inches of water. In one embodiment, vents 370a,b, are configured to permit fluid from the external environment (e.g., ambient air) to be drawn into vapor containment room 360 at a rate that causes at least about 2, at least about 4, or at least about 5 exchanges per hour to be drawn out of vapor containment room 360, where one exchange is equal to one volume of vapor containment room 360. As used herein, the term "exchanges per hour" refers to the total number of times per hour that the total volume of fluid in the system is replaced, calculated by dividing the volumetric flow rate of vapor removed from the system by the total system volume.

In one embodiment, the size of vapor containment room 360 can be such that the reactor and heater 322, 332 (e.g., positioning the internal volumes of the reactor and heater) are spaced apart from each other by a distance that is at least about 2 feet, at least about 4 feet, or at least about 6 feet and/or no more than about 50 feet, no more than about 30 feet, or no more than about 20 feet. In one embodiment, the length of the vapor containment room can be the same as, or substantially the same as, the distance between reactor 322 and heater 332. According to one embodiment, the ratio of the length of vapor containment room 360 to the total length of reactor 322 and/or the total length of heater 332 can be at least about 0.1:1, at least about 0.2:1, or at least about 0.3:1 and/or no more than about 1:1, no more than about 0.6:1, or no more than about 0.5:1. When the space between reactor 322 and heater 332 is minimized, reactor exit door 329 and heater entrance door 338 may be capable of contacting one another during opening. In such an embodiment, reactor exit door 329 and heater entrance door 338 can be configured to nest/overlap with one another (but not contact one another) when they are both fully opened.

FIG. 4d is a side view of a wood treatment facility 416 comprising a reactor 322, a heater 332, and a vapor containment room 360 disposed therebetween. FIG. 4d additionally depicts an embodiment that employs a product vapor removal system or structure 400 located near exit door 339 of heater 332. Product vapor removal system 400 can be configured to transport vapors out of and away from the area near exit door 339 of heater 332 (e.g. the recovery room). This configuration can substantially reduce and, in some embodiments can nearly prevent escape of vapors from the chemically-treated bundle of wood exiting heater 332 and/or from vapors exiting reactor 322 and/or heater 332 to the external environment. As shown in FIG. 4d, both vapor containment room 360 and product vapor removal system 400 can be connected or otherwise operably coupled to a common ventilation system 402. Ventilation system 402 is used to draw vapors and gases out of vapor containment room 360 and/or through product vapor removal system 400. Although FIG. 4d illustrates one common ventilation system 402 being used for both vapor containment room 360 and product vapor removal system 400, it is possible to use individual ventilation systems for each containment/ventilation area of the wood treatment facility.

In the embodiment depicted in FIG. 4d, product vapor removal system 400 comprises a ventilation hood 404 and a ventilation room 406 disposed between ventilation hood 404 and heater 332. Ventilation hood 404 and ventilation room 406 can be connected to ventilation system 402, which draws vapor out of ventilation hood 404 and/or ventilation room 406. Ventilation room 406 can be configured to receive a bundle of chemically-modified wood through heater exit door 339, which opens into ventilation room 406.

Ventilation room 406 can be equipped with a ventilation room exit 408 through which the chemically-modified wood passes to a cooling location below ventilation hood 404. In one embodiment, ventilation room exit 408 can be equipped with a door 409 that, when closed, substantially isolates the external environment from the interior of ventilation room 406. When ventilation room is equipped with such a door, ventilation room may also be equipped with vents (not shown) similar to vents 370a,b of vapor containment room 360, described previously with reference to FIG. 4c. However, in another embodiment, ventilation room exit 408 is configured to constantly permit passage of fluid from the external environment into the interior of ventilation room 406. In such an embodiment, ventilation room exit 408 can be entirely open so as to permit free flow of fluid therethrough. Alternatively, ventilation room exit 408 can be partially covered with a flexible material (e.g., a hanging VISQUEEN sheet or strips of VISQUEEN) that permits passage of the bundle of chemically-treated wood therethrough, but that at least partially inhibits free flow of fluid therethrough. In one embodiment of the present invention, ventilation room 406 can be entirely eliminated and ventilation hood 404 can be positioned adjacent exit door 339 of heater 332.

As shown in FIG. 4d, ventilation system 402 can include one or more vacuum generators 410, a treatment device 412, a flow diverter 414, and a plurality of vapor outlet conduits 349a-c. Vacuum generator 410 can be operable to draw vapor out of vapor containment room 360, ventilation hood 404, and/or ventilation room 406 via outlet conduits 349a,b,c, respectively. Treatment device 412 can be operable to remove or to change the composition of at least a portion of one or more components from the vapors drawn out of vapor containment room 360, ventilation hood 404, and/or ventilation room 406 via vacuum generator 410. Examples of suitable treatment devices can include, but are not limited to, scrubbers, thermal oxidizers, catalytic oxidizers or other catalytic processes, and/or precipitators.

According to one embodiment, flow diverter 414 can be operable adjust the total ventilation capacity of vacuum generator 410 by, for example, directing the vapor flow amongst vapor outlet conduits 349a,b,c thereby distributing the total ventilation capacity of ventilation system 402 between vapor containment room 360, and product vapor removal structure (e.g., ventilation hood 404, and/or ventilation room 406). As used herein, the term "total ventilation capacity" refers to the maximum volume of vapors removable from the system via a vacuum generator or other source, expressed as a time-based rate. Distribution of the total ventilation capacity amongst vapor containment room 360, ventilation hood 404, and/or ventilation room 406 may be advantageous, for example, to accommodate the various steps of a chemical modification treatment. In one embodiment, flow diverter 414 can be operable to evenly distribute the total ventilation capacity, represented generically as "X", such that ⅓X is provided to vapor containment room 360, ⅓X is provided to ventilation hood 404, and ⅓X is provided to ventilation room 406. In another exemplary embodiment, flow diverter 414 can allocate more ventilation capacity to one of the three areas, such as, for example vapor containment room 360, so that ⅔X is provided to vapor containment room 360, ⅙X is provided to ventilation hood 404, and ⅙X is provided to ventilation room 406.

One embodiment of the operation of wood treatment facility 416 will now be described in detail, with respect to FIG. 4d. A first bundle of wood, represented herein by the letter "C," can be loaded into chemical modification reactor 322 via reactor entrance door 328 and chemically treated. Simultaneously, a second bundle of wood, represented here by the letter "B," can be introduced into heater 332 via heater entrance door 338 and heated and/or dried. While bundles C and B are being chemically-modified and heated/dried in chemical modification reactor 322 and heater 332, respectively, a third bundle of wood, represented herein with the letter "A", can be removed from ventilation room 406 and positioned under ventilation hood 404, as generally shown in FIG. 4d.

Once bundle A has been sufficiently dried, it can be removed from ventilation hood 404 and transported to a storage area (not shown). Then, the allocation of the total ventilation capacity of ventilation system 402 can be adjusted using flow diverter 414 such that amount of ventilation capacity allocated to vapor containment room 360 is increased, while the amount of ventilation capacity allocated to ventilation hood 404 is decreased. Next, after completion of the heating of bundle "B", heater entrance and exit doors 338, 339 can be opened consecutively and any residual vapor or gas present in the interior of heater 332 can be removed and passed through vapor containment room 360 before entering ventilation system 402. In one embodiment, this evacuation of heater 332 can also comprise drawing an external fluid (e.g., ambient air or other inert gas) into the system through ventilation hood 404 and ventilation room 406, when present. The external fluid can then enter heater 332 via heater exit door 339 and pass through the interior of heater 332, before exiting heater 332 via heater entrance door 338 and passing into vapor containment room 360. Once in vapor containment room 360, the external fluid, along with any residual vapor or gas removed from the interior of heater 332, can be withdrawn from vapor containment room 360 by way of ventilation system 402 at a rate of at least about 2 exchanges per hour, at least about 4 exchanges per hour, or at least about 6 exchanges per hour. For example, if the ventilation system had a total volume of 100 cubic meters and the rate of vapor removal was 200 cubic meters per hour, the exchanges per hour would be (200 cubic meters per hour)/(100 cubic meters) or 2 exchanges per hour.

Once the external fluid and residual vapor/gas has been removed from vapor containment room 360, bundle B can be removed from heater 332 via heater exit door 339, passed through ventilation room 406 (if present), and positioned under ventilation hood 404 to cool and/or further dry bundle B, as discussed in detail previously. Heater exit door 339 can then be closed before reactor exit door 329 and reactor entrance door 328 are sequentially opened. Thereafter, ventilation system 402 can be used to evacuate residual vapor or gas from the interior of chemical modification reactor 322. In one embodiment, an external fluid (e.g., ambient air or other inert gas) can be drawn into reactor 322 via reactor entrance door 328 and pass through the interior of reactor 322 before exiting into vapor containment room 360 via reactor exit door 329. As described above, the external fluid and any residual vapors or gases can then be withdrawn from vapor containment room 360 via vapor outlet conduit 349a at a rate of at least about 2 exchanges per hour, at least about 4 exchanges per hour, or at least about 6 exchanges per hour.

Thereafter, bundle C can be removed from chemical modification reactor 322 via reactor exit door 329 and passed through vapor containment room 360 along a transport path 399. In one embodiment, product ventilation system 402 can be used to draw gases and vapors from vapor containment room 360 during the transportation of the bundle between reactor 322 and heater 332. Chemically-wet bundle C can then be introduced into the interior of heater 332 via heater entrance door 338, prior to initiating heating of bundle C. Next, a fourth bundle (not shown) can be loaded into the interior of chemical modification reactor 322 before closing, in sequence, reactor entrance door 328, reactor exit door 329, and heater entrance door 338. The allocation of total ventilation capacity to vapor containment room 360 can be decreased, while increasing the allocation to ventilation hood 404, to thereby cool and/or further dry bundle B. A fifth bundle (not shown) can be assembled, either in a loading area (not shown) or near reactor entrance door 328 before repeating the above-referenced steps to process a new sequence of wood bundles.

It should be understood that, in the above-described operational sequence, some steps can preferably be carried out in the order described, while some steps can be carried out simultaneously and/or the order of some steps can be switched. The above sequence of steps is included simply to describe one exemplary method of operating wood treatment system 416.

Microwave Heating Systems

According to one embodiment, one or more of the heating systems described above can comprise microwave heating systems that utilize microwave energy to heat one or more objects or items. In addition to one embodiment of the wood treatment facilities described above, microwave heating systems configured according to one embodiment of the present invention have wide applicability to a variety of other processes. It should be understood that, while predominantly described herein with respect to processes for heating "wood" or a "bundle of wood," the processes and systems described herein are equally applicable to applications wherein one or more articles, objects, or loads are heated. Examples of other types of application that can utilize microwave heating systems as described herein can include, but are not limited to, high temperature vacuum ceramic and metal sintering, melting, brazing, and heat treating of various materials. In one embodiment, the microwave heating system can include a vacuum system (e.g., a microwave vacuum heater) and can be utilized for vacuum drying of materials such as minerals and semiconductors, vacuum drying of foodstuffs such as fruits and vegetables, vacuum drying of ceramic and fibrous molds, as well as vacuum drying of chemical solutions.

Figure 5:
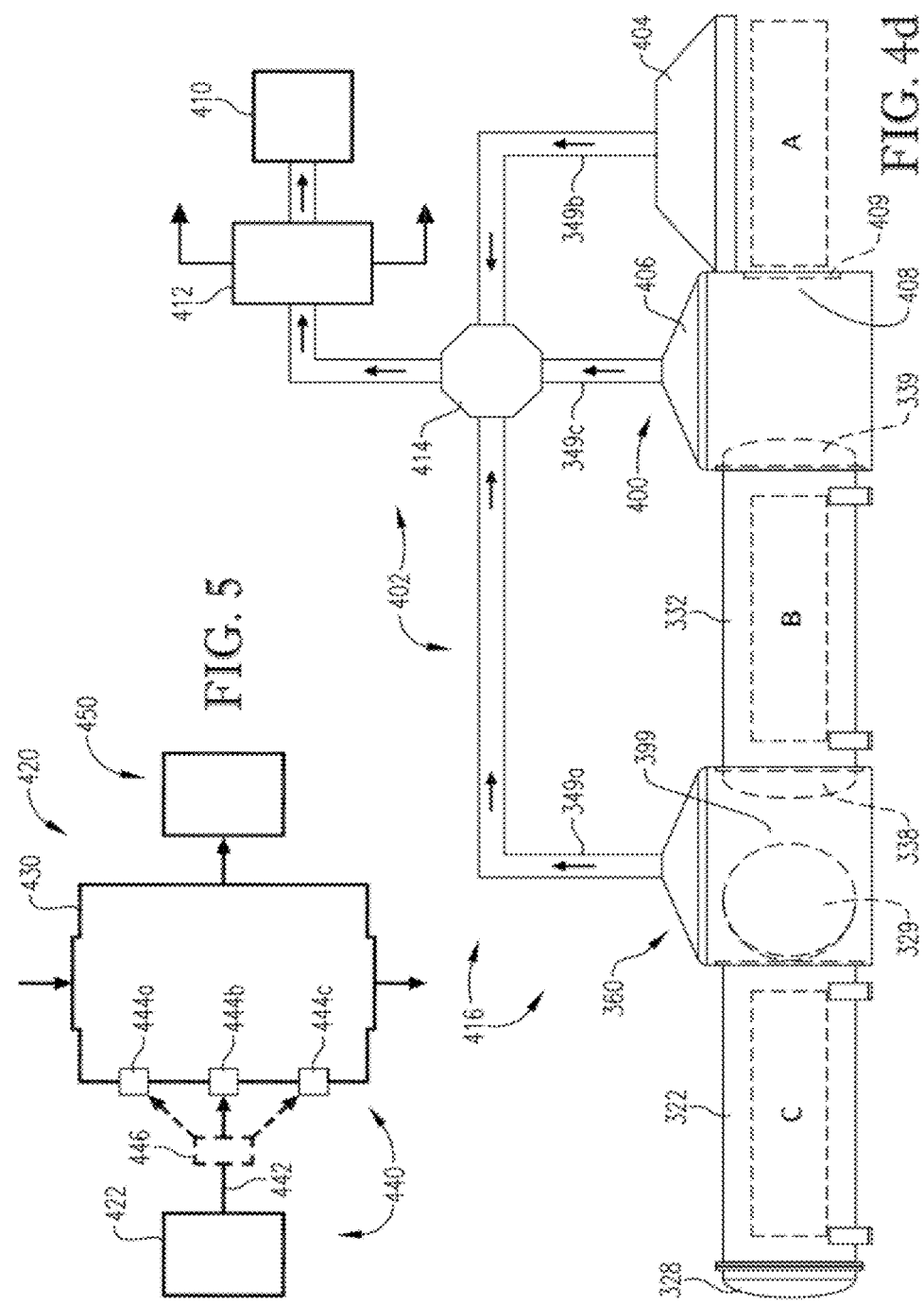
FIG. 5 is a schematic view of a microwave heating system configured in accordance with one embodiment of the present invention, particularly illustrating a microwave heater that is equipped with a vacuum system and receives microwave energy from a microwave generator via a microwave distribution system.

Turning now to FIG. 5, a microwave heating system 420 configured according to one embodiment of the present invention is illustrated as comprising at least one microwave generator 422, a microwave heater 430, a microwave distribution system 440, and an optional vacuum system 450. Microwave energy produced by microwave generator 422 can be directed to microwave heater 430 via one or more components of microwave distribution system 440. Additional details regarding components and operation of microwave distribution system 440 will be discussed in detail shortly.

When present, vacuum system 450 can be operable to reduce the pressure in microwave heater 430 to no more than about 550 torr, no more than about 450 torr, no more than about 350 torr, no more than about 250 torr, no more than about 200 torr, no more than about 150 torr, no more than about 100 torr, or no more than about 75 torr. In one embodiment, the vacuum system can be operable to reduce the pressure in microwave heater 430 to no more than about 10 millitorr ($10^{-3}$ torr), no more than about 5 millitorr, no more than about 2 millitorr, no more than about 1 millitorr, no more than about 0.5 millitorr, or no more than about 0.1 millitorr. Each of the components of microwave heating system 420 will now be discussed in detail below.

Microwave generator 422 can be any device capable of producing or generating microwave energy. As used herein, the term "microwave energy" refers to electromagnetic energy having a frequency between 300 MHz and 30 GHz. As used herein the term "between" used in a range is intended to include the recited endpoints. For example, a number "between x and y" can be x, y, or any value from x to y. In one embodiment, various configurations of microwave heating system 420 can utilize microwave energy having a frequency of about 915 MHz or a frequency of about 2.45 GHz, both of which have been generally designated as industrial microwave frequencies. Examples of suitable types of microwave generators can include, but are not limited to, magnetrons, klystrons, traveling wave tubes, and gyrotrons. In various embodiments, one or more microwave generators 422 can be capable of delivering (e.g., have a maximum output of) at least about 5 kW, at least about 30 kW, at least about 50 kW, at least about 60 kW, at least about 65 kW, at least about 75 kW, at least about 100 kW, at least about 150 kW, at least about 200 kW, at least about 250 kW, at least about 350 kW, at least about 400 kW, at least about 500 kW, at least about 600 kW, at least about 750 kW, or at least about 1,000 kW and/or not more than about 2,500 kW, not more than about 1,500 kW, or not more than about 1,000 kW. Although illustrated as comprising one microwave generator 422, microwave heating system 420 can comprise two or more microwave generators configured to operate in a similar manner.

Microwave heater 430 can be any device capable of receiving and heating one or more articles, including, for example, bundles of wood or lumber, using microwave energy. In one embodiment, at least about 75 percent, at least about 85 percent, at least about 95 percent, or substantially all of the heat or energy provided by microwave heater 430 can be provided by microwave energy. Microwave heater 430 can also be used as a microwave dryer, which can be further operable to dry one or more items disposed therein using microwave energy as described herein.

Figure 6:
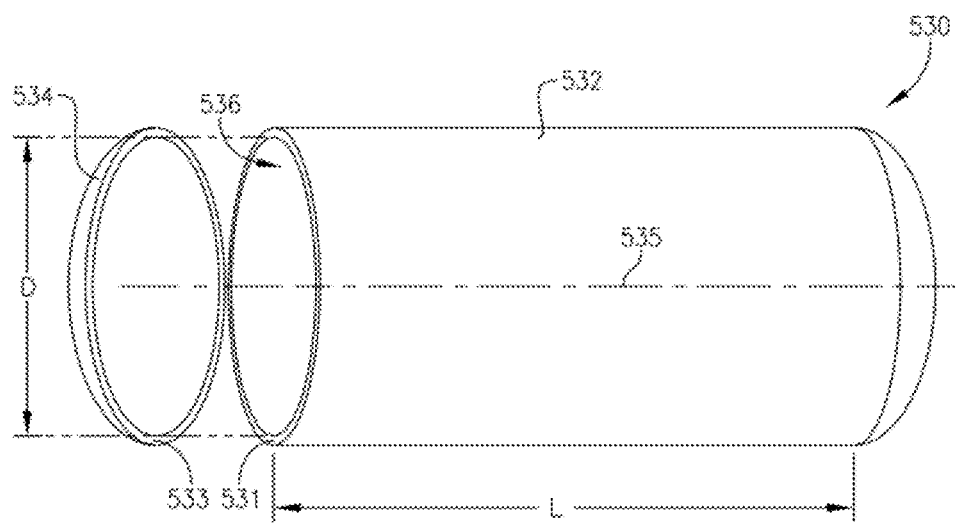
FIG. 6 is an isometric view of a two-door, pass-through vessel suitable for use as a chemical modification reactor and/or microwave heater in accordance with various embodiments of the present invention, particularly illustrating the shape and dimensional proportions of the vessel.

Turning now to FIG. 6, one embodiment of a microwave heater 530 is illustrated as comprising a vessel body 532 and a door 534 for selectively permitting and blocking the access to or passage of one or more objects (not shown) into and out of the interior 536 of microwave heater 530. In one embodiment, vessel body 532 of microwave heater 530 can be elongated along a central axis of elongation 535, which can be oriented in a substantially horizontal direction, as illustrated in FIG. 6. Vessel body 532 can have a cross-section of any suitable shape or size. In one embodiment, the cross-section of vessel 532 can be substantially circular or round, while, in another embodiment, the cross-section can be elliptical. According to one embodiment, the size and/or shape of the cross-section of vessel body 532 can change along the direction of elongation, while, in another embodiment, the shape and/or size of its cross-section can remain substantially the same. In the embodiment depicted in FIG. 6, vessel body 532 of microwave heater 530 comprises a horizontally elongated, cylindrical vessel body having a circular cross-section.

Microwave heater 530 can have an overall maximum internal dimension or length, L, and a maximum inner diameter, D, as shown in FIG. 6. In one embodiment, L can be at least about 8 feet, at least about 10 feet, at least about 16 feet, at least about 20 feet, at least about 30 feet, at least about 50 feet, at least about 75 feet, at least about 100 feet and/or no more than about 500 feet, no more than about 350 feet, no more than about 250 feet. In another embodiment, D can be at least about 3 feet, at least about 5 feet, at least about 10 feet, at least about 12 feet, at least about 18 feet, at least about 20 feet, at least about 25 feet, or at least about 30 feet and/or no more than about 25 feet, no more than about 20 feet, or no more than about 15 feet. In one embodiment, the ratio (L:D) of the length of microwave heater 530 to its inner diameter (L:D) can be at least about 1:1, at least about 2:1, at least about 3:1, at least about 4:1, at least about 6:1, at least about 8:1, at least about 10:1 and/or no more than about 50:1, no more than about 40:1, or no more than about 25:1.

Microwave heater 530 can be constructed out of any suitable material. In one embodiment, microwave heater 530 can comprise at least one electrically conductive and/or highly reflective material. Examples of suitable materials can include, but are not limited to, selected carbon steels, stainless steels, nickel alloys, aluminum alloys, and copper alloys. Microwave heater 530 can be almost completely constructed out of a single material, or multiple materials can be used to construct various portions of microwave heater 530. For example, in one embodiment, microwave heater 530 can be constructed of a first material and can then be coated or layered with a second material on at least a portion of its interior and/or exterior surface. In one embodiment, the coating or layer can comprise one or more of the metals or alloys listed above, while, in another embodiment, the coating or layer can comprise glass, polymer, or other dielectric material.

Microwave heater 530 can define one or more spaces suitable for receiving a load. For example, in one embodiment, microwave heater 530 can define a bundle-receiving space configured to receive and hold one or more bundles of wood (not shown in FIG. 6). The load (e.g., wood) can be positioned within interior 536 of microwave heater 530 in a static or dynamic manner. For example, in one embodiment wherein the load is statically positioned in microwave heater 530, the load can be relatively motionless during heating and may be held in place using static positioning devices (not shown) such as, for example, a shelf, a platform, a parked cart, a stopped belt, or the like. In another embodiment wherein the load is dynamically positioned within microwave heater 530, the load can be in motion during at least a portion of heating using one or more dynamic positioning devices (not shown) during heating. Examples of dynamic positioning devices can include, but are not limited to, continuous moving belts, rollers, horizontally and/or vertically oscillating platforms, and rotating platforms. In one embodiment, one or more dynamic positioning devices may be used in a generally continuous process, while one or more static positioning devices may be employed in a batch or semi-batch process.

According to one embodiment of the present invention, microwave heater 530 can also comprise one or more sealing mechanisms to reduce, inhibit, minimize, or substantially prevent the leakage of fluids and/or microwave energy into or out of the vessel interior 536 during treatment. As illustrated in FIG. 6, vessel body 532 and door 534 can each present respective body-side and door-side sealing surfaces 531, 533. In one embodiment, body-side and door-side sealing surfaces

531, 533 can directly or indirectly form a fluid seal between door 534 and vessel body 532 when door 534 is closed. A direct seal can be formed when at least a portion of body-side and door-side sealing surfaces 531, 533 make direct physical contact with one another. An indirect seal can be formed between door 534 and vessel body 532 when one or more resilient sealing members for fluidly isolating the interior of microwave heater 530 from an external environment (not shown in FIG. 6) are at least partially compressed against door-side and/or body-side sealing surfaces 533, 531 when door 534 is closed. Examples of resilient sealing members can include, but are not limited to, o-rings, spiral wound gaskets, sheet gaskets, and the like. According to one embodiment, the direct or indirect seal formed between vessel body 532 and door 534 can be such that microwave heater 530 can have a fluid leak rate of no more than about $10^{-2}$ torr liters/sec, no more than about $10^{-4}$ torr liters/sec, or no more than about $10^{-8}$ torr liters/sec at or near the junction of body 532 and door 534, when subjected to a helium leak test conducted according to procedure B1 entitled "Spraying Testing" described in the document entitled "Helium Leak Detection Techniques" published by Alcatel Vacuum Technology using a Varian Model No. 938-41 detector. In one embodiment, fluid seal can be particularly useful when the environment inside microwave heater 530 comprises a sub-atmospheric and otherwise challenging process environment.

Microwave heaters configured according to one embodiment of the present invention can also comprise a microwave choke for inhibiting or substantially preventing microwave energy leakage between door 534 and vessel body 532 of microwave heater 530 when door 534 is closed (e.g., at or near the junction of door 534 and vessel body 532). As used herein, the term "choke" refers to any device or component of a microwave vessel operable to reduce the amount of energy leaking from or escaping the vessel during the application of microwave energy. In one embodiment, the choke can be any device operable to reduce the amount of microwave leakage from the vessel by at least about 25 percent, at least about 50 percent, at least about 75 percent, or at least about 90 percent as compared to when a choke is not employed. In one embodiment of the present invention, the microwave choke can be operable to allow no more than about 50 milliwatts per square centimeter ($mW/cm^2$), no more than about 25 $mW/cm^2$, no more than about 10 $mW/cm^2$, no more than about 5 $mW/cm^2$, or no more than about 2 $mW/cm^2$ of microwave energy to leak out of the heater through the choke when measured 5 cm from the vessel with a Narda Microline Model 8300 broad band isotropic radiation monitor (300 MHz to 18 GHz).

Further, in contrast to conventional microwave chokes, which often fail when subjected to sub-atmospheric pressures, microwave chokes configured according to one embodiment of the present invention can be operable to substantially inhibit microwave energy leakage, even under deep vacuum conditions. For example, in one embodiment, a microwave choke as described herein can inhibit microwave energy leakage from the heater to the extent described above when the pressure in the microwave heater is no more than about 550 torr, no more than about 450 torr, no more than about 350 torr, no more than about 250 torr, no more than about 200 torr, no more than about 100 torr, or no more than about 75 torr. In one embodiment, a microwave choke as described herein can inhibit microwave energy leakage from the heater to the extent as described above when the pressure in the microwave heater is no more than about 10 millitorr ($10^{-3}$ torr), no more than about 5 millitorr, no more than about 2 millitorr, no more than about 1 millitorr, no more than about 0.5 millitorr, or no more than about 0.1 millitorr. Further, a microwave choke according to one embodiment of the present invention can maintain its level of leakage prevention on large-scale units, such as, for example, microwave heaters having a microwave energy input rate of at least about 5 kW, at least about 30 kW, at least about 50 kW, at least about 60 kW, at least about 65 kW, at least about 75 kW, at least about 100 kW, at least about 150 kW, at least about 200 kW, at least about 250 kW, at least about 350 kW, at least about 400 kW, at least about 500 kW, at least about 600 kW, at least about 750 kW, or at least about 1,000 kW and/or not more than about 2,500 kW, not more than about 1,500 kW, or not more than about 1,000 kW.

In one embodiment, substantially no arcing can occur near the choke 650 while microwave energy is introduced into the vessel (e.g., during the heating step), even at the levels of microwave energy and vacuum pressure described above. As used herein, the term "arcing", refers to undesired, uncontrolled electrical discharge, at least partially caused by ionization of a surrounding fluid. Arcing, which can damage equipment and materials and poses a substantial fire or explosion hazard, has a lower threshold at lower pressures, especially sub-atmospheric (e.g., vacuum) pressures. Typically, conventional systems limit rate of energy input in order to minimize or avoid arcing. In contrast to conventional systems, however, microwave heaters configured according to embodiments of the present invention can be operable to receive microwave energy at a rate of at least about 5 kW, at least about 30 kW, at least about 50 kW, at least about 60 kW, at least about 65 kW, at least about 75 kW, at least about 100 kW, at least about 150 kW, at least about 200 kW, at least about 250 kW, at least about 350 kW, at least about 400 kW, at least about 500 kW, at least about 600 kW, at least about 750 kW, or at least about 1,000 kW and/or not more than about 2,500 kW, not more than about 1,500 kW, or not more than about 1,000 kW can be introduced into a microwave heater (optionally referred to as a vacuum microwave heater or a vacuum microwave dryer) when the pressure is no more than about 550 torr, no more than about 450 torr, no more than about 350 torr, no more than about 250 torr, no more than about 200 torr, no more than about 100 torr, no more than about 75 torr, no more than about 10 millitorr ($10^{-3}$ torr), no more than about 5 millitorr, no more than about 2 millitorr, no more than about 1 millitorr, no more than about 0.5 millitorr, or no more than about 0.1 millitorr and/or at least about 50 torr or at least about 75 torr with substantially no arcing at or near the choke.

Figure 7A:
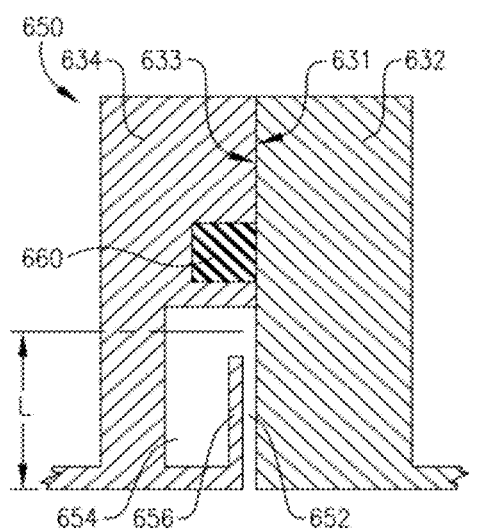
FIG. 7a is a partial sectional view of the junction of a door flange and a vessel flange of a microwave heater configured in accordance with one embodiment of the present invention, particular illustrating a microwave choke cooperatively formed by the door and vessel flanges and having two chambers that extend parallel to and alongside one another.

Referring now to FIG. 7a, a cross-sectional segment of one embodiment of a microwave choke 650 for substantially inhibiting microwave energy leakage between a door 634 and a vessel body 632 of a microwave heater when door 634 is closed is provided. As shown in FIG. 7a, at least a portion of microwave choke 650 is cooperatively defined or formed between door 634 and vessel body 632 when door 634 is closed and respective door-side 633 and body-side 631 sealing surfaces are in direct or indirect contact with one another. In one embodiment, an optional fluid sealing member 660 can also be present to inhibit, minimize, or substantially prevent leakage of fluid into or out of the microwave heater, as discussed previously. Fluid sealing member 660, when present, can be coupled to vessel body 632 or, as shown in FIG. 7a, to door 634.

According to one embodiment shown in FIG. 7a, microwave choke 650 defines a first radially-extending choke cavity 652, a second-radially extending choke cavity 654, and a radially-extending choke guidewall 656 disposed at least partly between first and second choke cavities 652, 654 when the door 634 of the microwave heater is closed. In one embodiment illustrated in FIG. 7a, first choke cavity 652 is defined between vessel body 632 and choke guidewall 656 when door 634 is closed, while second choke cavity 654 is at least partially disposed between door 634 and choke guidewall 656, such that choke guidewall 656 is substantially coupled to door 634. First choke cavity 652 can be open to the interior of the microwave heater and can be radially positioned between the interior of the microwave heater and the fluid seal created by sealing member 660, when present. In another embodiment of the present invention (not shown in FIG. 7a), second choke cavity 654 can be at least partially defined by vessel body 632, such that second choke cavity 654 can be positioned between vessel body 632 and choke guidewall 656 when door 634 is closed, such that choke guidewall 656 is substantially coupled to vessel body 632.

In one embodiment, at least a portion of second choke cavity 654 can extend alongside at least a portion of first choke cavity 652 when door 634 is closed. In one embodiment, at least about 40 percent, at least about 60 percent, at least about 80 percent, or at least about 90 percent of the total length of second choke cavity 654 can extend alongside first choke cavity 654 when door 634 is closed. The total length of first and/or second choke cavities 652, 654, designated with the letter "L" in FIG. 7a, can be at least about 1/16 times, at least about 1/8 times, at least about 1/4 times and/or no more than about 1 times, no more than about 3/4 times, or no more than about 1/2 times the length of the predominant wavelength of the microwave energy in the interior of the microwave heater. The length, L, of first and/or second choke cavities 652, 654 can be at least about 1 inch, at least about 1.5 inches, at least about 2 inches, or at least about 2.5 inches and/or no more than about 8 inches, no more than about 6 inches, or no more than about 5 inches.

Figure 7B:
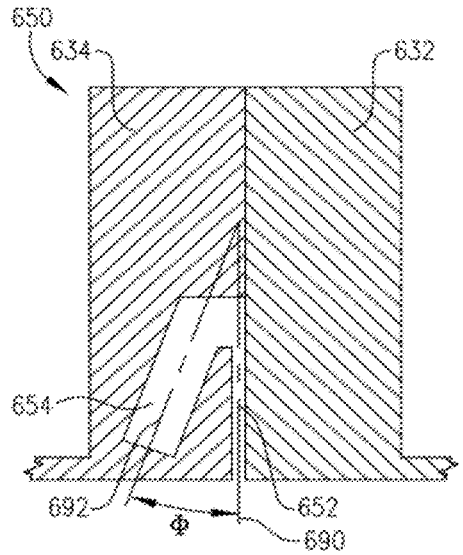
FIG. 7b is a partial sectional view of a microwave choke similar the choke depicted in FIG. 7a, but having choke cavities that extend at an acute angle relative to one another.

As illustrated in FIG. 7b, a relative extension angle, $\phi$, can be defined between the direction of extension of first choke cavity 652, designated by line 690, and the direction of extension of second choke cavity 654, designated by line 692. In various embodiments, the relative extension angle, $\phi$, can be no more than about 60°, no more than about 45°, no more than about 30°, or no more than about 15°. In some embodiments, the direction of extension of second choke cavity 654 can be substantially parallel to the direction of extension of first choke cavity 652, as depicted in FIG. 7a.

Figure 7C:
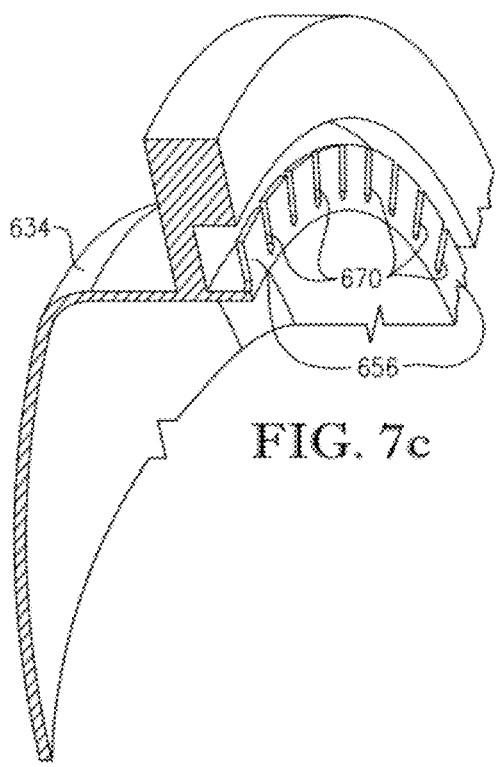
FIG. 7c is a cut-away isometric view of the door flange of a microwave heater equipped with the microwave choke configuration depicted in FIG. 7a, particularly illustrating a plurality of circumferentially-spaced, open-ended slots or gaps formed in a guidewall of the choke.

Referring now to FIG. 7c, a partial isometric cross-sectional portion of a microwave choke is provided. As shown in FIG. 7c, choke guidewall 656 can be integrally formed into door 634. According to one embodiment, guidewall 656 can comprise a plurality of spaced open-ended gaps 670 disposed circumferentially along guidewall 656. In one embodiment, the spacing between the centerline of each of the gaps can be at least about 0.5 inches, at least about 1 inch, at least about 2 inches, or at least about 2.5 inches and/or no more than about 8 inches, no more than about 6 inches, or no more than about 5 inches.

Figure 7E:
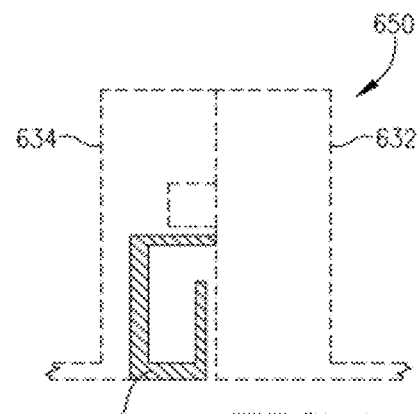
FIG. 7e is a sectional view of a "G"-shaped removable choke portion previously depicted in FIG. 7d.
Figure 7F:
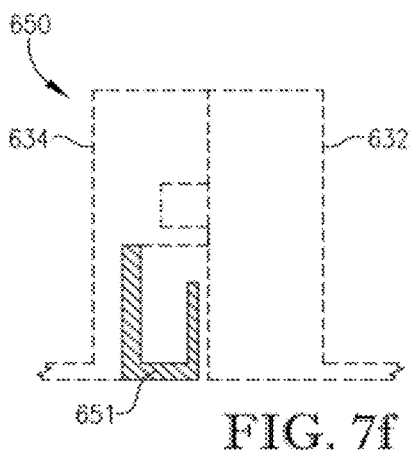
FIG. 7f is a sectional view of a "J"- or "U"-shaped removable choke portion configured in accordance with a first alternative embodiment of the present invention.
Figure 7G:
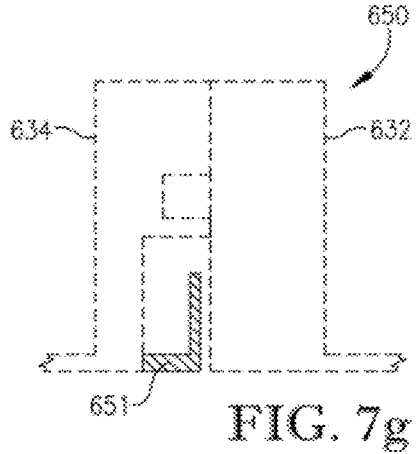
FIG. 7g is a sectional view of an "L"-shaped removable choke portion configured in accordance with a second alternative embodiment of the present invention.
Figure 7H:
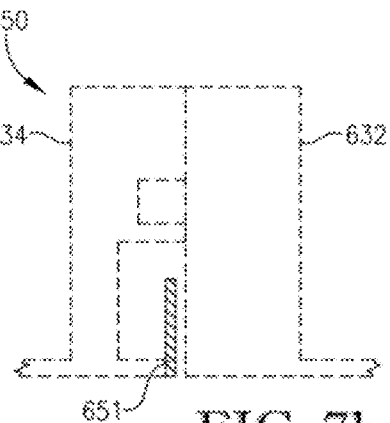
FIG. 7h is a sectional view of an "I"-shaped removable choke portion configured in accordance with a third alternative embodiment of the present invention.
Figure 7D:
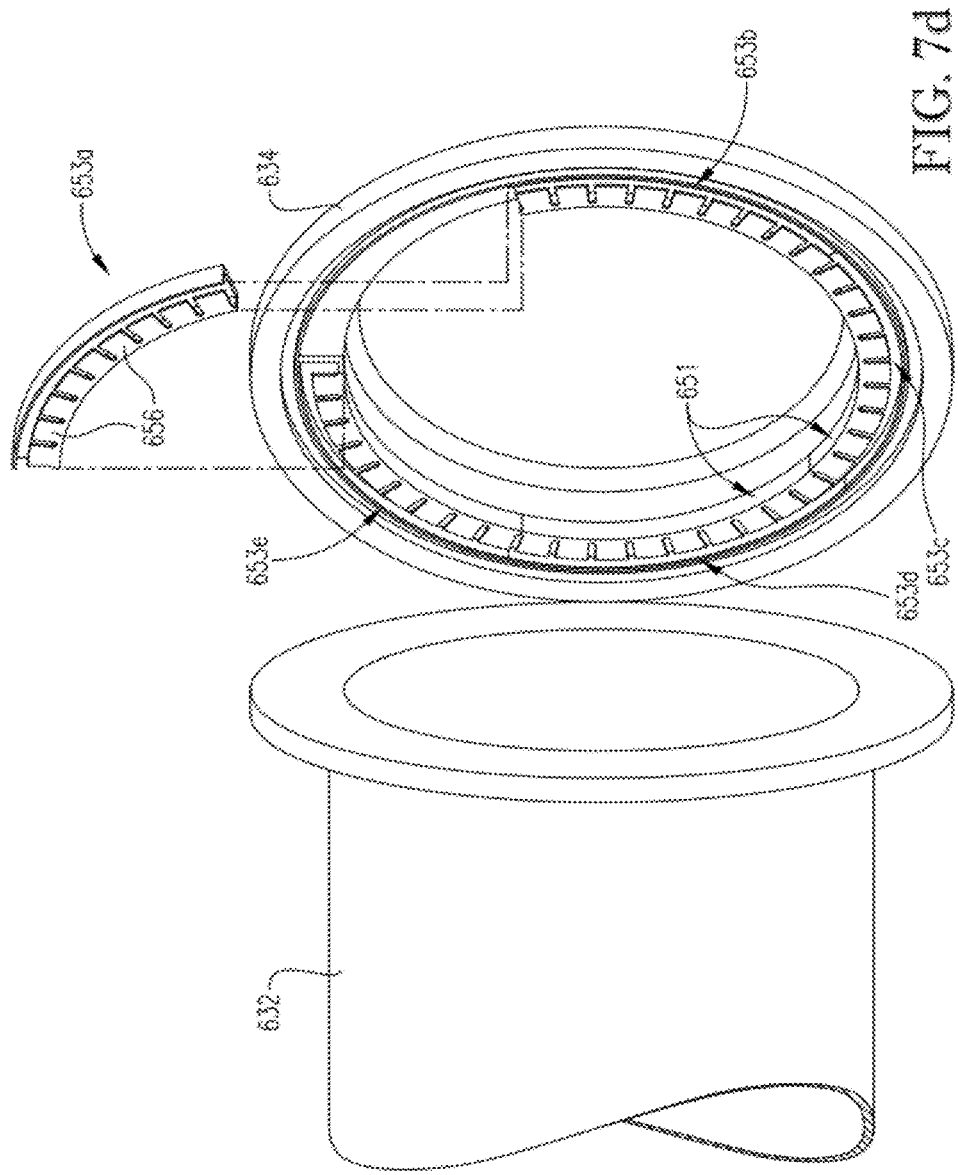
FIG. 7d is a side view of an open door on a microwave heater equipped with a microwave choke having a removable portion configured in accordance with one embodiment of the present invention, particularly illustrating that the removable portion of the microwave choke comprises a plurality of individually removable and replaceable choke segments.

According to another embodiment of the present invention, at least a portion of choke 650 can comprise a removable portion 651 removably coupled to vessel body 632 or door 634. In one embodiment, removable portion 651 can be removably coupled to door 634. As used herein, the term "removably coupled" means attached in a manner such that a portion of the choke can be removed without substantial damage to or destruction of the vessel body, the choke, and/or the door. In one embodiment, removable choke portion 651 can comprise at least a portion or all of guidewall 656. FIG. 7d illustrates a microwave choke having at least one removable portion 651. In one embodiment depicted in FIG. 7d, guidewall 656 can be coupled to removable choke portion 651. Removable choke portion 651 can comprise a plurality of removable choke segments 653a-e that are each removably coupled to door 634 or vessel body 632 (embodiment not shown). In one embodiment, removable choke portion 651 can comprise at least 2, at least 3, at least 4, at least 6, at least 8 and/or no more than 16, no more than 12, no more than 10, or no more than 8 removable choke segments 653. According to one embodiment wherein removable choke portion 651 has a generally ring-shaped diameter, individually removable choke segments 653a-e can have a generally arcuate shape, as shown in FIG. 7d.

Removable choke portion 651 can be fastened to door 634 or vessel body 632 according to any known method including, for example, bolts, screws, or any other type of suitable removable fastening device. In one embodiment, removable choke portion 651 can be magnetically fastened to door 634 or vessel body 632. Depending, in part, on the desired method of fastening, removable choke portion 651 can have a variety of cross-sectional shapes. For example, as illustrated in FIGS. 7e-h, removable choke portion 651 can define a cross-section which is generally G-shaped (as shown in FIG. 7e), generally J-shaped or U-shaped (as shown in FIG. 7f), generally L-shaped (as shown in FIG. 7g), or generally I-shaped (as shown in FIG. 7h).

In operation, removable choke portion 651 can be attached, removed, and/or subsequently replaced without removing portions of or substantially re-machining vessel body 632 and/or door 634 in order to resume normal operation of the microwave heater. For example, in one embodiment, a plurality of individually removable choke segments 653a-e can be separately and individually attached to door 634 and/or vessel body 632. Subsequently, when one or more portions of the microwave choke become damaged or otherwise require replacement, one or more individually removable choke segments 653 and/or the entire removable choke portion 651 can be separately and individually detached or removed from vessel body 632 or door 634 and replaced with one or more new (e.g., replacement) removable choke segments 653 and/or a new removable choke portion 651. In one embodiment, the number of removable choke segment or segments 653a, b, c, d, and/or e detached from and then reattached to (e.g., removed from and replaced onto) vessel body 632 or door 634 can be not more than or no more than the total number of choke segments 653a-e of removable choke portion 651.

Microwave heater 530, generically represented in FIG. 6, can be classified as a single mode cavity, a multi-mode cavity, or a quasi-optical cavity depending on how the microwave energy therein behaves. As used herein, the term "single mode cavity" refers to a cavity designed and operated to maintain the microwave energy therein a single, specific mode pattern. Oftentimes, the design and properties of a single mode cavity can limit the size of the vessel and/or how a load can be positioned within the chamber. As a result, in one embodiment, microwave heater 530 can comprise a multimode or a quasi-optical mode cavity. As used herein, the term "multimode cavity" refers to a cavity or chamber wherein the microwave energy is excited into a plurality of standing wave patterns in a semi-random or undirected manner. As used herein, the term "quasi-optical mode cavity" refers to a cavity or chamber wherein most, but not all, of the energy is directed toward a particular area in a controlled manner. In one embodiment, a multimode cavity has a higher energy density near the center of the vessel than a quasi-optical cavity, while quasi-optical cavities can leverage the quasi-optical properties of microwave energy to more closely control and direct the emission of energy into the cavity interior.

Turning back to microwave heating system 420 illustrated in FIG. 5, microwave distribution system 440 is operable to transmit or direct at least a portion of the microwave energy produced by microwave generator 422 into microwave heater 430, as discussed briefly above. As shown schematically in FIG. 5, microwave distribution system 440 can include at least one waveguide 442 operably coupled to one or more microwave launchers, illustrated as launchers 444a-c. Optionally, microwave distribution system 440 can comprise one or more microwave mode converters 446 for changing the mode of the microwave energy passing therethrough and/or one or more microwave switches (not shown) for selectively routing microwave energy to one or more of microwave launchers 444a-c. Additional details regarding specific components and various embodiments of microwave distributions system 440 will now be discussed in detail below.

Waveguides 442 can be operable to transport microwave energy from microwave generator 422 to one or more of microwave launchers 444a-c. As used herein, the term "waveguide" refers to any device or material capable of directing electromagnetic energy from one location to another. Examples of suitable waveguides can include, but are not limited to, co-axial cables, clad fibers, dielectric-filled waveguides, or any other type of transmission line. In one embodiment, waveguides 442 can comprise one or more dielectric-filled waveguide segments for transporting microwave energy from microwave generator 422 to one or more of launchers 444a-c.

Waveguides 442 can be designed and constructed to propagate microwave energy in a specific predominant mode. As used herein, the term "mode" refers to a generally fixed cross-sectional field pattern of microwave energy. In one embodiment of the present invention, waveguides 442 can be configured to propagate microwave energy in a $TE_{xy}$ mode, wherein x is an integer in the range of from 1 to 5 and y is 0. In another embodiment of the present invention, waveguides 442 can be configured to propagate microwave energy in a $TM_{ab}$ mode, wherein a is 0 and b is an integer in the range of from 1 to 5. It should be understood that, as used herein, the above-defined ranges of a, b, x, and y values as used to describe a mode of microwave propagation are applicable throughout this description. Further, in some embodiments, when two or more components of a system are described as being "$TM_{ab}$" or "$T_{xy}$" components, the values for a, b, x, and/or y can be the same or different for each component. In one embodiment, the values for a, b, x, and/or y are same for each component of a given system.

The shape and dimensions of waveguides 442 can depend, at least in part, on the desired mode of the microwave energy to be passed therethrough. For example, in one embodiment, at least a portion of waveguides 442 can comprise $TE_{xy}$ waveguides having a generally rectangular cross-section, while, in another embodiment, at least a portion of waveguides 442 can comprise $TM_{ab}$ waveguides having generally circular cross-sections. According to one embodiment of the present invention, circular cross-section waveguides can have a diameter of at least about 8 inches, at least about 10 inches, at least about 12 inches, at least about 24 inches, at least about 36 inches, or at least about 40 inches. In another embodiment, rectangular cross-section waveguides can have a short dimension of at least about 1 inch, at least about 2 inches, at least about 3 inches and/or no more than about 6 inches, no more than about 5 inches, or no more than about 4 inches, while the long dimension can be at least about 6 inches, at least about 10 inches, at least about 12 inches, at least about 18 inches and/or no more than about 50 inches, no more than about 35 inches, or no more than about 24 inches.

As schematically illustrated in FIG. 5, microwave distribution system 440 can comprise one or more mode conversion segments 446 operable to change the mode of the microwave energy passing therethrough. For example, mode converter 446 can comprise a $TM_{ab}$-to-$TE_{xy}$ mode converter for changing the mode of at least a portion of the microwave energy from a $TM_{ab}$ to a $TE_{xy}$ mode. In another embodiment, mode conversion segment 446 can comprise a $TE_{xy}$-to-$TM_{ab}$ mode converter for receiving $TM_{ab}$ mode energy and converting and discharging microwave energy in a $TE_{xy}$ mode. The values for a, b, x, and y can be within the ranges described previously. Microwave distribution system 440 can comprise any number of mode converters 446 and, in one embodiment, can include at least 1, at least 2, at least 3, or at least 4 mode converters positioned at various locations within microwave distribution system 440.

Turning again to FIG. 5, microwave distribution system 440 can comprise one or more microwave launchers 444 for receiving microwave energy from generator 422 via waveguides 442 and emitting or discharging at least a portion of the microwave energy into the interior of microwave heater 430. As used herein, the terms "microwave launcher" or "launcher" refers to any device capable of emitting microwave energy into the interior of a microwave heater. The microwave distribution systems according to various embodiments of the present invention can employ at least 1, at least 2, at least 3, at least 4, at least 5, at least 6, at least 8, at least 10, and/or no more than 100, no more than 50, or no more than 25 microwave launchers. Microwave launchers can be any suitable shape and/or size and can be constructed of any materials, including, for example, selected carbon steels, stainless steels, nickel alloys, aluminum alloys, and copper alloys. In one embodiment wherein microwave distribution system 440 comprises two or more microwave launchers, each launcher can be made of the same material, while, in another embodiment, two or more launchers can be made of different materials.

In operation, microwave energy generated by one or more microwave generators 422 can be optionally routed or directed to one or mode converters 446 (if present) via waveguides 442. Thereafter, the microwave energy in waveguides 442 can be optionally split into two or more separate microwave portions (e.g., at least three portions as shown in FIG. 5) before being directed to one or more microwave launchers, illustrated as launchers 444a-c in FIG. 5. Microwave launchers 444a-c can be partially or entirely disposed within microwave heater 430 and can be operable to introduce or emit at least a portion of the microwave energy passed thereto into the interior of heater 430 via one or more spaced launch locations, thereby heating and/or drying the objects, articles, or load disposed therein, including, for example, one or more bundles of wood. Specific configurations and details regarding various embodiments of microwave heating systems will now be discussed in detail below.

Turning now to FIGS. 8-10, several embodiments of microwave heating systems configured according to the present invention are provided. Although described as being configured to receive and heat a bundle of wood, it should be understood that the microwave heating systems described below can be suitable for use in any of the other processes and systems described previously, as well as any system or process wherein microwave heating is used. Further, it should be understood that, although described with reference to a particular figure or embodiment, all elements and components described below may be suitable for use in any microwave heating system configured according to one or more embodiments of the present invention.

Figure 8A:
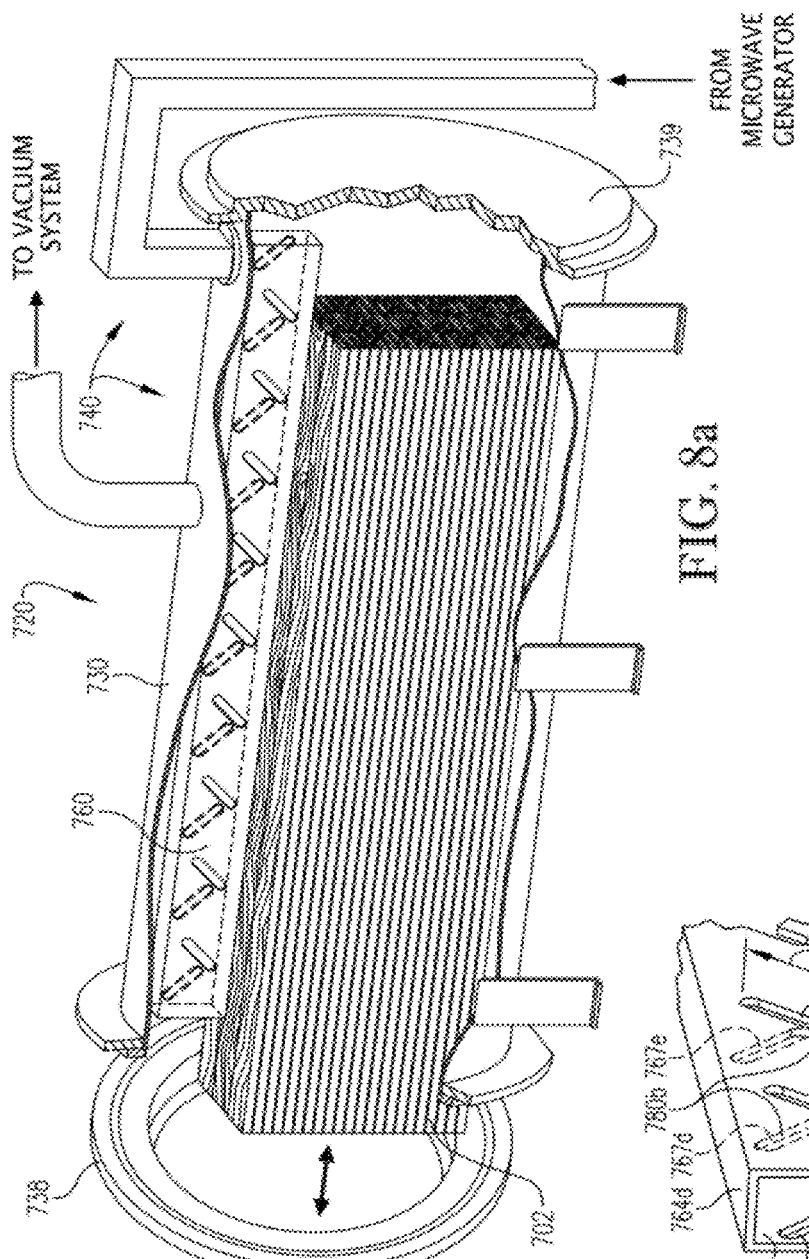
FIG. 8a is a cut-away isometric view of a microwave heater configured in accordance with one embodiment of the present invention, particularly illustrating the heater as being equipped with an elongated waveguide launcher having staggered launch openings on opposite sides of the launcher.
Figure 8B:
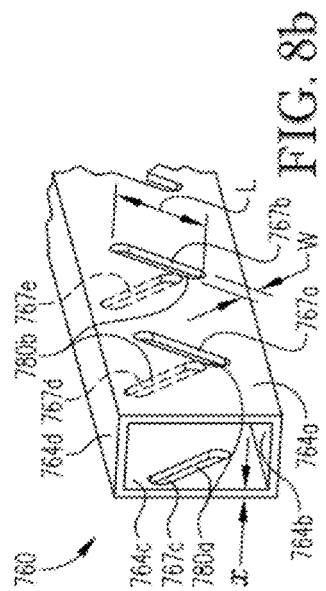
FIG. 8b is an enlarged partial view of the waveguide launcher depicted in FIG. 8a, particularly illustrating the configuration of the launch openings and the thickness of the sidewalls defining the launch openings.

Turning now to FIGS. 8a and 8b, one embodiment of a microwave heating system 720 is illustrated as comprising a microwave heater 730 and a microwave distribution system 740 for delivering microwave energy from a microwave generator (not shown) to heater 730. An optional vacuum system (not shown) can be operable in various embodiments to reduce the pressure in the interior of microwave heater 730 to, for example, no more than about 550 torr, no more than about 450 torr, no more than about 350 torr, no more than about 300 torr, no more than about 250 torr, no more than about 200 torr, no more than about 150 torr, no more than about 100 torr, no more than about 75 torr and/or no more than about 10 millitorr ($10^{-3}$ torr), no more than about 5 millitorr, no more than about 2 millitorr, no more than about 1 millitorr, no more than about 0.5 millitorr, or no more than about 0.1 millitorr. Several features of one or more embodiments of microwave heating system 720 will be discussed in detail below.

Turning now to FIG. 8a, microwave distribution system 740 is illustrated as comprising an elongated waveguide launcher 760 that is at least partially, and may be entirely, disposed within the interior of microwave heater 730. As shown in FIG. 8a, elongated waveguide launcher 760 can extend substantially horizontally within the interior of microwave heater 730. As used herein, the term "substantially horizontally" means within about 10° of horizontal. In one embodiment, the ratio of the length of elongated waveguide launcher 760 to the total length of the interior space of microwave heater 730 can be, for example, at least about 0.3:1, at least about 0.5:1, at least about 0.75:1, or at least about 0.90:1. In one embodiment, elongated waveguide launcher that extends substantially horizontally 760 can be located toward the upper or lower half of the interior volume of microwave heater 730 and may be at least partially or entirely vertically disposed above the heater entrance door 738 and an optional heater exit door (not shown) that, when present, is disposed on a generally opposite end of microwave heater 730. As used herein, the terms "upper" and "lower" volume refer to regions located in the upper vertical or lower vertical portion of the internal volume of the vessel. In one embodiment, elongated waveguide launcher 760 can be, for example entirely disposed within the uppermost one-third, one-fourth, or one-fifth of the interior volume of microwave heater 730, while, in another embodiment, elongated waveguide launcher 760 can be, for example disposed within the lowermost one-third, one-fourth, or one-fifth of the total interior volume of microwave heater 730. To measure the "uppermost" or "lowermost" fractional portions of the total interior volume described above, the portion of the vessel cross-section extending from the respective uppermost or lowermost wall of the vessel toward the central axis of elongation for the desired portion (e.g., one-third, one-fourth, or one-fifth) of the cross-section can be extended along the central axis of elongation to thereby define the "uppermost" or "lowermost" fractional volumes of the internal vessel space.

As shown in FIG. 8a, microwave heater 730, which can be configured to receive and heat a bundle of wood, comprises a heater entrance door 738, which can optionally comprise a choke (not shown), configured to allow a bundle of wood 702 to be introduced into a bundle receiving space 739. Although illustrated as being in direct contact, it should be understood that bundle 702 can also comprise one or more spacers or "stickers" disposed between the boards. In one embodiment (not shown), microwave heater 730 can also comprise an optional heater exit door 739 positioned on the opposite end of microwave heater 730 from heater entrance door 738. When microwave heater 730 comprises a separate heater exit door 739, bundle 702 can optionally be loaded via entrance door 738, passed through microwave heater 730 and unloaded via the exit door 739, rather than being both loaded and unloaded through heater entrance door 738. The reference to "entrance" and "exit" doors in this embodiment is not limiting, and bundle 702 can optionally be loaded via door 739, passed through microwave heater 730 and unloaded via door 738. Further, in another embodiment, bundle 702 can be both loaded (inserted) and unloaded (removed) from entrance door 738 when, for example, optional exit door 739 is not present. In one embodiment, elongated waveguide launcher 760 can be positioned in microwave heater 730 substantially below (not shown) or above bundle 702 such that, as bundle 702 is passed into, out of, and/or through the interior of heater 730, elongated launcher does not have to be moved, removed, retracted, or otherwise repositioned.

Referring now to FIG. 8b, a partial detailed isometric view of elongated waveguide launcher 760 is provided. In one embodiment, elongated waveguide launcher 760 can be substantially hollow and comprise one or more sidewalls. The one or more sidewalls can be configured in a variety of ways such that elongated waveguide launcher 760 can have a variety of cross-sectional shapes. For example, in one embodiment, elongated waveguide launcher 760 can have a single sidewall defining a substantially circular or elliptical cross-sectional shape. In another embodiment, as shown in FIG. 8b, elongated waveguide launcher 760 can comprise four substantially planar side walls 764a-d arranged to give launcher 760 a generally rectangular transverse (or, in another embodiment, square) cross-sectional configuration. Elongated waveguide launcher 760 can be configured to propagate and/or emit microwave energy in any suitable mode, including $TE_{xy}$ and/or $TM_{ab}$ modes, as discussed in detail previously. According to one embodiment, elongated waveguide launcher 760 can comprise a elongated $TE_{xy}$ launcher and, in one embodiment, can be implemented with commercially available rectangular waveguide sizes, such as WR284, WR430, or WR340. The specific dimensions of elongated waveguide launcher 760 can be any suitable dimensions and, in one embodiment, may be custom fabricated according to the description provided in U.S. application Ser. Nos. 11/524,239 and 11/254,261, each incorporated herein by reference to the extent not inconsistent with the present disclosure.

As illustrated in FIG. 8b, the one or more sidewalls of elongated waveguide launcher 760 can define a plurality of launch openings for discharging or emitting microwave energy into the interior of microwave heater 730. Although depicted in FIG. 8b as defining a plurality of elongated slots 767a-e having a generally rectangular shape with rounded ends, launch openings 767a-e can be of any suitable shape. Each of elongated slots 767a-e can define a length, designated as "L" in FIG. 8b, and a width, designated as "W" in FIG. 8b. In one embodiment, the length-to-width (L:W) ratio of elongated slots 767a-e can be, for example, at least about 2:1, at least about 3:1, at least about 4:1, or at least about 5:1. In addition, as shown in FIG. 8b, elongated slots 767a-e can be oriented at various angles with respect to the horizontal. In one embodiment, elongated slots 767a-e can extend at an angle relative to the horizontal of, for example, at least about 10°, at least about 20°, at least about 30° and/or, for example, no more than about 80°, no more than about 70°, or no more than about 60°. In one embodiment, each of elongated slots 767a-e can have equal shapes, sizes, and/or orientations. In one embodiment, the shapes, sizes, and/or orientations of individual elongated slots 767a-e can differ. Changes to the shape, size, and/or orientation of elongated slots 767a-e can impact the distribution of energy emitted from elongated waveguide launcher 760. Although shown as being uncovered in the embodiment illustrated in FIG. 8b, one or more launch openings 767 can be substantially covered by one or more covering structures (not shown) adjacent to the launch openings that are operable to prevent the flow of fluids into and out of openings 767, but that allow the discharge of microwave energy therefrom.

As shown in FIG. 8b, one or more of launch openings 767a-e can be at least partially, or entirely, defined by one or more sidewalls 764a-d of elongated waveguide launcher 760. In one embodiment, at least about 50 percent, at least about 75 percent, at least about 85 percent, or at least about 90 percent, for example, of the thickness of launch openings 767a-e can be defined by one or more sidewalls 764a-d. According to the embodiment illustrated in FIG. 8b, launch openings 767a-e can be at least partially, or entirely, defined by two substantially upright sidewalls 764a,c. As used herein, the term "substantially upright" means within 30° of vertical. Sidewalls 764a-d of elongated launcher 760 can be relatively thick in one embodiment, while, in other one embodiment, sidewalls 764a-d can be relatively thin. For example, the average thickness, designated as x in FIG. 8b, of sidewalls 764a-d can be at least about ⅟₃₂ (0.03125) inches, at least about ⅛ (0.125) inches, at least about ³⁄₁₆ (0.1875) inches and/or, for example, no more than about ½ (0.5) inches, no more than about ¼ (0.25) inches, no more than about ³⁄₁₆ (0.1875) inches, or no more than about ⅛ (0.125) inches. According to one embodiment wherein one or more side walls of elongated waveguide launcher 760 are relatively thin, elongated waveguide launcher 760 can emit microwave energy into the interior of microwave heater 730 with a microwave launch efficiency of at least about 50 percent, at least about 75 percent, at least about 85 percent, at least about 90 percent, or at least about 95 percent. As used herein, the term "microwave launch efficiency" can be defined by converting the result of the following equation to a percentage: (total energy introduced into the launcher−total energy discharged from all of the openings of the launcher)÷(total energy introduced into the launcher).

Launch openings 767a-e can be arranged according to any suitable configuration or arrangement along elongated waveguide launcher 760. In one embodiment illustrated in FIG. 8b, launch openings 767a-e can include a first set of launch openings (e.g., launch openings 767a,b) disposed on one side of launcher 760 and a second set of launch openings (e.g., launch openings 767c-e) disposed on another, generally opposite side of elongated waveguide launcher 760. According to one embodiment, first and second sets of launch openings can be axially staggered from each other, such that corresponding openings (e.g., openings 767a,c, shown as launch pair or opening pair 780a, and openings 767b,d, shown as launch or opening pair 780b) are not axially aligned with one another. Although illustrated in FIG. 8b as having only two launch opening pairs 780a,b, it should be understood that any desired number of launch opening pairs can be utilized.

According to one embodiment, each launch pair 780a,b includes one launch opening disposed on one side of elongated waveguide launcher 760 (e.g., opening 767a of pair 780a and opening 767b of pair 780b both disposed on side wall 764a) and another launch opening disposed on the opposite side of launcher 760 (e.g., opening 767c of pair 780a and opening 767d of pair 780b both disposed on side wall 764c in FIG. 8b). In one embodiment, the openings 767a,c and 767b,d disposed on opposite sides of elongated waveguide launcher 760 can be axially aligned, while, in another embodiment, the oppositely-spaced openings 767a,c and 767b,d can form a plurality of "near neighbor" pairs (e.g., launch pairs 780a,b comprise "near neighbor" openings 767a,c and 767b,d, respectively). In one embodiment, for example, when an odd number of launch openings is used, one or more single launch openings may stand alone without forming a pair with any other opening. In one embodiment, the stand-alone opening may be an end opening, such as end opening 767e shown in FIG. 8b.

According to one embodiment wherein pairs 780a,b comprise near neighbor pairs of openings, at least one of the launch openings 767a-d of launch opening pairs 780a,b can be configured so as to cancel at least a portion of the microwave energy reflected back into the interior space of waveguide 760 as generated by one or more of the other launch openings 767a-d of the near-neighbor pairs 780a,b. For example, microwave energy reflections caused by opening 767a of pair 780a can be at least partially, substantially, or nearly entirely cancelled by the configuration of the other opening 767b of pair 780a. In a similar manner, the microwave energy reflections caused by opening 767c of pair 780b can be at least partially, substantially, or nearly entirely cancelled by the configuration of the other opening 767d of pair 780b.

Furthermore, in one embodiment when launch openings 767a-d are arranged in near neighbor pairs, the total amount of energy transferred from each of launch opening 767a-d of opening pairs 780a,b into the interior of microwave heater 730 can be equal to a fraction of the total amount of microwave energy introduced into launcher 760. For example, in one embodiment wherein the launcher comprises N paired launch openings and a single end opening, the fraction of microwave energy emitted from each pair of launch openings (and/or the unpaired or single end opening) can be expressed by the following formula: 1/(N+1). Thus, according to one embodiment illustrated in FIG. 8b wherein N=2, the total amount of energy emitted by each of pairs 780a,b can be equal to 1/(2+1) or ⅓ of the total energy introduced into elongated waveguide launcher 760. Similarly, in such embodiment the energy emitted from an unpaired launch opening (e.g., single end opening 767e in FIG. 8b) can be expressed by the formula I/(N+1). Thus, in the embodiment shown in FIG. 8b, launch opening 767e can also emit approximately ⅓ of the total energy introduced into elongated waveguide launcher 760.

Figure 9A:
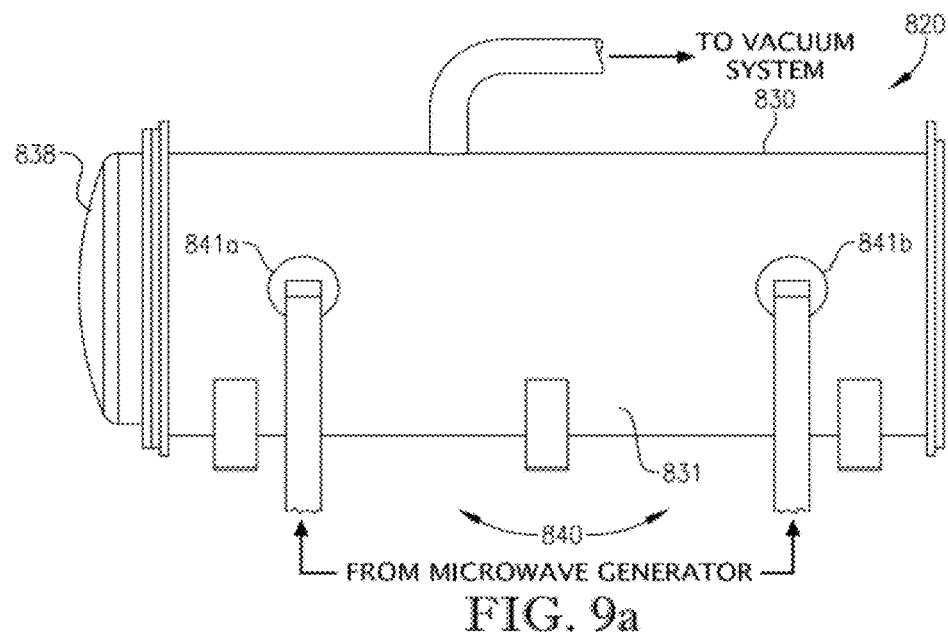
FIG. 9a is a side view of a microwave heating system configured in accordance with one embodiment of the present invention, particularly illustrating a microwave distribution system for delivering microwave energy to the microwave heater.

Another embodiment of a microwave heating system 820 is provided in FIGS. 9a-h. As shown in FIG. 9a, microwave heating system 820 comprises a microwave heater 820 and a microwave distribution system 840 operable to transport microwave energy from a microwave generator (not shown) to heater 820. In one embodiment, microwave heating system 820 can also comprise a vacuum system (not shown) for reducing the pressure in microwave heater 830 below atmospheric pressure. As shown in FIG. 9a, microwave heater 830 can include a heater entrance door 838 for introducing a bundle of wood (or other load) into the interior of heater 830. Optionally, microwave heater 830 can comprise a heater exit door (not shown in FIG. 9a) disposed on the generally opposite end of heater 830 from heater entrance door 838. In addition, microwave heater 830 can comprise a plurality of spaced launch openings, such as those illustrated as 841a,b in FIG. 9a, located at various positions along one or more external side walls 831 of microwave heater 830. Launch openings 841a,b can be operable to accommodate one or more components of microwave distribution system 840, thereby facilitating the transmission of microwave energy into microwave heater 830. Additional details regarding microwave distribution system 840 will now be discussed in further detail with regard to FIGS. 9b-h.

Figure 9B:
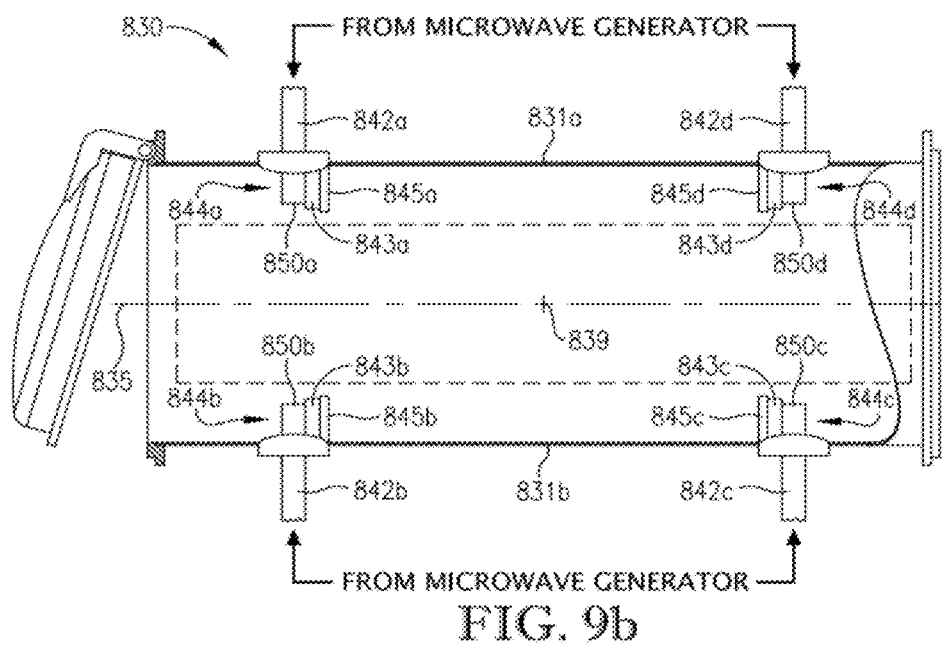
FIG. 9b is a top cut-away view of the microwave heater depicted in FIG. 9a, particularly illustrating the microwave distribution system as including one pair of $TM_{ab}$ launchers on one side of the microwave heater and a second pair of the $TM_{ab}$ launchers on the opposite side of the microwave heater.

Turning FIG. 9b, a top partial cutaway view of microwave heater 830 is provided, particularly illustrating a plurality of microwave launchers 844*a-d* directly or indirectly coupled to opposite sidewalls 831*a,b* of microwave heater 830. As used herein, the term "indirectly coupled" refers to one or more intermediate pieces of equipment used to at least partially connect one or more launchers to the vessel. Launchers 844*a-d* can be operable to emit microwave energy into the interior of microwave heater 830 via one or more open outlets 845*a-d*, as shown in FIG. 9*b*. Although illustrated in FIG. 9*b* as comprising four launchers 844*a-d*, it should be understood that microwave heater 830 can comprise any desired number of launchers. In one embodiment (not shown), microwave heater 830 can comprise two additional launchers axially positioned to the left of launchers 844*a,b* in FIG. 9*b* and/or to the right of launchers 844*c,d*. The additional launchers (not shown) can be facing in the same direction and/or in different directions. For example, in one embodiment shown in FIG. 9*b*, launchers 844*a-d* are shown as facing in opposite directions. Further, in one embodiment (not shown), microwave heater 830 can comprise four additional launchers, arranged in an analogous manner as launchers 844*a-d*, illustrated in FIG. 9*b*, as described further below.

Microwave launchers 844 can be positioned along, within, or proximate microwave heater 830 according to any suitable configuration. In one embodiment, microwave launchers 844 can be configured to comprise two pairs of launchers. The individual launchers within the pair can be located on generally the same side (e.g., the pair comprising launchers 844*a* and 844*d* and the other pair comprising launcher 844*b* and 844*c*) or on generally opposite sides (e.g., the pair comprising microwave launchers 844*a* and 844*b* and the other pair comprising 844*c* and 844*d*) of microwave heater 830.

As used herein, the term "generally opposite sides" or "opposite sides" refers to two launchers positioned such that the angle of radial alignment defined therebetween is in the range of from at least about 90° to about 180°. The "angle of radial alignment ($\beta$)," is defined as the angle formed between two straight lines drawn from the center of each launcher to the central axis of elongation of the vessel. For example, FIG. 9*c* shows exemplary launchers 845 and 846*a*, defining an angle of radial alignment, $\beta_1$, therebetween. The angle of radial alignment between two launchers positioned on generally opposite sides of a vessel can be at least about 120°, at least about 150°, at least about 165° and/or no more than about 180° or approximately 180°. In one embodiment, two launchers can be positioned on generally opposite sidewalls, as generally depicted in FIG. 9*b*, while, in another embodiment, two oppositely disposed launchers can be positioned at or near the vertical top and bottom of the heater (not shown).

In one embodiment wherein one or more pairs launchers include individual launchers located on generally opposite sides of a microwave heater (e.g., launchers 844*b* and 844*a* or launchers 844*c* and 844*d* in FIG. 9*b*), the individual launchers within the pairs can also be axially aligned with one another. As used herein, the term "axially aligned" refers to two launchers defining an angle of axial alignment therebetween in the range of from 0° to 45°. As used herein, the "angle of axial alignment" can be defined by the angle formed between the shortest straight lines drawn between the centers of each launcher (that also intersects the axis of elongation of the vessel) and a line drawn perpendicular to the axis of elongation. In FIG. 9*d*, the angle of axial alignment, a, is formed between line 850, which is drawn between the centers of exemplary launchers 845 and 846, and line 852, which is perpendicular to the axis of elongation 835*a*. In one embodiment, axially aligned launchers can define an angle of axial alignment of at least about 0° and/or, for example, no more than about 30° or no more than about 15°.

In another embodiment, individual launchers within a pair can be located on generally the same side of a microwave heater. As used herein, the term "generally the same side" or "same side" refers to two launchers having an angle of radial alignment, $\beta$, in the range of from at least or equal to 0° to about 90°. Exemplary launchers 845 and 846*b* in FIG. 9*c* are located on generally the same side of the microwave heater, as the angle of radial alignment defined therebetween (e.g., $\beta_2$) is no more than about 90°. In one embodiment, two launchers disposed on the same side of a microwave heater can define an angle of radial alignment of at least about 0° and/or no more than about 60°, no more than about 30°, and no more than about 15°, or approximately 0°.

In one embodiment wherein one or more pairs of launchers include individual launchers located on generally the same side of a microwave heater (e.g., launchers 844*a* and 844*d* or launchers 844*b* and 844*c* in FIG. 9*b*), the individual launchers within the pairs can also be axially adjacent to one another. As used herein, the term "axially adjacent" refers to two or more launchers positioned on the same side of a microwave heater such that no other launchers on that side are disposed between the axially adjacent launchers. According to one embodiment wherein a microwave distribution system comprises two or more pairs of oppositely positioned microwave launchers, one launcher from the first pair is disposed on generally the same side as one launcher from the second pair, thereby creating an axially adjacent pair of launchers.

As illustrated in FIG. 9*b*, each of microwave launchers 844*a-d* can define a respective open outlet 845*a-d* for emitting microwave energy into the interior of microwave heater 830. Open outlets can be positioned to emit energy into the interior of microwave heater 830 in any suitable pattern or direction. For example, in one embodiment shown in FIG. 9*b*, open outlets of axially adjacent launchers (e.g., outlets 845*a,d* of launchers 844*a,d* and outlets 845*b,c* of launchers 844*b,c*) can be oriented to face each other in a direction substantially parallel to the external sidewall to which the launchers are coupled (e.g., sidewall 831*a* for launchers 844*a,d* and sidewall 831*b* for launchers 844*b,c*), thereby discharging microwave energy in that general direction. As used herein, the term "substantially parallel" means within about 10° of parallel. In one embodiment, at least one of open outlets 845*a-d* can be oriented to discharge energy substantially parallel to the axis of elongation of microwave heater 830, designated as line 835 in FIG. 9*b*. According to one embodiment, at least one of open outlets 845*a-d* can be oriented toward an axial midpoint of heater 830. As used herein, the "axial midpoint" of a vessel is defined by a plane that is orthogonal to axis of elongation 835 and intersects the midpoint 839 of the axis of elongation 835 as shown in FIG. 9*b*. In one embodiment, each of open outlets 845*a-d* are oriented toward the axial mid-point of heater 830 such that the open outlet 845*a,b* of front-side launchers 844*a,b* substantially face towards open outlets 845*c,d* of back-side launchers 844*c,d*, as depicted in FIG. 9*b*.

According to one embodiment, in operation, microwave energy produced by one or more microwave generators (not shown) can be transported via waveguides 842*a-d* to launchers 844*a-d*, which emit the energy into the interior of microwave heater 830. Although not illustrated in FIG. 9*b*, any number or configuration of microwave generators can be used to produce microwave energy for use in microwave heating system 820. In one embodiment, a single generator can be used to supply energy to heater 830 via waveguides 842*a-d* and launchers 844, while, in another embodiment, heating system 820 can include two or more generators. According to another embodiment, a network of one or more microwave generators can be utilized such that microwave energy is emitted from at least one, at least two, at least three, or all four of microwave launchers 844a-d at substantially the same time. In one embodiment, one or more launchers 844a-d can be coupled to a single generator and the energy from the generator can be allocated amongst the launchers using one or more microwave switches. In another embodiment, one or more of launchers 844a-d can have a singly-dedicated generator, such that at least about 75 percent, at least about 90 percent, or substantially all of the microwave energy produced by that generator is routed to a single launcher. Additional details regarding specific embodiments of microwave generators, waveguides, and launchers and the operation thereof are provided shortly, with respect to FIGS. 11a and 11b.

The microwave energy propagated by waveguide segments 842a-d can be in any suitable mode, including, for example, a $TM_{ab}$ mode and/or a $TE_{xy}$ mode, wherein a, b, x, and y have values as previously defined. In one embodiment, waveguide segments 842a-d each comprise $TE_{xy}$ waveguide segments, with segments 842a and 842d configured to penetrate sidewall 831a and segments 842b and 842c configured to penetrate sidewall 831b and extend radially into the interior of microwave heater 830, toward the axis of elongation 835, as shown in FIG. 9b.

According to one embodiment of the present invention, the mode of the microwave energy propagated through waveguide segments 842a-d can be changed prior to (or simultaneously with) being emitted into the interior of microwave heater 830. For example, in one embodiment, $TE_{xy}$ mode energy produced by the microwave generator (not shown in FIG. 9b) can be emitted into microwave energy as $TM_{ab}$ mode energy after passing through one or more mode converting segments, represented in FIG. 9b as mode converters 850a-d. Mode converters can be of any suitable size and shape and any suitable number of mode converters can be used in microwave distribution system 840. In one embodiment, one or more mode converters 850a-d can be disposed outside of the interior space (volume) of microwave heater 830, while, in another embodiment, mode converters 850a-d can be partially, or entirely, disposed within the interior of microwave heater 830. Mode converters 850a-d can be located in or near sidewalls 831a,b or, as illustrated in FIG. 9b, can be spaced from external sidewalls 831a,b of microwave heater 830.

According to one embodiment wherein mode converters 850a-d are partially or entirely disposed within heater 830, the microwave energy can initially enter the microwave heater in a $TE_{xy}$ mode and, subsequently, at least a portion of the energy can be converted such that at least a portion of the energy emitted from launchers 844a-d into the interior of microwave heater 830 can be in a $TM_{ab}$ mode. In one embodiment, waveguide segments 842a-d can comprise $TE_{xy}$ waveguide segments operable to transmit microwave energy from the generator to heater 830 in a $TE_{xy}$ mode. In one embodiment, at least a portion of $TE_{xy}$ waveguide segments 842a-d can be integrated into launchers 844a-d as depicted shown in FIG. 9b. As the energy passes from waveguide segments 842a-d through mode converters 850a-d, the energy is converted to a $TM_{ab}$ mode. Subsequently, the $TM_{ab}$ mode energy exiting mode converters 850a-d can then pass through a respective $TM_{ab}$ waveguide segment 843a-d, illustrated in FIG. 9b as being entirely disposed within the interior of microwave heater 830 and spaced from the sidewalls 833 thereof, before being discharged into heater 830 via $TM_{ab}$ open outlets 845a-d.

According to another embodiment depicted in FIG. 9e, microwave heating system 820 can comprise one or more reflectors 890a-d positioned near the open outlets 845a-d and operable to reflect or disperse microwave energy emitted from launchers 844a-d into microwave heater 830. In one embodiment, the reflectors can be fixed or stationary reflectors, such that energy is reflected or dispersed while the position of the reflector does not change. In another embodiment illustrated in FIG. 9e, one or more of reflectors 890 can be a movable reflector operable to change position in order to reflect or disperse microwave energy into microwave heater 830. Each movable reflector 890a-d in FIG. 9e presents a respective reflecting surface 891a-d for reflecting or dispersing energy emitted from microwave launchers 844a-d. As shown in FIG. 9e, each reflecting surface can be spaced from external sidewalls 831a,b and can be positioned such that one or more of the respective launch openings 845a-d of launchers 844a-d face toward their respective reflective surfaces 891a-d which, in turn, are positioned to contact, direct, or reflect at least a portion of the microwave energy from launch openings 845a-d. In one embodiment, at least a portion of, or substantially all of, the microwave energy emitted from microwave launchers 844a-d can at least partially contact and can be least partially reflected or dispersed by respective reflector surfaces 891a-d. In one embodiment, one or more of reflecting surfaces 891a-d can be oriented to face a direction that is substantially parallel the direction of elongation of external side walls 831a,b.

In one embodiment, reflector surfaces 891a-d can be substantially planar, while, in other embodiment, one or more reflector surfaces 891a-d can be non-planar. For example, in one embodiment, one or more non-planar reflector surfaces 891a-d can define a curvature as illustrated by embodiment depicted in FIG. 9h. Reflector surfaces 891a-d can be smooth or can one or more convexities. As used herein, the term "convexity" refers to a region of a reflector that is surface operable to disperse, rather than reflect, energy therefrom. In one embodiment, a convexity can have a generally convex shape, as illustrated by the examples of convexities 893a,b shown in FIGS. 9f and 9g. In another embodiment, a convexity can have a generally concave shape, such as, for example, a dimple or other similar indentation.

According to one embodiment of the present invention, one or more reflectors 890a-d can be movable reflectors. Movable reflectors can be any reflectors operable to change position. In one embodiment, movable reflectors 890a-b can be oscillating reflectors capable of moving in a designated pattern, such as, for example, a generally up-and-down pattern or a pattern of rotation about an axis. In one embodiment, movable reflectors can be randomly movable reflectors operable to move in any of a variety of random and/or unplanned movements.

Movable reflectors 890a-d can be movably coupled to microwave heater 830 according to any suitable method. For example, in one embodiment illustrated in FIG. 9i, microwave heater 830 can comprise a reflector driver system (or actuator) 899 for movable reflector 890 within the interior space of heater 830. As shown in FIG. 9i, reflector driver system 899 can comprise one or more support arms 892, which fastenably couple reflector 890 to an oscillating shaft 893. In order to cause shaft 893 to rotate and thereby move reflector 890 in an in-and-out pattern, as generally indicated by arrow 880, a motor 898 can turn a wheel 896 to which a linear shaft 895 can be coupled in a generally off-center manner. As indicated by arrow 881, shaft 895 can move in a generally up-and-down manner as wheel 896 turns, thereby causing a lever arm 894 to rotate shaft 893 about pivot axis 897, as generally indicated by arrow 882. As a result, reflector 890 can move as generally indicated by arrow 880 and can be operable to reflect or to disperse at least a portion of the microwave energy emitted from discharge opening 845 of microwave reflector 844 in a pattern determined, at least in part, by the movement of reflector 890.

Yet another embodiment of a microwave heating system 920 is shown in FIGS. 10*a-f*. As illustrated in one embodiment FIG. 10*a*, a microwave heater 930 comprises a heater entrance door 938 for loading a bundle of wood 902 into the interior of heater 930 and a heater exit door 939 for removing bundle 902 from microwave heater 930. Although illustrated in FIG. 10*a* as including separate entrance and exit doors 938, 939, it should be understood that microwave heater 930 can, in another embodiment, include only a single door for both loading and unloading bundle of wood 902 from the interior of microwave heater 930. In the embodiment shown in FIG. 10*a*, heater entrance and exit doors 938, 939 can be located on generally opposite ends of microwave heater 930 such that bundle 902 can be generally passed through heater 930 via a transport mechanism, such as, for example, a cart (not shown). In addition, microwave heating system 920 can comprise an optional vacuum system (not shown) for controlling the pressure in heater 930.

As shown in FIG. 10*a*, microwave heating system 920 can include a microwave distribution system 940 comprising a plurality of spaced launch openings 941*a-d* defined in an external sidewall 931 of microwave heater 930. Each launch opening 941 can be operable to receive a microwave launcher (not shown) for emitting energy into the interior of microwave heater 930. Microwave launchers can be at least partly, or entirely, disposed within the interior of microwave heater 930. Specific embodiments of one or more types of microwave launchers will be discussed in more detail shortly.

Figure 10B:
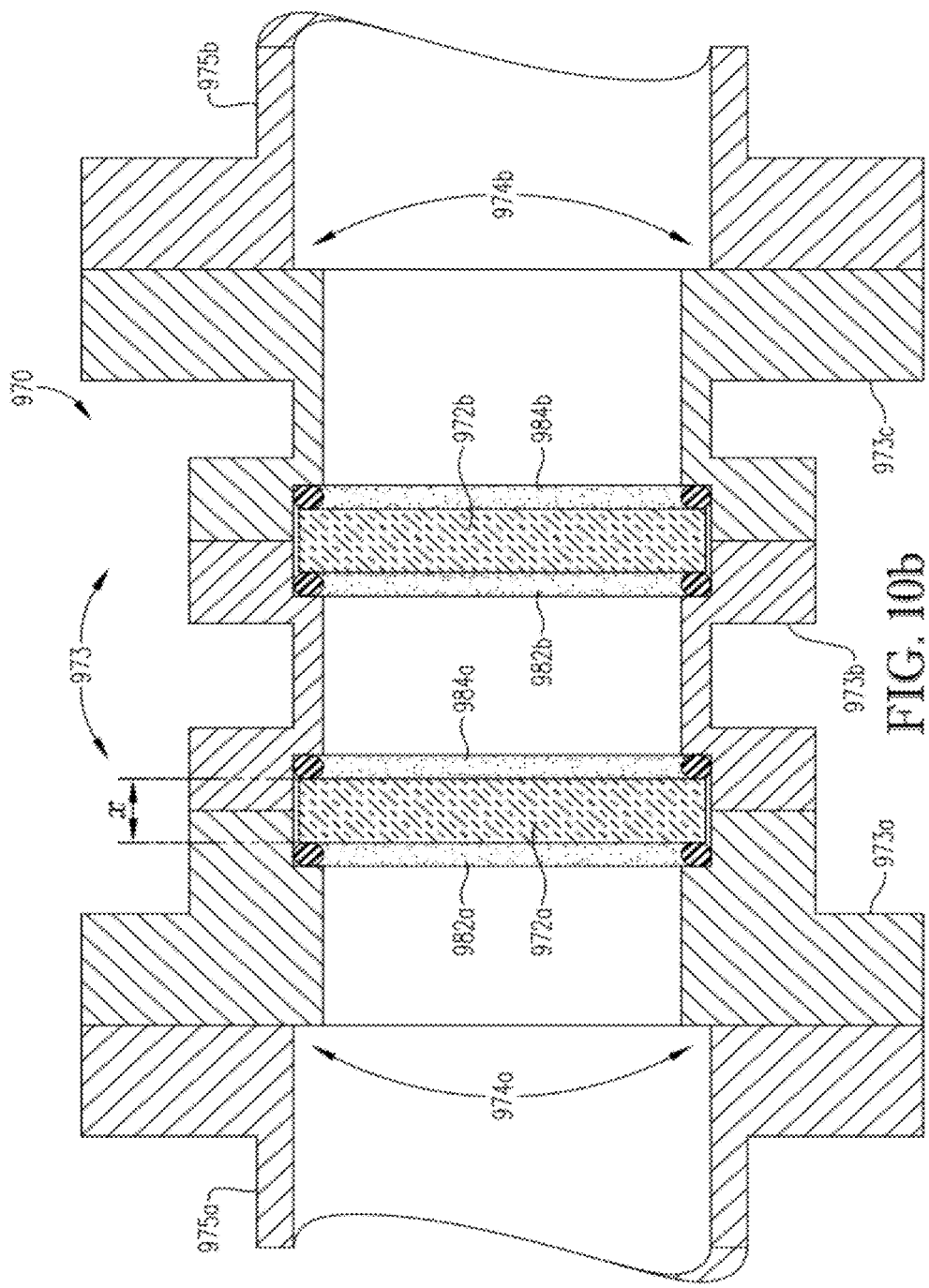
FIG. 10b is an axial sectional view of one of the $TM_{ab}$ barrier assemblies depicted in FIG. 10a, particularly illustrating the barrier assembly as having two floating, sealed windows and impedance transforming diameter step-changes near the junction of the barrier assembly and the waveguides between which the barrier assembly is coupled.

According to one embodiment, microwave energy produced by a microwave generator (not shown) can be transmitted in a $TE_{xy}$ mode through waveguide segments 942*a-d* prior to passing through external $TE_{xy}$-to-$TM_{ab}$ mode converters 950*a-d*, which convert the energy passing therethrough to a $TM_{ab}$ mode. The resulting $TM_{ab}$ mode microwave energy can then exit mode converters 950*a-d* via respective waveguide segments 942*e-h*, as illustrated in FIG. 10*a*. Thereafter, at least a portion of the microwave energy in $TM_{ab}$ waveguide segments 942*e-h* can be passed through respective barrier assemblies 970*a-d* prior to entering microwave heater 930 via $TM_{ab}$ waveguide segments 942*i-l*. As used herein, the term "barrier assembly" can refer to any device operable to fluidly isolating the microwave heater from an external environment, while still permitting the passage of microwave energy therethough. For example, in one embodiment shown in FIG. 10*a*, respective barrier assemblies 970*a-d* can each comprise at least one sealed window member 972*a-d*, which can be permeable to microwave energy, but provides a desired degree fluid isolation between each upstream 942*e-h* $TM_{ab}$ waveguide segment and each of downstream 942*i-l* $TM_{ab}$ waveguide segments. As used herein, the term "sealed window member" refers to a window member configured in a manner that it will provide sufficient fluid isolation between the two spaces on either side of the window member to allow maintaining a pressure differential across such window member. Additional details regarding specific embodiments of barrier assemblies 970*a-d* will now be discussed in detail, with respect to FIG. 10*b*.

Barrier assemblies configured according to one embodiment of the present invention minimize or eliminate arcing, even at high energy throughputs and/or low operating pressures. According to one embodiment of the present invention, each barrier assembly 970*a-d* can permit energy passage at a rate of at least about 5 kW, at least about 30 kW, at least about 50 kW, at least about 60 kW, at least about 65 kW, at least about 75 kW, at least about 100 kW, at least about 150 kW, at least about 200 kW, at least about 250 kW, at least about 350 kW, at least about 400 kW, at least about 500 kW, at least about 600 kW, at least about 750 kW, or at least about 1,000 kW and/or not more than about 2,500 kW, not more than about 1,500 kW, or not more than about 1,000 kW through its respective window member 972*a-d*, while the pressure in microwave heater 930 can be no more than about 550 torr, no more than about 450 torr, no more than about 350 torr, no more than about 250 torr, no more than about 200 torr, no more than about 150 torr, no more than about 100 torr, or no more than about 75 torr. In one embodiment, the pressure in microwave heater can be no more than about 10 millitorr, no more than about 5 millitorr, no more than about 2 millitorr, no more than about 1 millitorr, no more than about 0.5 millitorr, or no more than about 0.1 millitorr. In one embodiment, the microwave energy passed through barrier assemblies 970*a-d* can be introduced such that the electromagnetic field is maintained lower than the threshold of arcing to thereby prevent or minimize arcing in barrier assemblies 970*a-d*.

Turning now to FIG. 10*b*, an axial cross-sectional view of a barrier assembly 970 is provided. Barrier assembly 970 comprises a first sealed window member 972*a* and an optional second sealed window member 972*b* disposed within a barrier housing 973. When present, second sealed window member 972*b* can be operable to cooperate with first sealed window member 972*a* to provide a desired level of fluid isolation between the upstream (e.g., entry) and downstream (e.g., exit) $TM_{ab}$ waveguide segments 975*a,b* while permitting the passage of at least a portion of the microwave energy from first $TM_{ab}$ waveguide segment 975*a* to second $TM_{ab}$ waveguide segment 975*b*. According to one embodiment, first and second $TM_{ab}$ waveguide segments 975*a,b* can have circularly cylindrical cross-sections. In one embodiment, waveguide segments 975*a,b* can be two ends of a single continuous waveguide, in which barrier assembly 970 can be disposed, while, in another embodiment, waveguide segments can be two separate waveguide portions or components suitably fastened or coupled to either side of barrier assembly 970.

As shown in FIG. 10*b*, barrier housing 973 can comprise a first or entry section 973*a*, an optional second or intermediate section 973*b*, and third or exit section 973*c*, with first sealed window member 972*a* disposed between first and second sections 973*a,b* and second sealed window member 972*b* disposed between second and third sections 973*b,c*. According to one embodiment, the pressure of each of first, second, and third segments 973*a,b,c* can be different. For example, in one embodiment, the pressure of first segment 973*a* can be greater than the pressure of second segment 973*b*, which can be greater than the pressure of third segment 973*c*. Each of first, second, and third sections 973*a-c* of barrier housing 973 can be held together by any suitable fastening device (not shown), such as, for example screws, bolts, and the like. Further, barrier assemblies 970*a-d* can also comprise one or more impedance transformers, which alter the impedance of the microwave radiation. An example is illustrated as impedance transforming diameter step changes 974*a,b* in the embodiment shown in FIG. 10*b*, for maximizing energy transfer from the microwave generator (not shown) to the load in the microwave heater (not shown). In one embodiment, impedance transforming diameter step changes 974*a,b* can be located near at least one of sealed window members 972*a,b* while, in another embodiment, step changes 974*a,b* can be located near or at least partially defined by the entry and/or exit $TM_{ab}$ waveguides 975*a,b*.

As illustrated in FIGS. 10a and 10b, sealed window members 972a,b can comprise one or more discs. Each disc can be constructed of any material with a suitable degree of corrosion resistance, strength, impermeability to fluids, and permeability to microwave energy. Examples of suitable materials can include, but are not limited to, aluminum oxide, magnesium oxide, silicon dioxide, beryllium oxide, boron nitride, mullite, and/or polymeric compounds such as TEFLON. According to one embodiment, the loss tangent of the disc can be no more than about $2\times10^{-4}$, no more than about $1\times10^{-4}$, no more than about $7.5\times10^{-5}$, or no more than about $5\times10^{-5}$.

The discs can have any suitable cross-section. In one embodiments discs can have a cross-section compatible with the cross-section of the adjoining waveguides 975a,b. In one embodiment, the discs can have a substantially circular cross-section and can have a thickness, designated in FIG. 10b as "x", equal to at least about ⅛, at least about ¼, at least about ½ and/or no more than about 1, no more than about ¾, or no more than about ½ of the length of the predominant wavelength of the microwave energy passing through barrier assembly 970. The diameter of the discs can be at least about 50 percent, at least about 60 percent, at least about 75 percent, at least about 90 percent and/or no more than about 95 percent, no more than about 85 percent, no more than about 70 percent, or no more than about 60 percent of the diameter of one or more adjoining waveguides 975a,b.

Each disc of sealed window members 972a-d can be operably coupled to respective barrier assembly 970a-d in any suitable fashion. In one embodiment, each of sealed window members 972a-d can comprise one or more sealing devices flexibly coupled to barrier housing 973 and/or sealed window members 972a,b. As used herein, the term "flexibly coupled" means fastened, attached, or otherwise arranged such that the members are held in place without directly contacting one or more rigid structures. For example, in one embodiment shown in FIG. 10b, barrier assembly 970 can comprise a plurality of resilient rings 982a,b and 984a,b compressed between various segments 973a-c of and operable to flexibly couple sealed window members 972a,b into barrier housing 973.

According to one embodiment, each respective upstream 982a,b and downstream 984a,b resilient rings can be operable to adequately prevent or limit fluid flow between first and second 973a,b and/or second and third 973b,c sections of barrier assembly 970. For example, when subjected to a helium leak test according to procedure B1 entitled "Spraying Testing" described in the document entitled "Helium Leak Detection Techniques" published by Alcatel Vacuum Technology using a Varian Model No. 938-41 detector, the fluid leak rate of sealed window members 972a-d and/or barrier assemblies 970a-d can be no more than about $10^{-2}$ torr liters/sec, no more than about $10^{-4}$ torr liters/sec, or no more than about $10^{-8}$ torr liters/sec. In addition, each of sealed window members 972a,b can individually be operable to maintain or withstand a pressure differential across sealed window members 972a,b and/or barrier assembly 970 in amounts such as at least about 0.25 atm, at least about 0.5 atm, at least about 0.75 atm, at least about 0.90 atm, at least about 1 atm, or at least about 1.5 atm without out breaking, cracking, shattering, or otherwise failing.

Figure 10C:
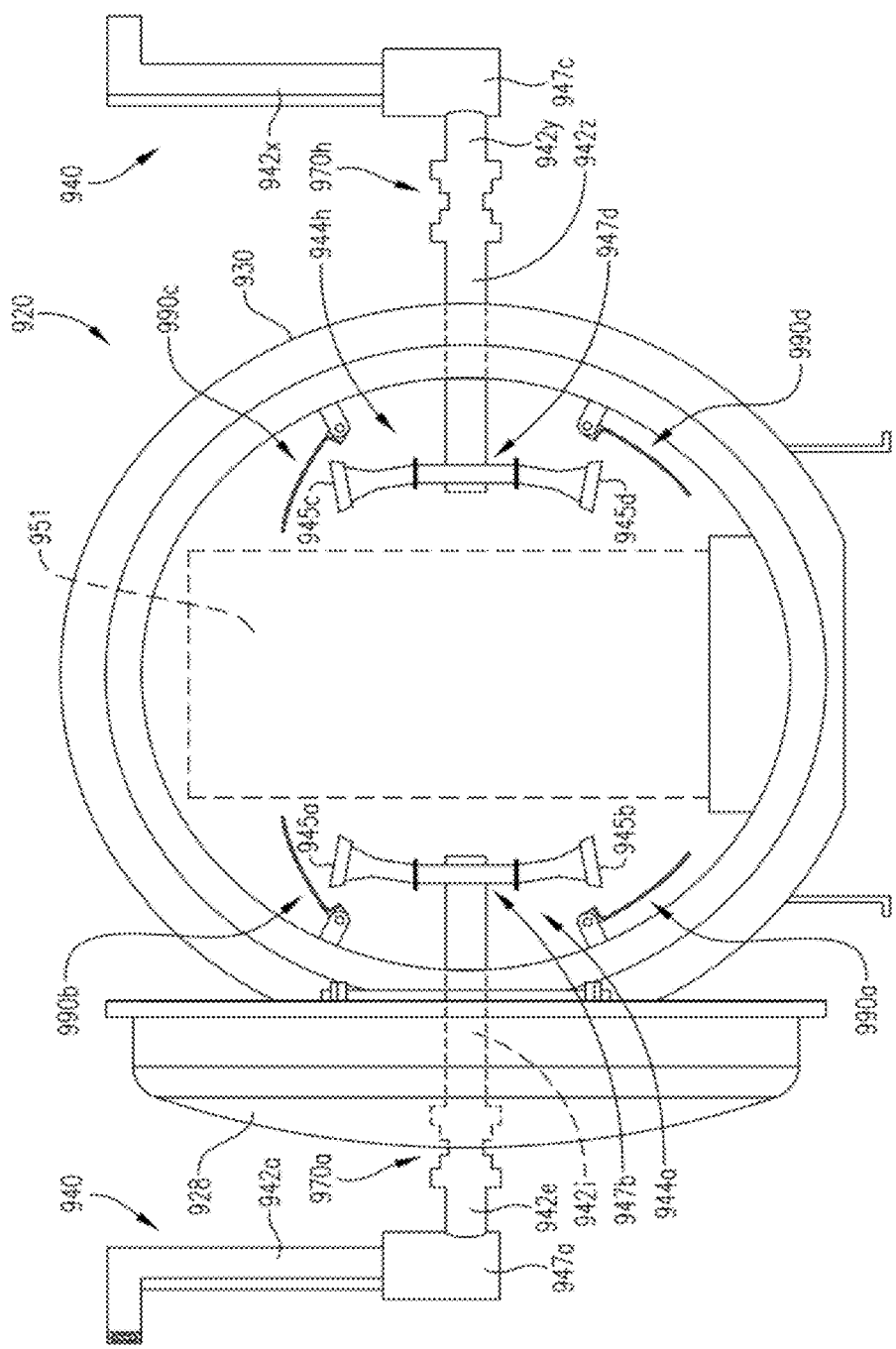
FIG. 10c is an end view of the microwave heating system depicted in FIG. 10a with a bundle of wood being received in the interior of the microwave heater, particularly illustrating the microwave heater as being equipped with split microwave launchers on opposite sides of the heater and movable reflectors for rastering microwave energy emitted from the split launchers.

Turning now to FIG. 10c, a cross-sectional microwave heating system 920 is provided. The microwave heating system depicted in FIG. 10c includes a microwave distribution system 940 comprising at least one pair of microwave launchers (e.g., launchers 944a and 944h) disposed on generally opposite sides of a microwave heater 930. Although shown as including a single pair of launchers in FIG. 10c, it should be understood that microwave distribution system 940 can further comprise one or more additional pairs of similarly (or somewhat differently) configured microwave launchers having, in some embodiments, one launcher from each pair disposed on generally opposite sides of microwave heater 930. Further, in another embodiment (not shown in FIG. 10c), microwave distribution system 940 may comprise two or more rows vertically-spaced microwave launchers positioned on the generally same side of microwave heater 930. In one embodiment, each side of microwave heater 930 can include two or more vertically-spaced rows of launchers, such that one launcher from each oppositely-disposed pair may be located at a higher vertical elevation than one launcher from another oppositely-disposed pair. For example, in one embodiment, launchers 944a and/or 944h could be positioned at a slightly higher vertical elevation than depicted in FIG. 10c and another launcher pair could be positioned such that one of the two launchers would be positioned on the same side of microwave heater 930, but at a generally lower vertical elevation than launcher 944a, and the other launcher would be positioned on the same side of microwave heater 930, but at a generally lower vertical elevation than launcher 944h. Furthermore, although shown as split launchers 944a,h, the vertically-spaced launchers, in one embodiment, could be any type (or any combination of types) of microwave launchers described herein.

As shown in FIG. 10c, microwave distribution system 940 comprises a plurality of waveguide segments 942 coupled to at least one pair of microwave launchers 944a,h. For example, as shown in the embodiment in FIG. 10c, launcher 944a can be coupled to waveguide segments 942a, 942e, and 942i, while launcher 944h can be coupled to waveguide segments 942x, 942y, and 942z operable to deliver microwave energy from one or more microwave generators (not shown in FIG. 10c) to the interior of microwave heater 930. In one embodiment, microwave distribution system 940 can include one or more mode converters 947a-d, as shown in FIG. 10c, coupled to one or more of waveguide segments 942. According to one embodiment, mode converters 947a-d can be operable to change the transmission mode of the microwave energy passing therethrough from a $TE_{xy}$ mode to a $TM_{ab}$ mode (i.e., a $TE_{xy}$-to-$TM_{ab}$ mode converter) or from a $TM_{ab}$ mode to a $TE_{xy}$ mode (i.e., a $TM_{ab}$-to-$TE_{xy}$ mode converter). For example, as shown in FIG. 10c, mode converters 947a and 947c can each be operable to convert the microwave energy transmitted through waveguides 942a and 942x from a $TE_{xy}$ mode to a $TM_{ab}$ mode as it passes into waveguides 942e and 942y. As discussed previously, the values of a, b, x, and y can be the same or different and can have the values provided above. Optionally, mode converters 947b and 947d can be operable to convert the microwave energy transmitted through waveguides 942e and 942i as well as the energy transmitted through 942y and 942z from a $TM_{ab}$ mode to a $TE_{xy}$ mode.

Further, in one embodiment illustrated in FIG. 10c, at least one of mode converters 947a-d can comprise a mode converter splitter operable both to change the mode of the microwave energy passing therethrough and to split it into two or more separate streams of microwave energy for discharge into the interior space of the microwave heater. According to one embodiment, second mode converters 947b and 947d can each comprise mode converting splitters at least partially disposed within the interior of microwave heater 930. In another embodiment, second mode converting splitters 947b and 947d can be entirely disposed within the interior of microwave heater 930 and can each be a part of a split launcher 944a and 944h, respectively, as illustrated in FIG. 10c. Additional details regarding split launchers 944a,h will be discussed shortly.

According to one embodiment of the present invention wherein the microwave distribution system 940 comprises two or more mode converters in one or more waveguide segments, the total electrical length between the first and second mode converters, extending through and including the electrical length of any barrier assembly (if present) can be equal to a value that is a non-integral number of half-wavelengths of the competing mode of microwave energy passing therethrough. As used herein, the term "electrical length" refers to the electrical path of transmission of the microwave energy, expressed as the number of wavelengths of the microwave energy required to propagate along a given path. In one embodiment wherein the physical transmission path includes one or more different type of transmission media having two or more different dielectric constants, the physical length of the transmission path can be shorter than the electrical length. Thus, electrical length depends on a number of factors including, for example, the specific wavelength of microwave energy, the thickness and type (e.g., dielectric constant) of the transmission medium or media.

According to one embodiment, the total electrical length between the first mode converter 947a,c and the second mode converter 947b,d extending through and including the total electrical length of the $TM_{ab}$ barrier assembly 970a,h can be equal to a non-integral number of half-wavelengths of the competing mode of microwave energy. As used herein, the term "non-integral" refers to any number that is not a whole number. A non-integral half-wavelength, then, may correspond to a distance of n times $\lambda/2$, wherein n is any non-integral number. For example, the number "2" is a whole number, while the number "2.05" is a non-integral number. Thus, an electrical length corresponding to 2.05 times the half-wavelength of the competing mode of microwave energy would be a non-integral number of half-wavelengths of that competing mode.

As used herein, the term "competing mode of microwave energy" refers to any mode of microwave energy propagating along a given path other than the desired or target mode of microwave energy intended for propagation along that path. The competing mode may include a single, most prevalent mode (i.e., the predominant competing mode) or a plurality of different, non-prevalent competing modes. When multiple competing modes are present, the total electric length between the first and second mode converters, extending through and including the electrical length of any barrier assembly (if present), can be equal to a value that is a non-integral number of half-wavelengths of at least one of the multiple competing modes and, in one embodiment, can be equal to a value that is a non-integral number of half-wavelengths of the predominant competing mode.

For example, in one embodiment depicted in FIG. 10c, first mode converters 947a,c comprise $TM_{ab}$ mode converters operable to convert at least a portion of the microwave energy in respective waveguide segments 942a and 942d from a $TE_{xy}$ mode into a $TM_{ab}$ mode in waveguide segments 942b and 942e. However, in practice, at least a portion of the microwave energy may be converted into a mode other than the desired mode. Any mode other than the desired mode is generally referred to herein as the "competing mode" of microwave energy. In one embodiment of the present invention wherein the desired mode of microwave energy is a $TM_{ab}$ mode, the competing mode of microwave energy may be a $TE_{mn}$ mode, wherein n is 1 and m is an integer between 1 and 5. Thus, in one embodiment, the total electrical length of the $TM_{ab}$ waveguides 942e and 942i between first and second mode convertors 947a and 947b, extending through and including the electrical length of barrier assembly 970a, can be equal to a non-integral number of half-wavelengths of the $TE_{mn}$ mode, wherein n is 1 and m is an integer between 1 and 5. In another embodiment, m can be 2 or 3.

In one embodiment, selecting physical lengths and properties of waveguide segments 942, mode converters 947a-d, and/or barrier assemblies 970a,h can minimize energy concentration within barrier assemblies 970a,h. For example, according to one embodiment, while at least about 5 kW, at least about 30 kW, at least about 50 kW, at least about 60 kW, at least about 65 kW, at least about 75 kW, at least about 100 kW, at least about 150 kW, at least about 200 kW, at least about 250 kW, at least about 350 kW, at least about 400 kW, at least about 500 kW, at least about 600 kW, at least about 750 kW, or at least about 1,000 kW and/or not more than about 2,500 kW, not more than about 1,500 kW, or not more than about 1,000 kW of energy can be passed through barrier assemblies 970a,h, the temperature of at least a portion of at least one sealed window member within barrier assemblies 970a,h (not shown in FIG. 10c) can change by no more than about 10° C., no more than about 5° C., no more than about 2° C. or no more than about 1° C. In another embodiment, the pressure differential across the at least one sealed window member and/or the pressure within microwave heater 930 can be maintained as described above with similar results.

According to one embodiment illustrated in FIG. 10c, at least one of the individual microwave launchers 944a,h located on generally opposite sides of and at least partially disposed within the interior of microwave heater 930 can comprise a split launcher defining at least two discharge openings for emitting microwave energy into the interior of microwave heater 930. Although illustrated as comprising a single pair (e.g., a first split launcher 944a and a second split launcher 944h) of launchers in FIG. 10c, it should be understood that microwave heater 930 can comprise any suitable number of launchers or pairs of launchers, as described herein.

One embodiment of a split launcher 944 is depicted in FIG. 10d. Split launcher 944 can comprise a single inlet or openings 951 for receiving microwave energy and a single (not shown) or two or more discharge openings, or outlets, 945a,b for emitting microwave energy therefrom. In one embodiment, the ratio of microwave energy inlets to discharge outlets for a single split launcher can be 1:1, at least 1:2, at least 1:3, or at least 1:4. According to one embodiment, the mode of the microwave energy introduced into inlet 951 can be the same as the mode of the microwave energy emitted via discharge openings 945a,b, while, in another embodiment, the modes can be different. For example, in one embodiment wherein split launcher 944 comprises a mode converting splitter 949, the microwave energy introduced into a single inlet of a first sidewall of a microwave heater can undergo a mode conversion and be divided into at least two separate microwave energy portions, which can subsequently be emitted into the interior of the heater, optionally in a different mode. For example, in one embodiment shown in FIG. 10d, split launcher 944 can comprise a $TM_{ab}$ waveguide segment 942, one or two or more $TE_{xy}$ waveguide segments 943a,b and a $TM_{ab}$ to $TE_{xy}$ mode converting splitter 949 disposed therebetween. In operation, microwave energy in a $TM_{ab}$ mode introduced via waveguide segment 942 passes through mode converting splitter 949 before being discharged, simultaneously or nearly simultaneously, in one or two or more separate fractions of microwave energy from respective outlets 945a,b of waveguides 943a,b in a $TE_{xy}$ mode.

When launcher 944 comprises a single discharge opening, mode converting splitter 949 can simply be a mode converter 949 (not a splitter) for changing the mode of the microwave energy passing therethrough. For example, in one embodiment wherein launcher 944 comprises a single discharge opening (not shown in FIG. 10*d*), launcher 944 can comprise a single $TM_{ab}$ waveguide segment, a single $TE_{xy}$ waveguide segment, and a $TM_{ab}$-to-$TE_{xy}$ mode converter 949 disposed therebetween. The mode converter can be located outside, partially inside, or completely inside the interior of the microwave heater. In operation, microwave energy in a $TM_{ab}$ mode introduced via the inlet waveguide segment can pass through mode converter 949 before being discharged in a $TE_{xy}$ mode. The discharge opening of the single-opening launcher can be oriented at any suitable angle with respect to the horizontal or can be substantially parallel to the horizontal. In one embodiment, the energy discharged from the single-opening launcher can be oriented from the horizontal by an angle of at least about 20°, at least about 30°, at least about 45°, or at least about 60° and/or not more than about 100°, not more than about 90°, or not more than about 80°.

When multiple discharge openings are present, each of discharge openings 945*a,b* of split launcher 944 can be oriented from each other such that the paths of microwave energy discharged therefrom define a relative angle of discharge, θ, as shown in FIG. 10*d*. In one embodiment, the relative angle of discharge between the paths of microwave energy discharge openings 945*a,b* can be at least about 5°, at least about 15°, at least about 30°, at least about 45°, at least about 60°, at least about 90°, at least about 115°, at least about 135°, at least about 140° and/or no more than about 180°, no more than about 170°, no more than about 165°, no more than about 160°, no more than about 140°, no more than about 120°, no more than about 100°, or no more than about 90°. In one embodiment, the orientation of discharge openings 945*a,b* can also be described with respect to the orientation of the paths of the microwave energy discharged therefrom relative to the axis of extension 948 of $TM_{ab}$ waveguide segment 942. In one embodiment, each of discharge openings 945*a,b* can be configured to discharge microwave energy at respective first and second discharge angles ($\phi_1$ and $\phi_2$) from the axis of extension 948 of $TM_{ab}$ waveguide segment 942. In one embodiment, $\phi_1$ and $\phi_2$, can be approximately equal, as generally depicted in FIG. 10*d*, or, in another embodiment, one of the two angles can be larger than the other. In various embodiments, $\phi_1$ and/or $\phi_2$ can be at least about 5°, at least about 10°, at least about 15°, at least about 30°, at least about 35°, at least about 55°, at least about 65°, at least about 70° and/or no more than about 110°, no more than about 100°, no more than about 95°, no more than about 80°, no more than about 70°, no more than about 60°, or no more than about 40°.

In one embodiment, split launcher 944 can be a vertically-oriented split launcher such launcher 944 comprises at least one upward-oriented discharge opening (e.g., 945*a*) configured to emit microwave energy at an upward angle from the horizontal and at least one downward-oriented discharge opening (e.g., 945*b*) configured to emit microwave energy at a downward angle from the horizontal. Although depicted in FIG. 10*c* as comprising vertically-oriented split launchers 944*a,h* configured to discharge energy at angles relative to the horizontal, in another embodiment, one or more of split launchers 944*a,h* of microwave heater 930 can be horizontally-oriented, such that the split launcher, as described above, has been are rotated by 90°. In another embodiment, one or more split launchers 944*a,h* can be rotated by an angle between 0° and 90°. In one embodiment (not shown), a microwave heater can include two or more vertically-spaced rows of horizontally-oriented split launchers located on one side of the heater and two or more vertically-spaced rows of horizontally-oriented split launchers on the other, generally opposite side of the same heater. According to this embodiment, the vertically-spaced rows of launchers can comprise single-opening launchers, horizontally-oriented split launchers, vertically-oriented split launchers, or any combination thereof.

In one embodiment shown in FIG. 10*c*, microwave heater 930 can comprise one or more (or at least two) movable reflectors 990*a-d* positioned at various locations within microwave heater 930 and configured to raster microwave energy emitted from one or more discharge openings 945*a-d* of one or more microwave launchers 944*a,h* into the interior of microwave heater 930. Reflectors 990*a-d* can have any suitable configuration, such as, for example, configurations including one or more of the features previously described with respect to FIGS. 9*f-h*. Further, although generally illustrated as comprising four movable reflectors 990*a-d*, it should be understood that microwave heater 930 can comprise any suitable number of movable reflectors. In one embodiment, a microwave heater comprising n split launchers can comprise at least 2n movable reflectors. In another embodiment, a microwave heater can employ a total of four movable reflectors, each defining a reflector surface that extends substantially along the length of microwave heater 930, such that two or more axially adjacent launchers "share" one or more reflectors or reflecting surfaces.

Regardless of the specific number of reflectors employed, each reflector 990*a-d* can be operable to raster at least a portion of the microwave energy exiting launchers 944*a,h* via discharge openings 945*a-d* into microwave heater 930 to thereby heat and/or dry at least a portion of the bundle or other object, article, or load. As used herein, the term "raster" means to direct, project, or concentrate energy over a certain area. In contrast to conventional reflecting or dispersing energy, rastering energy involves a greater degree of intentional directing or concentrating, which can be accomplished by utilizing the quasi-optical properties of microwave energy. In contrast to conventional means, rastering does not include use of stationary reflection surfaces or conventional mode stirring devices, such as fans. In one embodiment, the microwave heater can comprise a plurality of split launcher pairs (e.g., two or more pairs of launchers), wherein each pair comprises two launchers having substantially similar configurations (as described above). In one embodiment, one launcher of each pair can be positioned on generally opposite sides or on the same side of the microwave heater, as discussed in detail previously, with respect to FIGS. 9*c* and 9*d*. According to one embodiment, one or more movable reflectors 990*a-d* can be positioned near (and/or positioned to face) one or more discharge openings of each of microwave launchers 944. In one embodiment wherein first and second launchers 944*a* and 944*h* each comprise split microwave launchers defining respective upward-oriented discharge openings 945*a* and 945*c* and respective downward-oriented discharge openings 945*b* and 945*d*, at least one movable reflector can be positioned near one or more of discharge openings 945*a-d* to raster at least a portion of the microwave energy discharged from split launchers 944*a,h* (e.g., two or more separate $TE_{xy}$ mode microwave portions) into the interior of microwave heater 930. In one embodiment illustrated in FIG. 10*c*, microwave heater 930 can comprise at least four movable reflectors, each defining a respective reflecting surface and positioned near respective discharge openings 945*a-d* of split launchers 944*a,h*. As illustrated in FIG. 10*c*, movable reflectors 990*a-d* can be located in the bottom left quadrant (e.g., reflector 990*a*), the top left quadrant (e.g., reflector 990*b*), the top right quadrant (e.g., reflector 990*c*), and the bottom right quadrant (e.g., reflector 990*d*) of microwave heater 930. Two or more of reflectors 990*a-d* can also be present when launchers 944*a,h* are horizontally-oriented split launchers or single-opening launchers, as described in detail previously.

Movable reflectors 990*a-d* can be configured in two vertically-spaced pairs (e.g., reflector 990*a* paired with reflector 990*b* and reflector 990*c* paired with reflector 990*d*) and/or in two horizontally-spaced pairs (e.g., reflector 990*b* paired with reflector 990*c* and reflector 990*a* paired with reflector 990*d*). As illustrated in FIG. 10*c*, pairs of vertically-spaced reflectors (e.g., reflector pair 990*a,b* and 990*c,d*) can be positioned near split launchers 944*a,h* such that one movable reflector is positioned near each of discharge openings 945*a-d* of launchers 944*a,h* (e.g., discharge openings 945*a-d* face towards respective movable reflectors 990*a-d*). As depicted in FIG. 10*c*, movable reflectors 990*b* and 990*c* can be positioned at a higher vertical elevation than respective movable reflectors 990*a* and 990*d*, such that split launchers 944*a,h* can be vertically positioned between vertically-spaced pairs of launchers (e.g., launcher 944*a* vertically positioned between vertically-spaced pair of reflectors 990*a,b* and launcher 944*h* vertically positioned between vertically-spaced pair of reflectors 990*c,d*). In one embodiment, movable reflector 990 is positioned such that reflector surface 991 faces toward an open outlet of its corresponding microwave launcher (not shown). In another embodiment, one or more movable reflectors 990*a-d* can be positioned in alignment with or positioned to face the central axis of elongation of microwave heater 930 (not shown in FIG. 10*c*).

Movable reflectors 990*a-d* can be directly or indirectly coupled to one or more side walls of a microwave heater and can be moved or actuated in any suitable fashion. One or more of the reflectors 990*a-d* can move along a pre-programmed (planned) path, or one or more can be caused to move in a random or non-repeating pattern. When multiple reflectors 990*a-d* are present, two or more reflectors 990*a-d* can have the same or similar pattern of movement, in one embodiment, while, in the same or another embodiment, two or more reflectors 990*a-d* can have different patterns of movement. According to one embodiment, at least one of reflectors 990*a-d* can move in a generally arcuate-shaped path and can pass through various segments or "regions" of the overall path with a certain speed and/or residence time. The size and number of regions, as well as the speed with which the reflector moves through each region or the reflector residence time in each region depend on a variety of factors, such as for example, the size and type of the bundle, the type of wood, and the preliminary and desired characteristics of the initial and final bundle.

In one embodiment, each of reflectors 990*a-d* can be individually driven or actuated according to one or more embodiments described herein, while, in another embodiment, two or more reflectors can be connected to a common drive mechanism (e.g., rotating shaft to be actuated at the same time. One example of a drive mechanism for moving a reflector 990 using an actuator 960 is shown in FIG. 10*e*. Actuator 960 can be a linear actuator having a fixed portion 961 coupled to a sidewall 933 of the microwave heater and an extensible portion 963 connected to a movable reflector 990. According to one embodiment illustrated in FIG. 10*e*, at least part of fixed portion 961 can extend through external side wall 933 and into a bellows structure 964, thereby sealingly coupling actuator 960 to side wall 933. In one embodiment, bellows structure 964 can be operable to reduce, minimize, or nearly prevent fluid flow into or out of the location where actuator 960 extends through side wall 933. As shown in FIG. 10*e*, movable reflector 990 further comprises a support arm 980 pivotally coupled to side wall 933 of the microwave heater. As used herein, the term "pivotally coupled" refers to two or more objects attached, fastened, or otherwise associated such that at least one of the objects can generally move or pivot about a fixed point. In operation, a driver 970 moves extensible portion 963 of linear actuator 960 in an in-and-out type motion, as indicated by arrow 971. Extensible portion 963 of linear actuator 960 allows movable reflector 990 to move in a generally arcuate pattern, as indicated by arrow 973. Driver 970 can be controlled in any suitable manner, including, for example, using one or more programmable automatic control systems (not shown).

According to one embodiment of the present invention, it may be advantageous to minimize the amount of unoccupied, unobstructed, or open volume defined within the interior of a microwave heater. As used herein, the term "total open volume" refers to the total volume of space within the interior of the vessel not occupied by physical obstructions when a bundle of wood is not disposed in the vessel. In one embodiment of the present invention, the ratio of the total volume of the bundle of wood (including spaces between individual pieces of wood) to the total open volume of the microwave heater can be at least about 0.20, at least about 0.25, at least about 0.30, at least about 0.35. In some of the foregoing embodiments, the ratio is also no more than about 0.75, no more than about 0.70, or no more than about 0.65.

In one embodiment, the microwave heater can define an unobstructed bundle-receiving space for receiving a bundle of wood. The unobstructed bundle receiving space can also be configured to receive at least a portion of the microwave energy emitted to heat and/or dry one or more objects (or bundles) therein. Unobstructed bundle-receiving space of microwave heater 930 is denoted as 951 in FIG. 10*c*. As used herein, the term "unobstructed bundle-receiving space" refers to a space defined within the interior of a microwave heater that is capable of receiving and holding a bundle of wood. In one embodiment, the unobstructed bundle receiving space can define a volume of a similar shape and within about 10 percent of the volume occupied by the largest size bundle of wood able to be loaded and/or processed within microwave heater 930. For example, if the largest bundle size able to be accommodated by microwave heater was 1,000 cubic feet, the unoccupied bundle receiving space would have a volume, in one embodiment of about 1,100 cubic feet and a similar shape (e.g., cuboidal) as the bundle processed within heater 930.

The bundle receiving space may be "unobstructed" because it may not include any physical obstructions (e.g., waveguides, launchers, reflectors, etc.) disposed therein on a permanent basis. In one embodiment of the present invention, the microwave heater can comprise a circular cross-sectional shape, while unobstructed bundle-receiving space 951 can define a cuboidal volume and/or be configured to receive a bundle of wood having a cuboidal shape. In one embodiment, the ratio of the total open volume of microwave heater 930 to the volume of the unobstructed bundle-receiving space can be at least about 0.20, at least about 0.25, at least about 0.30, at least about 0.35. In some of the foregoing embodiments, the ratio is also no more than about 0.75, no more than about 0.70, or no more than about 0.65.

According to one embodiment, at least a portion of the unobstructed bundle receiving space 951 can be defined between two or more "obstructions," including, for example, two or more launchers, reflectors, waveguides, or other objects located on the same or generally opposite sides of microwave heater 930 that take up physical space within the interior volume of the heater. In one embodiment wherein microwave heater 930 comprises two oppositely-disposed doors (e.g., an entrance door 928 and an exit door disposed on generally opposite ends of microwave heater 930), at least a portion of unobstructed bundle receiving space 951 can be defined between the two oppositely-disposed doors. In one embodiment illustrated in FIG. 10c, none of launchers 944a,h or movable reflectors 990a-d, which are examples of obstructions, are disposed within unobstructed bundle space 951. In one embodiment wherein at least a portion of the unobstructed bundle receiving space is defined between two or more obstructions (e.g., waveguides, launchers, reflectors, etc.), the minimum clearance between the outermost edges of one or more obstructions and the unobstructed bundle-receiving space (and/or the bundle, when present) can be at least about 0.5 inches, at least about 1 inch, at least about 2 inches, at least about 6 inches, at least about 8 inches and/or no more than about 18 inches, no more than about 10 inches, or no more than about 8 inches. In one embodiment, one of the obstructions do not physically contact the bundle when loaded into heater 930.

One or more embodiments of the operation of a microwave heating system according to the present invention will now be described, with general reference to a process for heating a bundle of wood. However, it should be understood that one or more elements of the heating processes described herein can also be suitable for use in processes for heating other items, as, for example, those processes described previously. Furthermore, it should be understood that one or more of the above-described embodiments of microwave heating systems, including those discussed with respect to FIGS. 8-10 and variations thereof, can be operated using at least some, or all, of the operational steps, methods, and/or processes described in detail below.

To initiate heating of a bundle of wood, the wood can first be loaded into a microwave heater, which can be configured according to one or more embodiments of the present invention previously described. In one embodiment, the bundle can have an overall initial weight (e.g., prior to heating) of at least about 100 pounds, at least about 250 pounds, at least about 375 pounds, or at least 500 pounds prior to heating and/or drying. Once loaded, the vacuum system, if present, can then be used to reduce the pressure of the heater to no more than about 550 torr, no more than about 450 torr, no more than about 350 torr, no more than about 300 torr, no more than about 250 torr, no more than about 200 torr, no more than about 150 torr, no more than about 100 torr, or no more than about 75 torr.

While maintaining the sub-atmospheric pressure in the microwave heater, one or more microwave generators can then be operated to begin introducing microwave energy into the interior of the vessel to thereby heat and/or dry at least a portion of the bundle. During the introduction of microwave energy into the interior of the microwave heater, the pressure within the vessel can be above, nearly at, or below atmospheric pressure. According to one embodiment, the pressure of the interior of the microwave heater during the heating step can be at least 350 torr, at least about 450 torr, at least about 650 torr, at least about 750 torr, at least about 900 torr, or at least about 1,200 torr, while, in another embodiment, the pressure in microwave heater can be no more than about 350 torr, no more than about 250 torr, no more than about 200 torr, no more than about 150 torr, no more than about 100 torr, or no more than about 75 torr. The total generator capacity or the rate of energy introduced into the interior of the microwave heater during the heating and/or drying of the wood can be at least about 5 kW, at least about 30 kW, at least about 50 kW, at least about 60 kW, at least about 65 kW, at least about 75 kW, at least about 100 kW, at least about 150 kW, at least about 200 kW, at least about 250 kW, at least about 350 kW, at least about 400 kW, at least about 500 kW, at least about 600 kW, at least about 750 kW, or at least about 1,000 kW and/or not more than about 2,500 kW, not more than about 1,500 kW, or not more than about 1,000 kW.

According to one embodiment, the process of heating a bundle of wood can comprise a plurality of individual sequential heating cycles. The overall heating process can comprise at least 2, at least 3, at least 4, at least 5, at least 6 and/or no more than 20, no more than 15, no more than 12, or no more than 10 individual sequential heating cycles. Each heating cycle can include the introduction of microwave energy, optionally at sub-atmospheric pressure. In one embodiment, microwave energy can be introduced into the microwave heater under a pressure of not more than about 350 torr, while, in other one embodiment, the pressure in the microwave heater can be at least about 350 torr.

According to one embodiment, each of the one or more individual heating cycles can be carried out for (e.g., have a duration of) at least about 2 minutes, at least about 5 minutes, at least about 10 minutes, at least about 20 minutes, at least about 30 minutes and/or no more than about 180 minutes, no more than about 120 minutes, or no more than about 90 minutes. Overall, the entire length of the heating process (e.g., overall cycle time) can be at least about 0.5 hours, at least about 2 hours, at least about 5 hours, or at least about 8 hours and/or no more than about 36 hours, no more than about 30 hours, no more than about 24 hours, no more than about 18 hours, no more than about 16 hours, no more than about 12 hours, no more than about 10 hours, no more than about 8 hours, or no more than 6 hours.

In one embodiment, wherein the overall heating process comprises two or more individual heating cycles, one or more subsequent individual heating cycles can be carried out with a different input rate of microwave energy and/or at a different pressure than the previous cycle. For example, in one embodiment, the subsequent individual heating cycles can be carried out at a lower input rate of microwave energy and/or at a lower pressure than the previous cycle. In another embodiment, one or more subsequent individual heating cycles can be carried out at a higher input rate of microwave energy and/or at a higher pressure than the previous cycle. In yet another embodiment, one or more subsequent cycles can be carried out at a lower input rate of microwave energy and a higher pressure or a higher input rate of microwave energy and a lower pressure than one or more previous individual heating cycles. When the overall heating process includes two or more individual heating cycles, one or more of the second (or later) cycles may be carried out as described above, according to some embodiments. In other embodiments, two or more cycles can be carried out at the same or nearly the same pressure and/or input rate of microwave energy.

According to one embodiment, the overall heating process can include a first sequential heating cycle followed by a second heating cycle, wherein the second heating cycle is carried out with a lower input rate of microwave energy than the first heating cycle, a lower pressure than the first heating cycle, or both a lower input rate of microwave energy and a lower pressure than the first heating cycle. Further, in one embodiment when the overall cycle comprises three or more heating cycles, the input rate of microwave energy and/or pressure of each subsequent cycle (other than the first) can be lower than the input rate of microwave energy and/or pressure of the previous cycle. For example, in one embodiment, the nth individual heating cycle can be carried out at a lower input rate of microwave energy, a lower pressure, or both a lower input rate of microwave energy and a lower pressure than the (n−1)th individual heating cycle.

During the first individual heating cycle, a first maximum input rate of microwave energy can be introduced into the microwave heater. As used herein, the term "maximum input rate of microwave energy" refers to the highest rate at which microwave energy is introduced into the heater during a heating cycle. In various embodiments, the maximum input rate of microwave energy introduced during the first individual heating cycle (e.g., the first maximum input rate of microwave energy) can be, for example at least about 5 kW, at least about 30 kW, at least about 50 kW, at least about 60 kW, at least about 65 kW, at least about 75 kW, at least about 100 kW, at least about 150 kW, at least about 200 kW, at least about 250 kW, at least about 350 kW, at least about 400 kW, at least about 500 kW, at least about 600 kW, at least about 750 kW, or at least about 1,000 kW and/or, for example, not more than about 2,500 kW, not more than about 1,500 kW, not more than about 1,000 kW, or not more than 500 kW.

Subsequently, a second individual heating cycle can be carried out such that the second maximum input rate at which microwave energy is introduced into the microwave heater during the second individual heating cycle (e.g., the second maximum input rate of microwave energy) can, in some embodiments, be, for example, at least about 25 percent, at least about 50 percent, at least about 70 percent and/or, for example, no more than about 98 percent, no more than about 94 percent, or no more than about 90 percent of the maximum input rate achieved during the first heating cycle. Similarly, when the heating process comprises three or more individual heating cycles, the maximum input rate of microwave energy of the nth individual heating cycle (e.g., third or fourth cycle) in one embodiment can be, for example, at least about 25 percent, at least about 50 percent, at least about 70 percent and/or, for example no more than about 98 percent, no more than about 94 percent, no more than about 90 percent, or no more than about 85 percent of the maximum input rate during the (n−1)th (e.g., previous) individual heating cycle.

In one embodiment, the second (or subsequent) individual heating cycle can be carried out at a lower pressure than the first (or previous) individual heating cycle. For example, in one embodiment wherein sub-atmospheric or vacuum pressure is utilized during the heating cycle, the lowest pressure reached during the first heating cycle can be at least about 250 torr. Subsequently, a second individual heating cycle can be carried out such that the lowest pressure reached (e.g., highest level of vacuum pressure achieved) during the second cycle can, in one embodiment, for example, be at least about 25 percent, at least about 50 percent, at least about 70 percent, at least about 75 percent, at least 80 percent and/or in one embodiment, for example, no more than about 98 percent, no more than about 94 percent, or no more than about 90 percent of the lowest pressure reached during the first heating cycle. Similarly, when the heating process comprises three or more individual heating cycles, the pressure of the nth individual heating cycle in one embodiment, for example, can be at least about 25 percent, at least about 50 percent, at least about 70 percent, at least about 75 percent, at least 80 percent and/or no more than about 98 percent, no more than about 94 percent, no more than about 90 percent of the lowest pressure reached, or no more than 85 percent of the lowest pressure reached during the (n−1)th individual heating cycle.

Table 1, below, summarizes broad, intermediate, and narrow ranges for the microwave energy rate, expressed as a percent of maximum generator output, and the pressure, expressed in torr, for consecutive first, second, third, and nth individual heating cycles, according to one embodiment of the present invention. As used herein, the term "maximum generator output" refers to the maximum combined over the entire array cumulatively generated by all of the microwave generators within a heating system. In one embodiment, the maximum input rate of microwave energy for one or more heating cycles can also be expressed as a percentage of maximum generator output, as shown in Table 1.

TABLE 1

Microwave Energy Rate and Pressures for Individual Heating Cycles

| Indi-vidual Cycle No. | Rate of Microwave Energy, % of Max | | | Pressure, torr | | |
|---|---|---|---|---|---|---|
| | Broad | Inter-mediate | Narrow | Broad | Inter-mediate | Narrow |
| 1 | 60-100% | 70-100% | 80-100% | <250 | <200 | 20-100 |
| 2 | 40-100% | 50-95% | 60-90% | <250 | <200 | 20-100 |
| 3 | 20-80% | 25-75% | 30-70% | <250 | <150 | 20-100 |
| n | 5-60% | 10-50% | 15-40% | <150 | <100 | 10-75 |

According to one embodiment of the present invention, each of the one or more individual heating cycles can comprise a heating period (e.g., a first, second, or nth heating period), wherein microwave energy is introduced into the heater, and an optional resting period (e.g., a first, second, or nth resting period) wherein a reduced amount or substantially no microwave energy is introduced into the heater. For example, during the heating period, microwave energy can be introduced into the microwave heater at an input rate sufficient to heat and/or at least partially dry at least a portion of the wet or chemical-wet bundle of wood, while, during the resting period, the input rate of microwave energy introduced into microwave heater can, in one embodiment, be no more than about 25 percent, no more than about 10 percent, no more than about 5 percent, or no more than about 1 percent of the maximum input rate of microwave energy introduced during the heating period. In one embodiment wherein multiple individual heating cycles are employed, each cycle can include one or more heating periods and one or more rest periods. For example, when two individual sequential heating cycles are utilized, the first individual heating cycle can include at least a first heating period and a first resting period, while the second individual heating cycle can include at least a second heating period and a second resting period. Alternatively, the second heating period can follow the first heating period with no interim resting period.

In one embodiment, each of the heating periods can have, for example, a duration of at least about 5 minutes, at least about 10 minutes, at least about 15 minutes, at least about 30 minutes and/or, for example, no more than about 60 minutes, no more than about 40 minutes, no more than about 30 minutes, or no more than about 20 minutes. In one embodiment, the resting period can have a duration of, for example, at least about 5 minutes, at least about 10 minutes, or at least about 20 minutes and/or, for example, no more than about 90 minutes, no more than about 60 minutes, or no more than about 40 minutes. In one embodiment, the ratio of the length of the heating period to the length of the resting period of an individual heating cycle can be for example, at least about 0.5:1, at least about 1:1, at least about 1.25:1, or at least 2:1 and/or, for example, no more than about 5:1, no more than about 3:1, no more than about 2.5:1, or no more than about 1.5:1.

Microwave energy can be introduced into the microwave heater during each of the heating periods in any suitable manner. For example, in one embodiment, microwave energy can be emitted from one or more launchers in a substantially continuous manner throughout the entire duration of the heating period.

In one embodiment, energy can be emitted from one single launcher at a time, while, in another embodiment, energy can be emitted from two or more launchers simultaneously. The amount, timing, duration, coordination, and synchronization of microwave energy discharged from each of the launchers can be controlled using an automatic control system. When the discharge of energy into the microwave heater includes switching between two or more launchers, the switching can also be controlled by the control system, as discussed in detail shortly.

According to one embodiment, energy can be introduced into the microwave heater such that each heating period can include two or more different heating modes (also called discharge modes, discharge phases, or heating phases). In one embodiment, different rates of microwave energy can be emitted from one or more launchers during each heating phase. For example, in one embodiment, during a first heating phase, energy can be emitted from a first launcher at a higher rate than is emitted from a second launcher, while, during a second heating phase, energy can be emitted from the second launcher at a higher rate than from the first launcher. According to one embodiment, one or more launchers can emit microwave energy into the microwave heater, while one or more launchers can emit substantially no energy into the microwave heater, thereby focusing energy onto different locations of the bundle of wood (or other object). Each separate heating phase can be carried out for a period (i.e, have a duration) of, for example at least about 2 minutes, at least about 5 minutes, at least about 12 minutes, at least about 15 minutes and/or, for example, no more than about 90 minutes, no more than about 60 minutes, no more than about 45 minutes or no more than about 30 minutes. An optional resting period of at least about 2 minutes, at least about 4 minutes, or at least about 6 minutes and/or no more than about 15 minutes, no more than about 12 minutes, or no more than about 10 minutes can follow one or both separate heating phases.

When the microwave heater comprises four or more launchers, the microwave distribution system can be configured such that each launcher emits microwave energy into the microwave heater in a separate heating or discharge phase, depending on the position of one or more microwave switches. For example, in one embodiment wherein the microwave heater comprises a first, second, third, and fourth microwave launcher, two or more microwave switches (e.g., a first and a second microwave switch) can be configured such that microwave energy can be predominantly emitted from each launcher in a respective first, second, third, and fourth heating phase. In one embodiment, two or more discharge phases can be carried out at substantially the same time, while two or more discharge phases can be prevented from being carried out substantially the same time. Additional details regarding operation of microwave heaters utilizing heating periods that include alternating discharge phases will now be discussed in detail below, with reference to FIGS. 11a and 11b.

Figure 11A:
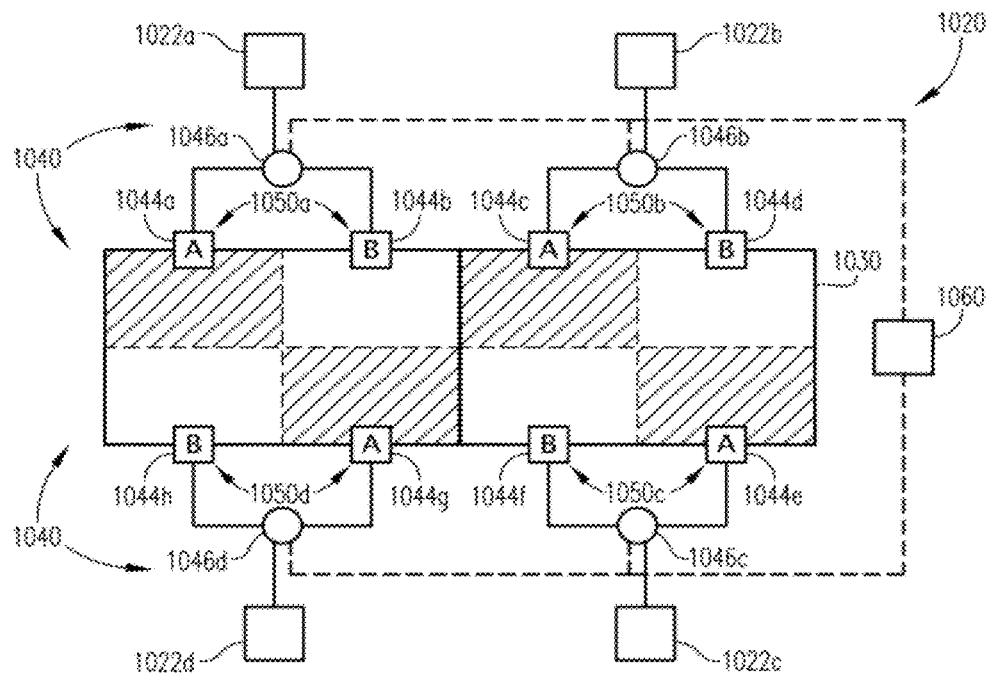
FIG. 11a is a schematic top view of a microwave heating system configured in accordance with one embodiment of the present invention, particularly illustrating the heating system as including a plurality of microwave switches for routing microwave energy to different microwave launchers in an alternating fashion.
Figure 11B:
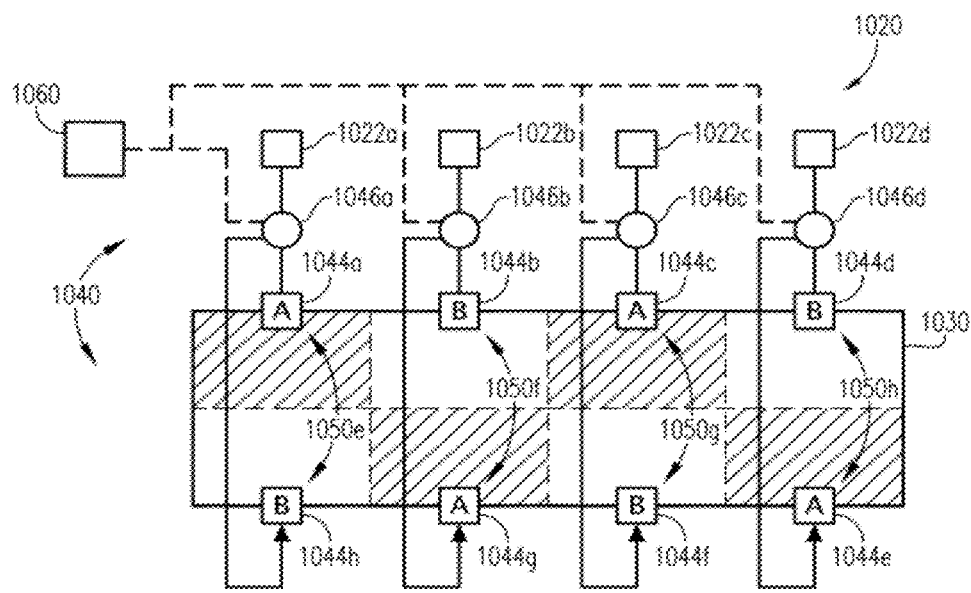
FIG. 11b is a schematic view of a microwave heating system configured in accordance with an alternative embodiment of the present invention, particularly illustrating the heating system as including a plurality of microwave switches for routing microwave energy to different microwave launchers in an alternating fashion.

Turning now to FIGS. 11a and 11b, schematic top views of a microwave heating system 1020 configured according to one embodiment of the present invention are provided. Microwave heating system 1020 is illustrated as comprising at least four microwave generators 1022a-d for producing microwave energy and a microwave distribution system 1040 for directing at least a portion of the microwave energy into a microwave heater 1030. Microwave distribution system 1040 also comprises a plurality of spaced microwave launchers 1044a-h (which, in one embodiment, can comprise one or more split launchers) operable to emit at least a portion of microwave energy into the interior of microwave heater 1040. Each of microwave launchers 1044a-h can be operably coupled to one or more of a plurality of (in this figure, a first through fourth) microwave switches 1046a-d, as shown in FIGS. 11a and 11b. Microwave switches 1046a-d can be operable to route microwave energy to one or more of launchers 1044a-h in any suitable mode including, for example, a $TM_{ab}$ mode and/or a $TE_{xy}$ mode, as discussed in detail previously. In one embodiment, the energy propagated through microwave distribution system 1040 can change modes at least once prior to being discharged into microwave heater 1030. Various configurations and methods of operating microwave heating system 1020 according to one or more embodiments of the present invention will now be described in detail below, with reference to FIGS. 11a and 11b.

Each of microwave switches 1046a-d can be operable to direct, control, or allocate the flow of microwave energy to each of two or more microwave launchers 1044a-h positioned on generally the same side or generally opposite sides of microwave heater 1030. For example, in one embodiment depicted in FIG. 11a, each of microwave switches 1046a-d can be coupled to a pair of axially adjacent microwave launchers (e.g., launchers 1044a and 1044b, launchers 1044c and 1044d, launchers 1044e and 1044f, and launchers 1044g and 1044h), represented as launcher pairs 1050a-d. In another embodiment illustrated in FIG. 11b, each of microwave switches 1046a-d can be coupled to a pair of axially aligned microwave launchers (e.g., launchers 1044a and 1044h, launchers 1044b and 1044g, launchers 1044c and 1044f, and launchers 1044d and 1044e), shown as launcher pairs 1050e-h.

Microwave switches 1046a-d can be any suitable type of microwave switch and, in one embodiment, can be a rotary microwave switch. A rotary microwave switch can include an outer housing, an internal routing element disposed therein, and an actuator for moving the internal routing element within the housing. In one embodiment, the internal routing element can be rotatably coupled to the outer housing and the actuator can be operable to selectively rotate the internal routing element, relative to the outer housing, to thereby switch or direct the direction of flow of the microwave energy passing therethrough. Other types of suitable microwave switches can also be employed. In one embodiment, microwave switches 1046a-d can comprise $TE_{xy}$ switches, while, in another embodiment, microwave switches 1046a-d can comprise $TM_{ab}$ switches. Any additional suitable components, such as one or more mode converters, barrier assemblies, or components discussed elsewhere in this application but not shown in FIGS. 11a and 11b, can be located upstream or downstream microwave switches 1046a-d.

In operation, microwave switches 1046a-d can be selectively switchable between a first heating (or discharge) phase and a second heating (or discharge) phase. During the first heating phase, more energy can be emitted or discharged from one or more microwave launchers, while less energy is emitted from one or more other microwave launchers. Similarly, during the second heating phase, more energy can be emitted or discharged from one or more other microwave launchers, while less energy can be emitted or discharged from one or more microwave launchers.

In one embodiment, during the first heating phase, each of microwave switches 1046a-d can be configured to route microwave energy predominantly to one or more launchers within a first set of microwave launchers (labeled as set of "A" launchers in FIGS. 11a and 11b) and not predominantly to one or more launchers of a second set of microwave launchers (labeled as a set of "B" launchers in FIGS. 11a and 11b). During the second discharge phase, each of microwave switches 1046a-d can be configured to route microwave energy predominantly to one or more launchers of the second set (e.g., the "B" launchers) and not predominantly to one or more launchers of the first set (e.g., the "A" launchers) in each of respective pairs of launchers 1050a-d and 1050e-h, in FIGS. 11a and 11b. As used herein, references to routing microwave energy "predominantly" to launcher X and "not predominantly" to launcher Y means that at least about 50 percent of the microwave energy received by a switch is routed to launcher X, while no more than about 50 percent of the microwave energy received by the switch is routed to launcher Y. In one embodiment, for example at least about 75 percent, at least about 90 percent, at least about 95 percent, substantially all of the energy can be predominantly routed to launcher X, while, for example no more than about 25 percent, no more than about 10 percent, no more than about 5 percent or substantially none of the energy can be routed to launcher Y.

In one embodiment, microwave heating system 1030 can further comprise a control system 1060 for controlling the action and configuration of microwave switches 1046a-d. In one embodiment, control system 1060 can be operable to configure each of switches 1046a-d to be in the first discharge phase, such that all "A" launchers (e.g., launchers 1044a,c,e,g) emit microwave energy into microwave heater 1030, while all "B" launchers (e.g., launchers 1044b,d,f,h) emit a smaller amount of, or substantially no microwave energy into the interior of microwave heater 1030, as illustrated by the respective shaded and un-shaded regions of microwave heater 1030 in FIGS. 11a and 11b. Subsequently, control system 1060 can then be operable to configure each of switches 1046a-d to be in the second discharge phase, such that all "A" launchers (e.g., launchers 1044a,c,e,g) emit a smaller amount of, or substantially no microwave energy into the interior of microwave heater 1030, while all "B" launchers (e.g., launchers 1044b,d,f,h) emit microwave energy into the interior of microwave heater 1030 (not represented in FIGS. 11a and 11b).

According to one embodiment, control system 1060 can also be operable to control the switching of microwave switches 1046a-d between the first and second discharge phases based on a set of predetermined parameters including, for example, cycle time, total energy discharged, and the like. For example, in one embodiment, control system 1060 can be operable to configure each of microwave switches 1046a-d into the first discharge phase substantially simultaneously, such that microwave energy can be emitted from each of the "A" launchers 1044a,c,e,g simultaneous for a period of time. In another embodiment, control system 1060 can be operable to include a time delay or lag between configuring one or more switches 1046a-d into the first discharge phase. As a result, the microwave energy emitted from one or more "A" or "B" launchers may be delayed or staggered, relative to the discharge of energy from one or more other "A" or "B" launchers. In one embodiment, control system 1060 may be configured to allow one or more switches 1046a-d to be in the first discharge phase, while one or more other switches 1046a-d are in the second discharge phase, such that microwave energy can be emitted from one or more "A" launchers and one or more "B" launchers simultaneously. In one embodiment of the present invention, control system 1060 can also be operable to at least partially prevent simultaneous energy discharge from directly opposed pairs of launchers (e.g., pair 1044a and 1044h, pair 1044b and 1044g, pair 1044c and 1044f, pair 1044d and 1044e) and/or axially adjacent pairs (e.g., pair 1044a and 1044b, pair 1044c and 1044d, pair 1044e and 1044f, pair 1044g and 1044h).

Heating systems configured and/or operated according to one embodiment of the present invention can be operable to heat an object or load more efficiently than conventional heating systems. In particular, heating systems configured according to various embodiments of the present invention can be operable to process large, commercial-scale loads. In one embodiment, heating systems as described herein can heat a bundle of wood or other load having a cumulative, pre-heating (or pre-treatment) weight of at least about 100 pounds, at least about 500 pounds, at least about 1,000 pounds, at least about 5,000 pounds, or at least about 10,000 pounds. In various embodiments, a bundle of wood can be heated and/or dried such that no more than, for example, about 20 percent, no more than about 10 percent, no more than about 5 percent, and no more than about 2 percent of the total volume of wood can reach a temperature that does exceed an upper threshold temperature. In the same or other embodiments, at least about 80 percent, at least about 90 percent, at least about 95 percent, and at least about 98 percent, for example, of the total volume of wood can reach a temperature that does exceed a lower threshold temperature. The lower and upper threshold temperatures can be relatively close to one another and can, for example, be within about 110° C., within about 105° C., within about 100° C., within about 90° C., within about 75° C., or within about 50° C. of each other. In various embodiments, the upper threshold temperature can be at least about 190° C., at least about 200° C., or at least about 220° C. and/or no more than about 275° C., no more than about 260° C., no more than about 250° C., or no more than about 225° C. In another embodiment, the lower threshold temperature can be at least about 115° C., at least about 120° C., at least about 125° C., at least about 130° C. and/or no more than about 150° C., no more than about 145° C., or no more than about 135° C.

According to one embodiment, at least about 80 percent, at least about 90 percent, at least about 95 percent, and at least about 98 percent of the total volume of the wood can reach a maximum temperature of at least about 130° C., at least about 145° C., at least about 150° C., or at least about 160° C. and/or no more than about 250° C., no more than about 240° C., no more than about 225° C., no more than about 210° C., or no more than about 200° C. As a result, a bundle of wood (optionally a chemical-wet bundle of wood) having an initial (e.g., pre-heating or pre-treatment) weight of at least about 100 pounds, at least about 500 pounds, at least about 1,000 pounds, or at least about 5,000 pounds can be heated in no more than about 48 hours, no more than about 36 hours, no more than about 24 hours, no more than about 18 hours, no more than about 16 hours, no more than about 12 hours, no more than about 10 hours, no more than about 8 hours, or no more than about 6 hours.

The various aspects of the present invention can be further illustrated and described by the following Examples. It should be understood, however, that these Examples are included merely for purposes of illustration and are not intended to limit the scope of the invention, unless otherwise specifically indicated.

EXAMPLES

Example 1

Determination of Energy Distribution Profile within a Bundle

This example provides actual data obtained from a pilot-scale microwave heater used to heat and/or dry a bundle of acetylated wood. Thermal images were used to construct an energy distribution profile, which will then be correlated, in prophetic Example 2, to predict chemical moisture profiles of wood heated on a commercial scale.

A horizontally-elongated microwave heater similar to the heater illustrated in FIGS. 10a, c, d, and e was constructed with an outer diameter of 12 feet and an overall length of 16 feet. The heater included an entrance door for loading and unloading the bundle from the vessel. Four split microwave launchers similar to those illustrated in FIGS. 10c and 10d were arranged in two oppositely-disposed pairs and were connected to a FERRITE 75 kW 915 MHz microwave generator (commercially available from Ferrite Microwave Technologies, Inc. in Nashua, N.H.) via a system of $TE_{10}$ waveguides. Three microwave switches were configured to route energy from the generator to one of the two launchers of each pair, as described in detail below.

The microwave heater also included four movable reflectors similar to those illustrated in FIG. 10c. Each reflector defined a continuous reflective surface extending substantially along the length of the heater. Each of the four split launchers were vertically positioned between a pair of movable reflectors such that the energy emitted from the respective upward- and downward-oriented discharge openings of each split launcher was rastered into the interior of the microwave heater by the reflective surfaces disposed in each of the four quadrants of the internal volume of the heater. Each reflective surface was rotated along a generally arcuate path via a shaft, which utilized an external driver. Details regarding the motion of the movable reflectors will be described in detail shortly.

Figure 12:
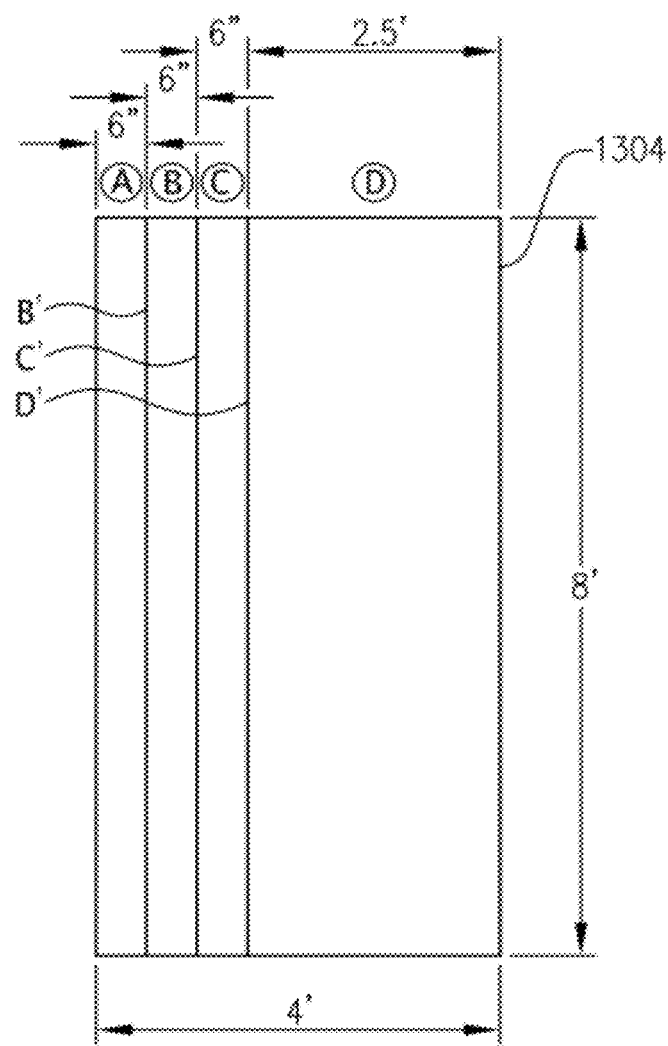
FIG. 12 is a schematic representation of a bundle of wood, particularly illustrating the configuration utilized when determining interior surface temperatures as described in Example 1.

Approximately 15,000 pounds of acetylated Radiata pine was allowed to moisture-equilibrate in the ambient atmosphere such that the average water content of the wood was about 2-3 weight percent. The wood was then bundled into a composite bundle comprising four individually-secured stacks (e.g., stacks A-D shown in FIG. 12a). The composite bundle, represented as bundle 1304 in FIG. 12a, had nominal dimensions of 4 feet wide by 8 feet tall by 16 feet long. Each of stacks A-C had a width of 6 inches, while stack D had a width of 2.5 feet. Composite bundle 1304 was introduced into the microwave heater and the door was closed and secured prior to initiating the heating cycle.

First, the microwave switches were configured such that the energy from the generator would be routed to two diagonally opposite (e.g., oppositely-disposed, axially-staggered) launchers at the same time, while the remaining two diagonally opposite launchers remained idle. The generator was then started and set to deliver 75 kW to the first diagonally opposite pair of launchers, in a manner similar to the one discussed previously with respect to launcher set "A" of FIGS. 11a and 11b. Next, after about 10 minutes, the generator was stopped and the microwave switches were reconfigured to route energy from the first active set of diagonally opposite launchers to the idle set of diagonally opposite launchers during the second heating mode. The generator was then restarted at 75 kW and microwave energy was again discharged into the heater. After another 10 minutes, the generator was stopped so that the switches could be returned to the original configuration, thereby re-routing energy back to the first pair of diagonally opposite launchers. This sequence of alternatively discharging energy from axially-staggered pairs of launchers continued in 10-minute increments for a total of 80 minutes (e.g., 100 kW-hr).

During each heating mode, the energy discharged from each of the microwave launchers was rastered into the interior of the microwave heater by controlling the motion and position of each of the movable reflectors. A programmable logic controller (PLC) was set to rotate each reflector, using a servo motor, through various portions (or regions) of its total arcuate path at various speeds. The top and bottom pairs of reflectors were programmed to move at the same speed, but the movement of one reflector of each pair was initiated before the other, thereby avoiding both reflectors of the pair moving in synchronized tandem. Table 2 below, summarizes the boundaries (e.g., starting and ending position) and total length of each of the eight regions of motion, as well as the reflector speed and time spent in each region (e.g., residence time) for each of the top and bottom pairs of reflectors, expressed as a percentage of the overall reflector cycle time. Note that Table 2 summarizes only half of the profile for each reflector; once each pair of reflectors moved through regions 1-8 as described below, each reflector then traveled in a reverse pattern, beginning with region 8 and moving back to region 1.

TABLE 2

Profile for Movable Reflectors

| | | | | | Top Reflectors | | Bottom Reflectors | |
| --- | --- | --- | --- | --- | --- | --- | --- | --- |
| Region | Starting Position (°) | Ending Position (°) | Length of Path (°) | Length of Path (%) | Speed (°/s) | Residence Time (% of Cycle) | Speed (°/s) | Residence Time (% of Cycle) |
| 1 | 0.0 | 0.1 | 0.1 | 0.31% | 0.07 | 0.9 | 0.05 | 1.0 |
| 2 | 0.1 | 4.0 | 3.9 | 12.19% | 0.10 | 23.3 | 0.05 | 24 |
| 3 | 4.0 | 8.0 | 4.0 | 12.50% | 1.82 | 1.0 | 1.82 | 1.3 |
| 4 | 8.0 | 12.0 | 4.0 | 12.50% | 1.82 | 1.0 | 1.82 | 1.3 |
| 5 | 12.0 | 16.0 | 4.0 | 12.50% | 1.82 | 1.0 | 1.82 | 1.3 |
| 6 | 16.0 | 24.0 | 8.0 | 25.00% | 1.82 | 2.0 | 1.82 | 2.6 |
| 7 | 24.0 | 28.0 | 4.0 | 12.50% | 0.25 | 7.5 | 0.26 | 9.5 |
| 8 | 28.0 | 32.0 | 4.0 | 12.50% | 0.04 | 48.0 | 0.04 | 59.0 |

Once the overall heating cycle was complete, the generator was turned off and the heated composite bundle was transported to a holding zone wherein a MIKRON 7500 model camera with a wide angle lens was positioned approximately 10 feet from one of the elongated sides of the heated bundle. Stack A, the outermost stack of boards shown in FIG. 12, was removed from the composite bundle to thereby expose an interior surface of stack B, designated as B' in FIG. 12. The camera recorded thermal images of surface B' at a rate of 1 image per every 5 seconds and, after about 20 seconds, stack B was removed from the composite bundle. The camera then began recording thermal images of an interior surface of stack C, designated as surface C' in FIG. 12. After about 20 seconds, stack C was removed from the bundle, thereby exposing the internal surface of stack D, designated as surface D' in FIG. 1. The camera recorded thermal images of surface D' for about 20 seconds and was then stopped.

To analyze the composite temperature distribution throughout the volume of the bundle, pixel-by-pixel temperature data obtained within a representative region of interest for each of surfaces B' through D' was imported into a spreadsheet using MikroSpec™ Professional thermal imaging software (version 4.0.5, available from Metrum in Berkshire, UK). A cumulative frequency histogram, incorporating thermal data obtained from all interior surfaces B' through D' of the composite bundle is shown in FIG. 13.

Figure 13:
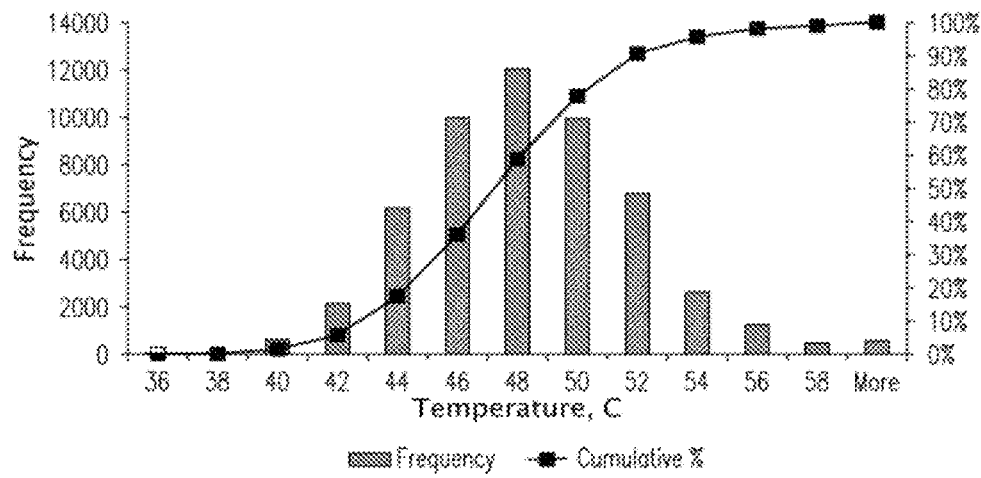
FIG. 13 is a cumulative frequency histogram incorporating thermal data obtained from surfaces B' through D' of the composite bundle shown in FIG. 12.

As shown in FIG. 13, less than 20 percent of the volume of the bundle had a temperature below 42° C. or above 52° C. When correlated to a bundle of dried, acetylated wood, this type of energy distribution results in the predicted chemical moisture content profile, described in prophetic Example 2.

Example 2

Calculation of Chemical Moisture Content Profile within an Acetylated Bundle

This prophetic example uses the experimental energy distribution data obtained in Example 1 to predict the chemical moisture profile (e.g., amount and distribution of one or more heat removable chemicals within the total volume) of acetylated wood heated and/or dried in a commercial-scale microwave heating system configured similarly to the system described previously in Example 1.

A bundle of acetylated wood, having dimensions of approximately 101 inches tall by 52 inches wide by 16 feet long is loaded into a microwave heater having an internal diameter of 11 feet, 7 inches and a flange-to-flange length of 17 feet. The pressurizable heater includes an oppositely-disposed entrance and exit opening, each sealable with a full diameter dished door. The total internal volume of the heater is 2605 cubic feet, and the ratio of the total volume of the bundle of wood to the total open (e.g., unoccupied) volume in the microwave heater is 0.29:1. Prior to heating in the microwave heater, the bundle has a "chemical moisture content" (i.e., an amount of one or more heat-vaporizable chemicals including, for example, acetic acid, acetic anhydride, and combinations thereof) of approximately 10-15 weight percent.

During heating of the bundle, microwave energy is introduced into the microwave heater in a similar manner as previously described in Example 1. In addition, a vacuum system is used to maintain the internal pressure of the heater at 60 torr. After 80 minutes, the microwave generator is turned off, the bundle is removed, and thermal images of interior surfaces of the bundle are taken in the manner previously described in Example 1. The predicted temperature distribution resulting from the cumulative thermal data is provided in FIG. 14.

Figure 14:
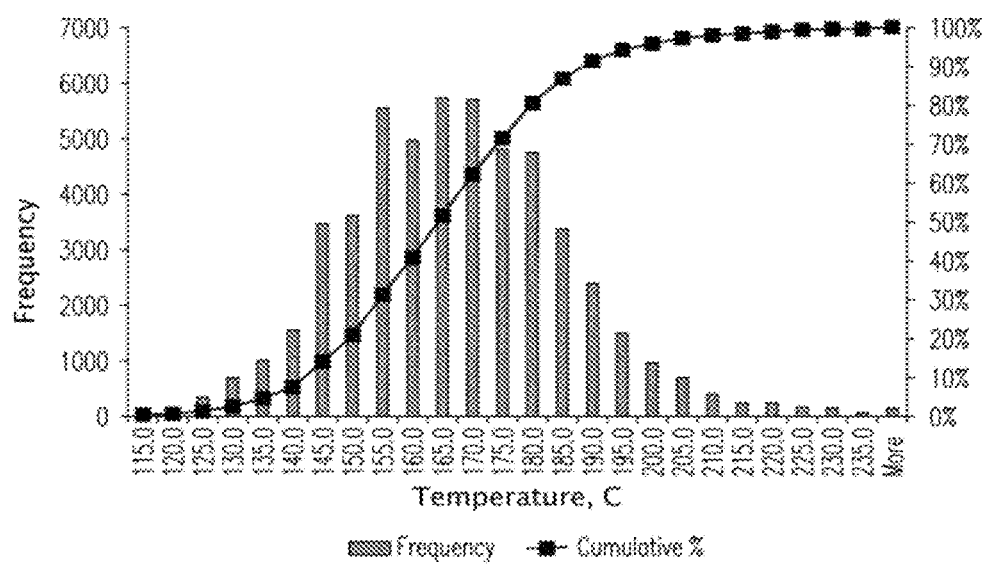
FIG. 14 is a cumulative frequency histogram illustrating a predicted temperature distribution resulting from extrapolated thermal data for a bundle of acetylated wood as described in Example 2.

As shown in FIG. 14, the projected temperature distribution for the acetylated bundle of wood has a mean peak temperature of 165° C., and less than 0.3 percent of the total volume of the bundle has a temperature below 115° C. or above 235° C. According to previously-obtained empirical data correlating wood temperature to chemical moisture content, the temperature distribution in FIG. 14 predicts a chemical moisture content profile as summarized in Table 3, for a dried bundle of acetylated wood processed as described above.

TABLE 3

Projected Chemical Moisture Content Profile for Dried Acetylated Wood

| Temperature | Percent of Bundle Volume | Predicted Moisture Content |
|---|---|---|
| T < 115° C. | 0.3% | ~2 wt % moisture |
| 115° C. < T < 135° C. | 2.2% | ~1 wt % moisture |
| T > 235° C. | 0.3% | Scorched |
| 115° C. < T < 235° C. | 99.4% | Dried |
| 135° C. < T < 235° C. | 97.2% | Dried |

The overall objective of heating and/or drying the acetylated wood is to remove residual acetylation chemicals (e.g., by minimizing the chemical moisture content of the dried bundle), while not over-drying or scorching the treated wood. As shown in Table 3, less than 0.3 percent of the total volume of the acetylated bundle is under-dried (e.g., has a moisture content of 2 weight percent or more) or subjected to scorching (e.g., has an average temperature greater than 235° C.). In addition, less than 2.2 percent of the total volume of the bundle has a moisture content of 1 percent or more. Thus, at least 97.2 (and up to 99.4) percent of the total volume of the acetylated bundle is heated and dried to a chemical moisture content of less than 1-2 weight percent, while simultaneously minimizing the amount of scorched wood.

Example 3

Effect of Movable Reflectors in a Microwave Heater Utilizing Split Launchers

This example illustrates the impact of utilizing movable reflectors in a microwave heater employing a plurality of split launchers on the surface temperature distribution of the heated bundle of wood. A microwave heater similar to the heater described in Example 1, including two pairs of oppositely-disposed split launchers and four movable reflectors positioned near the outlets of each launcher, was modeled using HFSS™ software (available from Ansys in Canonsburg, Pa.). Two simulations were conducted. During the first simulation (Simulation A), the reflectors were modeled as being stationary at a reflector position of –4° (i.e., nearest the wall). During Simulation B, the each reflector was modeled as following the reflector motion profile as previously described in Table 2 of Example 1. The resulting predicted temperature distributions for each simulation are provided below in FIGS. 15a and 15b. The representative distributions shown in FIGS. 15a and 15b correspond to an interior vertical (xy) plane parallel to the elongated side of the bundle and positioned in the middle of each of the simulated bundles.

Figure 15A:
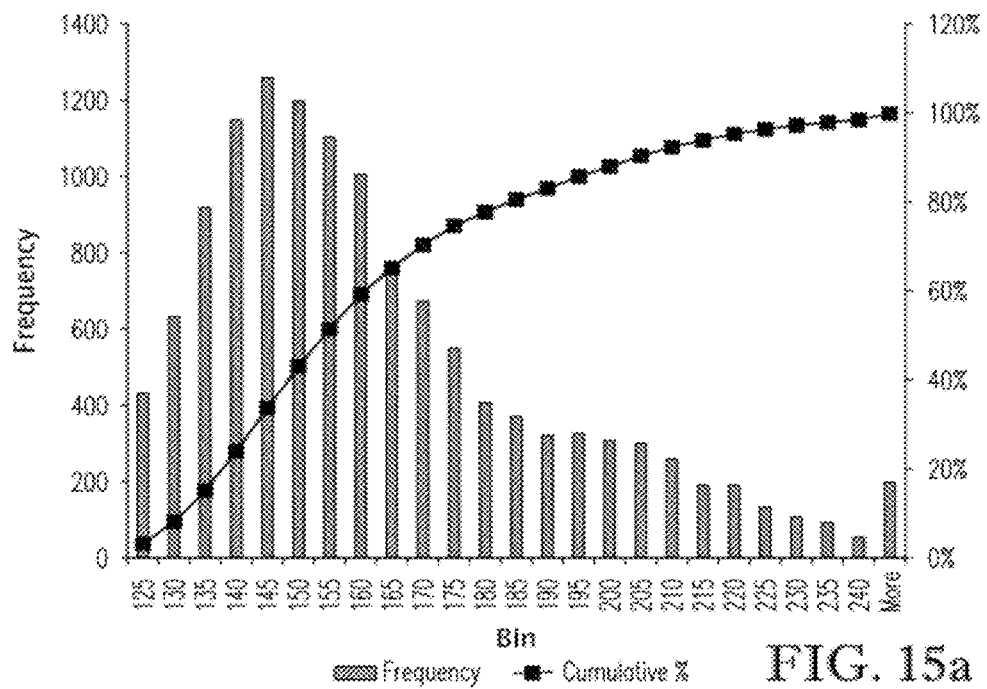
FIG. 15a is a cumulative frequency histogram illustrating the temperature distribution of a bundle of wood heated without the use of movable reflectors.
Figure 15B:
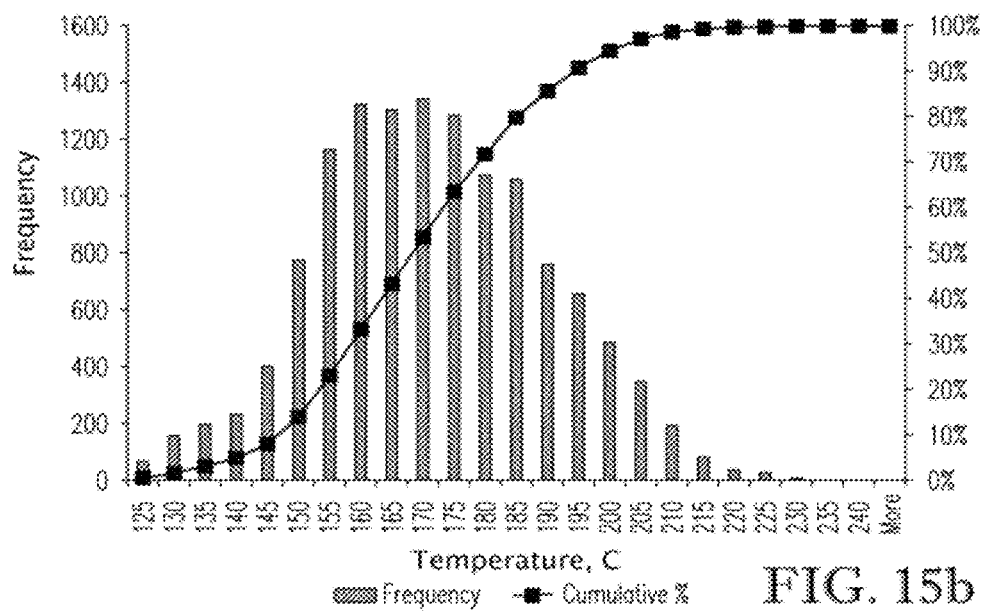
FIG. 15b is a cumulative frequency histogram illustrating the temperature distribution of a bundle of wood heated using movable reflectors.

As shown in FIGS. 15a and 15b, the wood heated in Simulation B (with movable reflectors) demonstrated a temperature distribution with a higher average temperature (mean temperature of 169° C.) than the wood heated in Simulation A (stationary reflectors; mean temperature of 161° C.). The lower mean temperature achieved during Simulation A indicates that less energy was predicted to reach the interior plane of the bundle when the reflectors were held stationary than when the reflectors were permitted to move, as modeled in Simulation B. In addition, the wood heated in Simulation B showed a narrower temperature distribution than the wood heated in Simulation A. For example, as shown in FIG. 15b, the temperature distribution resulting from Simulation B predicted a temperature of less than 140° C. for less than 10 percent of the bundle and a temperature above 200° C. for less than about 8 percent of the bundle. Simulation A, as shown in FIG. 15a, however, predicted a temperature less than 140° C. for over 20 percent of the bundle and a temperature above 200° C. for about 10 percent of the bundle. Thus, it can be concluded that utilizing movable reflectors in a microwave heater employing oppositely-disposed split launchers can result in more even, thorough heating of a bundle of wood.

Example 4

Effect of Reduced Energy Heating Cycles on Bundle Temperature Distributions

This example provides simulated results illustrating the impact of heating a bundle of wood using two or more individual heating cycles, each carried out at a lower level of microwave energy and/or a lower pressure.

The temperature profiles for a theoretical bundle of wood having nominal dimensions of 52 inches by 101 inches by 129 inches exposed to several different simulated heating profiles were predicted using composite modeling data. Five simulations (e.g., Simulations A-E) were conducted using HFSS™ software (available from Ansys in Canonsburg, Pa.) for predicting electromagnetic field distributions under each heating profile and MATLAB software (available from Mathworks in Natik, Mass.) for predicting the temperature distribution within a central, vertical plane (e.g., the "central slice") of the bundle, on a one-inch grid. Details of each of the simulated heating profiles for each of Simulations A-E are summarized in Table 4, below.

TABLE 4

Heating Profiles Modeled in Simulations A-E

| | First Heating Cycle | | | Second Heating Cycle | | | Third Heating Cycle | | |
|---|---|---|---|---|---|---|---|---|---|
| Simulation | Energy (kW) | Time (min) | Rest (min) | Energy (kW) | Time (min) | Rest (min) | Energy (kW) | Time (min) | Rest (min) |
| A | 75 | 35 | 10 sec | 75 | 35 | end | — | — | — |
| B | 75 | 35 | 30 | 75 | 35 | end | — | — | — |
| C | 75 | 40 | 30 | 56.25 | 40 | end | — | — | — |
| D | 75 | 23 | 30 | 75 | 23 | 30 | 75 | 23 | end |
| E | 75 | 40 | 30 | 37.5 | 40 | 30 | 18.75 | 40 | end |

The simulated temperature data was exported from MATLAB into a spreadsheet and a statistical analysis was performed to determine (1) the peak maximum temperature during the heating cycle and (2) the percent of the total volume of the central "slice" that would be scorched (i.e., would achieve a temperature above 240° C.). The results for Simulations A-E are tabulated below in Table 5.

TABLE 5

Peak Temperature and Bundle Volume Scorched for Simulations A-E

| Simulation | Peak Temperature (° C.) | Volume Scorched (%) |
|---|---|---|
| A | 289 | 1.30 |
| B | 279 | 0.92 |
| C | 269 | 0.64 |
| D | 270 | 0.59 |
| E | 239 | 0.00 |

Although the total amount of power added during each overall heating cycle was the same (e.g., 87.5 kW-hr), the timing, the duration, and the level of energy applied to the load affected the maximum peak temperature and level of scorching for each simulation. For example, as evidenced by the peak temperatures and scorched volumes of Simulations A and E, allowing the wood to "rest" between two applications of energy (e.g., individual sequential heating cycles) resulted in a lower overall peak temperatures and less scorching than when no rest period was used. When the maximum level of microwave energy utilized in a subsequent cycle is less than the previous cycle, the peak temperature and amount of scorching expected is also lower, as evidenced by the comparison of Simulations B and C. Further, when three (or more) subsequent cycles are utilized, each at a lower level of energy than the previous, an even lower peak temperature and/or amount of scorching is obtainable, as shown in Simulation D.

Example 5

Effect of Movable Reflectors on the Temperature Distribution of a Heated Bundle of Wood This example illustrates the effect of utilizing movable reflectors on the final temperature distribution of a bundle of acetylated wood heated and/or dried in a microwave heater. As illustrated herein, the movable reflectors helped disperse the microwave energy in a more even manner within the interior of the heater and, as a result, the surface temperature distribution of a bundle of wood heated in the presence of one or more movable reflectors is narrower and has a higher peak temperature.

A microwave heating system similar to the system illustrated in FIGS. 9a, 9b, and 9e, was constructed and included a FERRITE 75 kW, 915 MHz microwave generator (commercially available from Ferrite Microwave Technologies, Inc., in Nashua, N.H.) coupled to a vacuum microwave heater via a series of $TE_{10}$ waveguides. Three rotary microwave switches were configured selectively route microwave energy from the generator to one of four microwave launchers located in the interior of the microwave heater. Each launcher was designed to receive energy in a $TE_{10}$ mode, but included a mode converter disposed within the interior of the vessel for converting the energy to a $TM_{01}$ mode before it enters into the heater. The vacuum heater, which has a diameter of 6.5 feet and an overall length of 8 feet, included a single door on one end for loading and unloading the wood. The system also included a vacuum pump for maintaining a pressure of 350 torr or below during the heating step.

Two experimental runs, Run L and Run M, were conducted to determine the impact of dispersing the microwave energy within the heater using a set of movable reflectors. A stickered, water-damp bundle of acetylated Radiata pine having nominal dimensions of 36 inches wide by 38 inches tall by 8 feet long, was assembled. The bundle included a centrallylocated, six-board row of planks that were each equipped with fiber optic temperature sensors placed into a hole drilled near the center of the board. The sensors were used to monitor and record the peak average temperature during the heating step. During Run L, no movable reflectors were used and, during Run M, four movable reflectors, each positioned near the discharge opening of one of the four microwave launchers (as generally shown in FIG. 9e), was used to disperse energy within the vessel. Each reflector was driven by an external actuator, similar to the one shown in FIG. 9i, in a generally oscillating pattern. During each run, MIKRON thermal imaging cameras installed at three view ports along the side of the heater were used to obtain thermal data along one side of the bundle. The data from each run was imported into a spreadsheet and statistically organized into the surface temperature frequency distributions presented in FIG. 16a (Run L) and FIG. 16b (Run M).

Figure 16A:
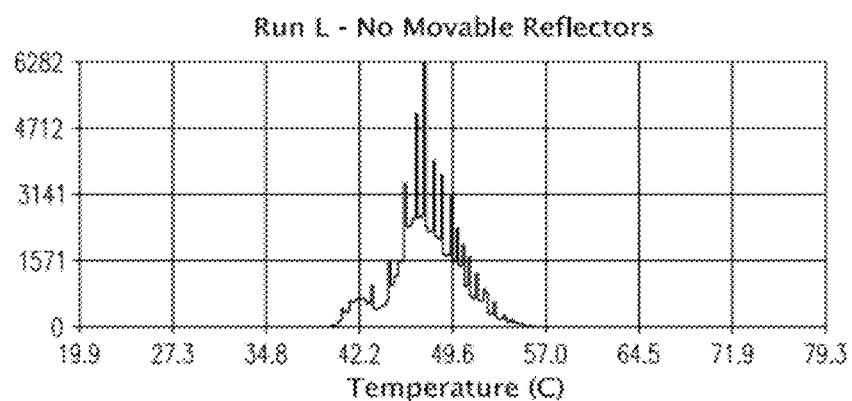
FIG. 16a is a cumulative frequency histogram illustrating the temperature distribution for a bundle of wood heated in the absence of movable reflectors.
Figure 16B:
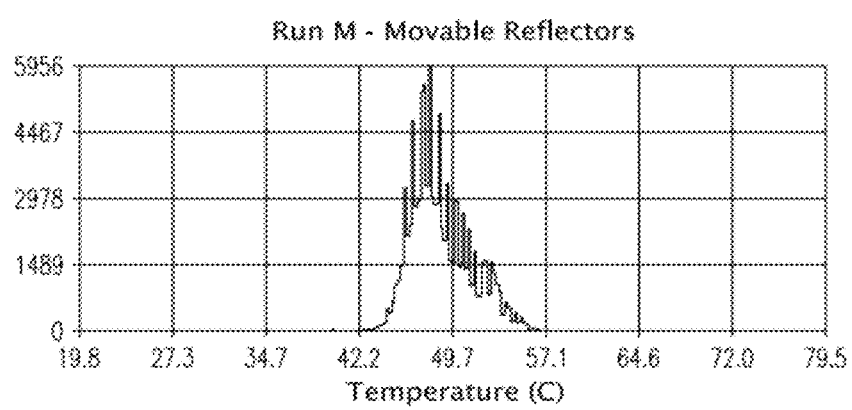
FIG. 16b is a cumulative frequency histogram illustrating the temperature distribution for a bundle of wood heated in the presence of movable reflectors.

FIGS. 16a and 16b show that the temperature distribution obtained during Run M, conducted with movable reflectors, is approximately 3-4° C. narrower than the temperature distribution obtained during Run L, conducted without movable reflectors. Further, the peak temperature of the Run M distribution is slightly higher, indicating that the use of movable reflectors results in more uniform bundle heating and higher surface temperatures.

Example 6

Figure 17A:
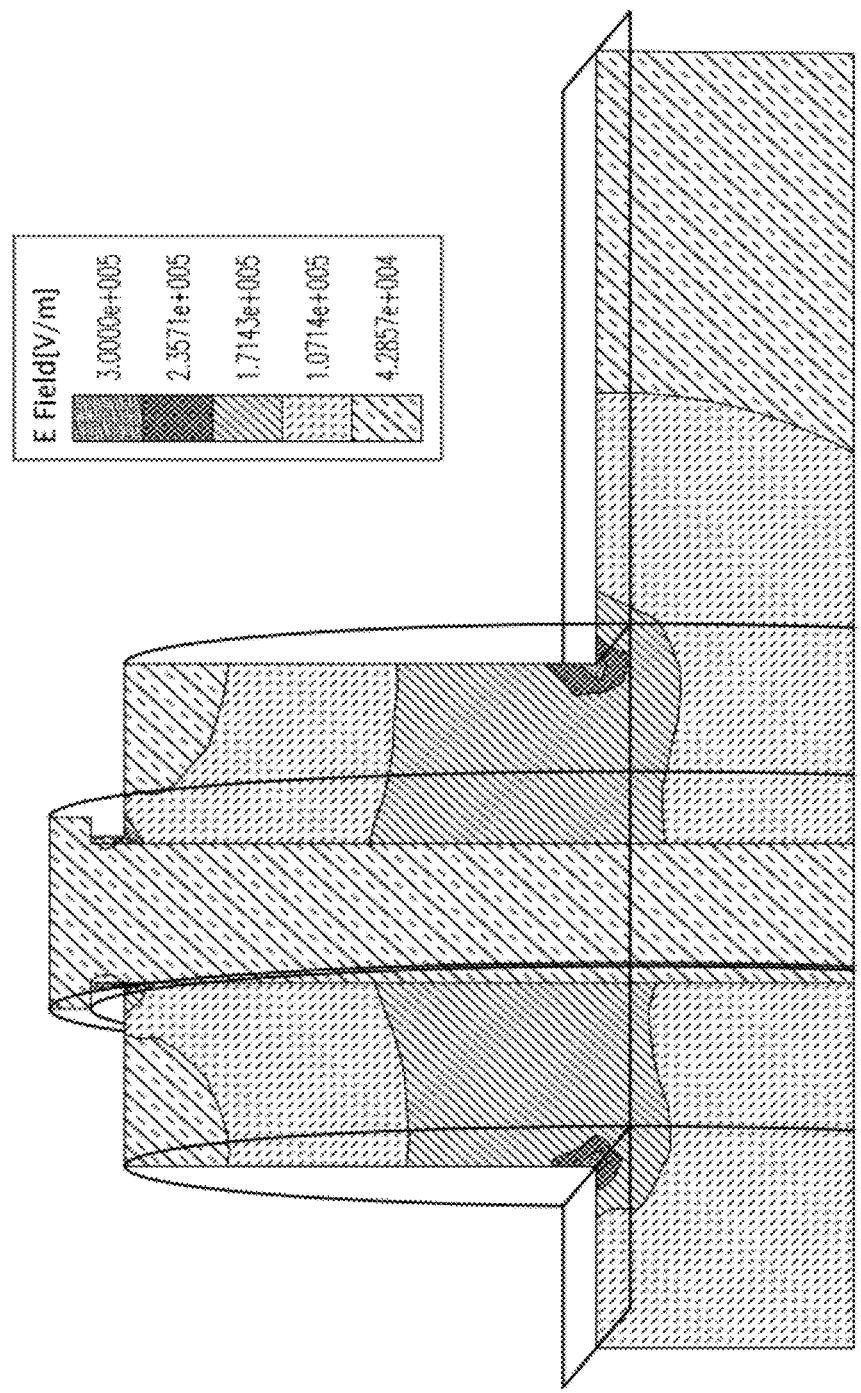
FIG. 17a presents results of a computer simulation predicting the peak electric field strengths for a $TE_{10}$ barrier assembly.
Figure 17B:
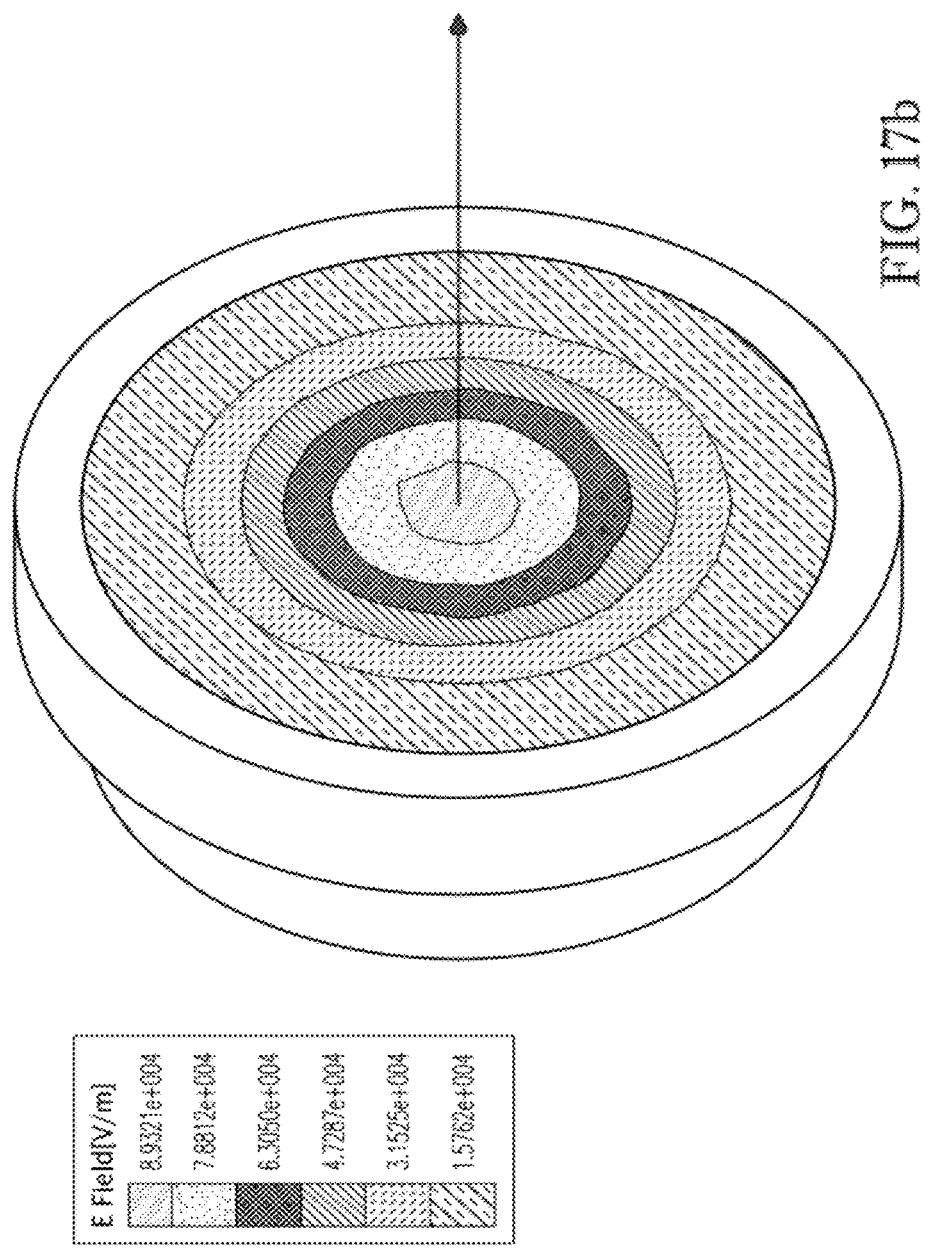
FIG. 17b presents results of a computer simulation predicting the peak electric field strengths for a $TM_{01}$ barrier assembly.

Comparison of Electric Field Strengths for a $TE_{10}$ and a $TM_{01}$ Barrier Assembly This example provides results of a simulation conducted to determine the differences between the electric field strengths and energy densities of a $TE_{10}$ barrier assembly and a $TM_{01}$ barrier assembly. Each assembly was modeled using HFSS™ software (available from Ansys in Canonsburg, Pa.). FIGS. 17a and 17b present schematic depictions of the results of the simulation, particularly illustrating the strength of the electric fields within the comparative $TE_{10}$ assembly in FIG. 17a the inventive $TM_{01}$ assembly in FIG. 17b.

As shown in FIGS. 17a and 17b, the peak electric field strength at 75 kW for the inventive $TM_{01}$ barrier assembly (0.9 kV/cm) is approximately one-third of the peak electric field strength of the comparative $TE_{10}$ barrier assembly (3 kV/cm) measured at 75 kW. Consequently, the peak energy density of the $TM_{01}$ barrier assembly is about one-ninth of the peak energy density of the $TE_{10}$ barrier assembly.

Example 7

Determination of Breakdown Pressure and Maximum Energy Levels Obtainable in $TE_{10}$ and a $TM_{01}$ Barrier Assemblies This example compares the breakdown pressure, at different levels of microwave energy, achievable by both a $TE_{10}$ and a $TM_{01}$ barrier assembly. As shown herein, the $TM_{01}$ barrier assembly is able to operate at lower levels of vacuum at a given energy level and/or permit higher levels of microwave energy to pass through at a given vacuum level than the $TE_{10}$ barrier assembly.

Figure 18:
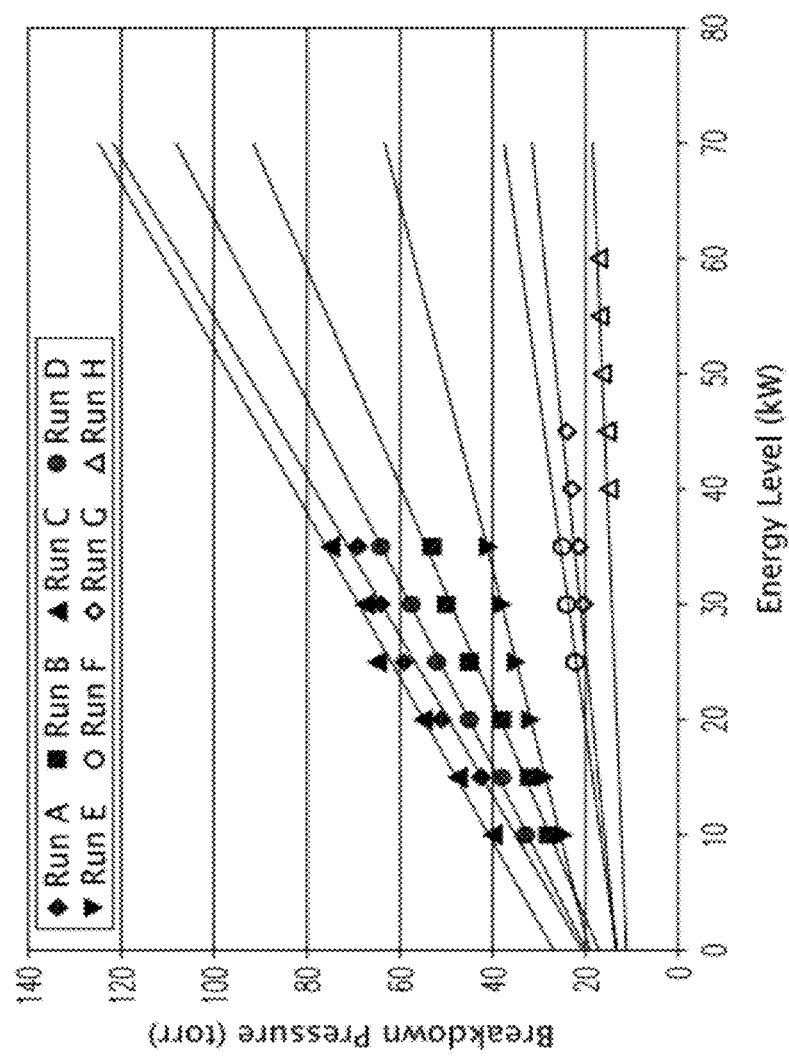
FIG. 18 is a graphical comparison of breakdown pressure as a function of energy level within both a $TE_{10}$ and a $TM_{01}$ microwave barrier assembly.

A custom-built apparatus for testing the breakdown pressure (i.e., the pressure at which arcing first occurs at a given energy level) within a barrier assembly at various pressures and energy levels was constructed in a testing facility. The apparatus included a microwave generator coupled to a set of $TE_{10}$ waveguides operable to receive and hold a removable barrier assembly therebetween. The apparatus included a gas system for introducing different gases at various temperatures into the barrier assembly prior to testing and a vacuum system for controlling the pressure within the assembly during testing. The apparatus also included an automatic arc detection and shut-off system for stopping the microwave generator when arcing was sensed within the assembly. Various test runs (Runs A-H) were conducted to measure the breakdown pressure of both a $TE_{10}$ and a $TM_{01}$ barrier assembly at various energy levels. Table 6, below, summarizes the conditions of each of Runs A-H, while FIG. 18 provides a graphical representation of the breakdown pressures measured, as a function of energy level, for each of Runs A-H.

TABLE 6

Summary of Test Runs to Determine Breakdown Pressures

| Run | Barrier Assembly (Mode) | Gas Type | Gas Temperature, ° C. |
|---|---|---|---|
| A | $TE_{10}$ | Air | 99 |
| B | $TE_{10}$ | Air | 22 |
| C | $TE_{10}$ | Nitrogen | 100 |
| D | $TE_{10}$ | Nitrogen | 22 |
| E | $TE_{10}$ | Acetic Acid | 95 |
| F | $TM_{01}$ | Nitrogen | 90 |
| G | $TM_{01}$ | Nitrogen | 25 |
| H | $TM_{01}$ | Acetic Acid | 90 |

As shown in FIG. 18, for a given energy level, the $TM_{01}$ barrier assembly was operated at a lower pressure (i.e., a higher level of vacuum) than the $TE_{10}$ barrier assembly before arcing occurred. For example, as illustrated by comparing Runs E and H (which both included exposing the barrier assembly to acetic acid at 90 to 95° C.), for a energy level of 20 kW, the minimum operating pressure achievable by the $TE_{10}$ barrier assembly without arcing was 30 torr, while the $TM_{01}$ barrier assembly was able to be operated at or even slightly below 15 torr before arcing occurred. Thus, as illustrated herein, for the same conditions and energy level, the $TM_{01}$ barrier assembly can be exposed to lower pressures without arcing than the $TE_{10}$ barrier assembly.

Alternatively, as also shown in FIG. 18, the $TM_{01}$ barrier assembly was able to operate at a higher energy level than the $TE_{10}$ barrier assembly, at the same pressure and under similar conditions. For example, as evidenced by comparing Runs A and F (which both utilize nitrogen at a temperature of 90 to 99° C.), at a pressure of 40 torr, the $TM_{01}$ barrier assembly could have operated at predicted energy level of about 70 kW without arcing, while the $TE_{10}$ assembly could not be exposed to more than 15 kW of energy before arcing occurred. Further, as indicated by the steeper slope of the breakdown pressure versus energy level curve generated by the $TE_{10}$ assembly, as shown in FIG. 18, it can also be concluded that the vacuum loss (or penalty) for additional increases in energy are greater for the $TE_{10}$ barrier assembly than for the $TM_{01}$ assembly. Thus, the marginal pressure penalty for increasing energy through a $TM_{01}$ barrier assembly is substantially less than for a similarly operated $TE_{10}$ barrier assembly.

Example 8

Microwave Choke

This example illustrates a microwave choke capable of substantially minimizing and/or preventing the leakage of energy from the interior of a microwave heater. A comparative microwave heater that did not include a microwave choke and an inventive microwave heater employing a choke similar to the choke illustrated in FIGS. 7a-h were each modeled using HFSS™ software (available from Ansys in Canonsburg, Pa.). The electric field strengths at and near the junction of the door and the vessel body were simulated and the average strengths of the resulting electric fields were calculated both within the interior of each vessel (the "interior area") and for a region just outside the vessel proximate to the door flange of each vessel (the "flange area"). Table 7, below, summarizes the average field strengths for each of these areas for both the comparative and inventive microwave heaters.

TABLE 7

Comparison of Average Electric Field Strength for Microwave Vessels With and Without a Microwave Choke

| Area Simulated | Vessel Choke? | Average Electric Field Strength (kV/cm) |
| --- | --- | --- |
| Interior | No | 0.25 to 0.39 |
| Flange | No | 0.25 to 0.39 |
| Interior | Yes | 0.25 to 0.39 |
| Flange | Yes | <0.03 |

Figure 19A:
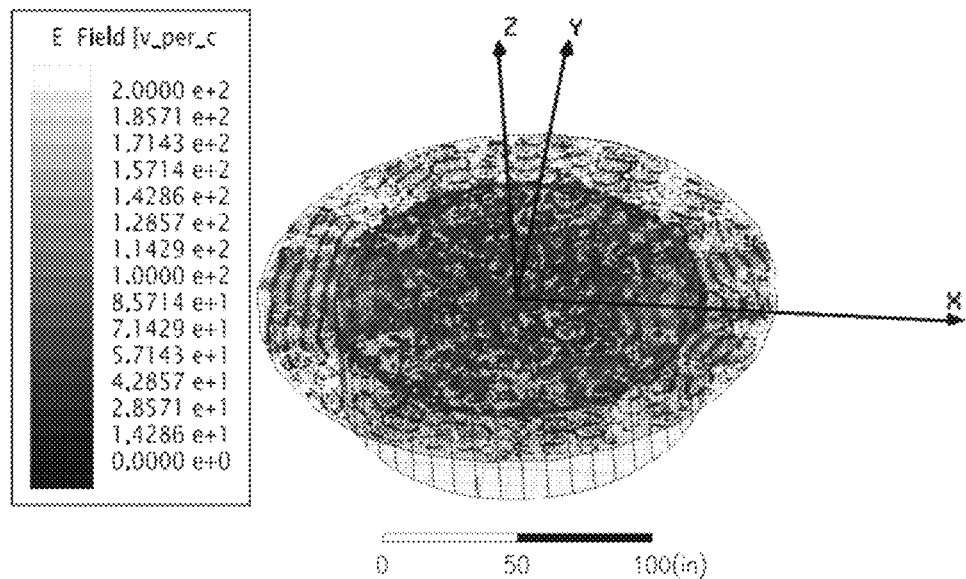
FIG. 19a presents results of a computer simulation predicting electric field strengths proximate a door and body flange of a microwave vessel that does not comprise a microwave choke.
Figure 19B:
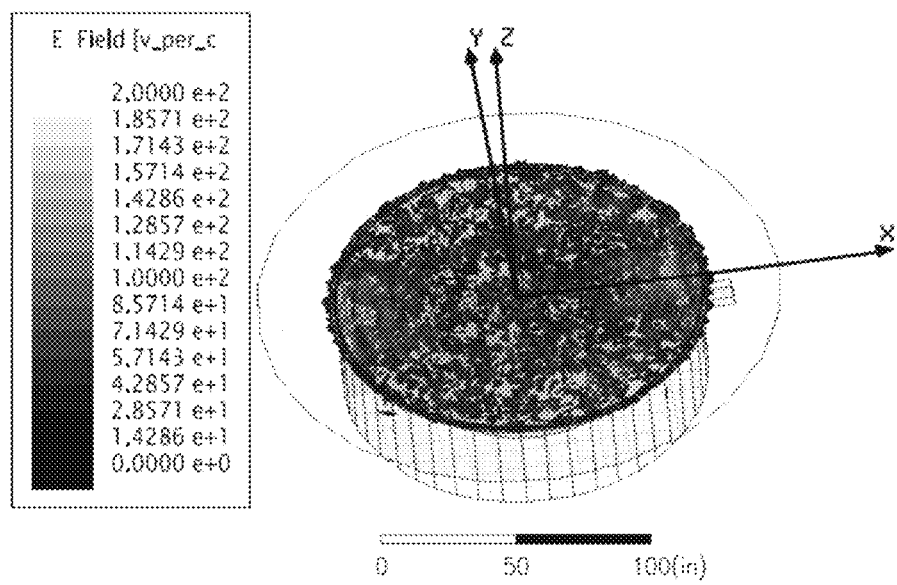
FIG. 19b presents results of a computer simulation predicting electric field strengths proximate a door and body flange of a microwave vessel that does include a microwave choke, particularly illustrating the ability of the choke to prevent or substantially minimize microwave leakage from the vessel.

As illustrated in Table 7, the average electric field strengths both inside and outside the comparative heater, which did not employ a microwave choke, were approximately the same, indicating significant leakage of microwave energy from within the vessel. In contrast, the average strength of the electric field outside the inventive microwave heater, which did employ a microwave choke as described herein, was an order of magnitude lower than the average strength of the electric field within the inventive heater, indicating the microwave energy did not leak out, but remained inside the vessel. This is further illustrated by the visual results of the simulation, presented in FIGS. 19a and 19b.

Thus, it was concluded that the use of a microwave choke as described herein can sufficiently reduce, minimize, or nearly eliminate the leakage of microwave energy from a microwave vessel.

Example 9

Acetylation of Wood in a Two-Vessel System

This example describes a pilot-scale experiment in which wood is acetylated and heated in a dual vessel system. As shown herein, utilizing separate vessels for the acetylation step and the heating step allows for the production of dried, acetylated wood within a short period of time.

A pilot-scale acetylation reactor having a diameter of 10 inches and a length of 9 feet was constructed. Several Southern Yellow Pine boards, kiln dried to a moisture content between 6 and 8 weight percent, were loaded into the acetylation reactor and the reactor door was closed and sealed. A vacuum system was used to reduce the pressure in the acetylation reactor to between 40 and 70 torr and the vacuum was maintained for 20 to 45 minutes to remove residual air and/or water from the wood. After the hold period, the interior volume of the reactor was filled with acetic anhydride at room temperature and the pressure in the reactor was increased to between 80 and 90 psig to thereby maximize impregnation of the wood with the acetic anhydride.

After about 40 minutes, the liquid was drained from the reactor and the pressure was increased to 1,500 torr with warm nitrogen. At the same time, the temperature was increased to about 140° C. using the reactor steam jacket and, once all the liquid was drained from the reactor, hot acetic acid vapors were injected into the vessel to contact the wood, thereby catalyzing the reaction. After about 60 minutes, the hot vapor injection was stopped and acetylation was allowed to occur at the increased reactor pressure for a period between 1.5 and 3 hours. Thereafter, the pressure in the reactor was reduced to flash vaporize residual acetic acid and/or anhydride thereby at least partially drying the acetylated wood. The pressure in the reactor was then reduced further to about 60 to 80 torr thereby drying the boards to a chemical moisture content between 10 and 20 weight percent. Nitrogen was injected to reduce the temperature in the reactor.

Once cooled, the acetylated boards were removed, wrapped in plastic to minimize vapor emissions to the external environment, and transported to a hood, where the boards were cut into 16 to 18 inch lengths prior to being introduced into a microwave heater. The microwave heater, which had a diameter of 19 inches and a length of 43 inches, was a model μWAVEVAC0350 vacuum microwave dryer (commercially available from Pueschner Microwave Power Systems in Schwanewede, Germany) that utilized a 3.5 kW, 2450 MHz microwave generator. The exterior walls of the heater were electrically warmed to prevent condensation of acetic acid and/or acetic anhydride during the heating/drying cycle.

Prior to loading the microwave heater, a hole was drilled near the center of each of the acetylated boards and a NEOPTIX fiber optic temperature sensor was inserted into the hole to monitor the temperature during heating. The boards were then placed on a turntable located in the center of the microwave heater, which also included a system for monitoring gravimetric data during heating. The door on the heater was closed and sealed and the chamber was purged with nitrogen. A mode stirrer positioned on the upper wall of the chamber was turned on and a vacuum pump was used to reduce the pressure within the interior of the heater to between 20 and 60 torr. The microwave generator was then turned on and set to emit 400 W of energy into the heater. Within minutes, the temperature of the boards increased to between 170° C. and 190° C.

During the duration of the heating process, gravimetric and temperature data were monitored and a programmable logic controller (PLC) was used to cycle the generator on and off until the target board temperature was reached. The boards were maintained at the target temperature for between 30 and 90 minutes and, after the heating cycle was completed, the PLC stopped the vacuum pump, and returned the chamber to atmospheric pressure. The door of the microwave heater was then opened and the dried boards were removed. The average final chemical moisture content of the dried, acetylated boards was less than 5 weight percent.

The preferred forms of the invention described above are to be used as illustration only, and should not be used in a limiting sense to interpret the scope of the present invention. Obvious modifications to the exemplary one embodiment, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

We claim:

1. A system for producing chemically-modified, dried, and/or thermally-modified wood, said system comprising:
at least one microwave generator for generating microwave energy;
a microwave heater for receiving a bundle of wood; and a microwave distribution system for directing at least a portion of said microwave energy from said at least one microwave generator to said microwave heater, wherein said microwave distribution system comprises at least a first split launcher at least partly disposed within the interior of said microwave heater, wherein said first split launcher comprises a $TM_{ab}$ waveguide segment, at least two $TE_{xy}$ waveguide segments, and a mode converting splitter coupled between said $TM_{ab}$ waveguide segment and said at least two $TE_{xy}$ waveguide segments, wherein said mode converting splitter is configured to convert $TM_{ab}$ mode microwave energy received from said $TM_{ab}$ waveguide segment into at least two separate fractions of $TE_{xy}$ mode microwave energy that are each directed to one of said at least two $TE_{xy}$ waveguide segments, wherein a and y are 0 and b and x are integers between 1 and 5.

2. The system of claim 1, wherein b and x are both 1.

3. The system of claim 1, wherein said first split launcher is entirely disposed within the interior of said microwave heater.

4. The system of claim 1, further comprising at least a second split launcher having a substantially similar configuration to said first split launcher, wherein said first and said second split launchers are at least partly disposed within the interior of said microwave heater.

5. The system of claim 4, wherein said first and said second split launchers are located on generally opposite sides of said microwave heater.

6. The system of claim 4, wherein said first and said second split launchers are located on generally the same side of said microwave heater.

7. The system of claim 6, wherein said first and said second split launchers are vertically spaced from one another.

8. The system of claim 1, wherein said first split launcher defines two or more discharge openings for emitting microwave energy into the interior of said microwave heater.

9. The system of claim 8, wherein at least one of said discharge openings is an upward-oriented discharge opening configured to emit microwave energy at an upward angle from horizontal, wherein at least one of said discharge openings is a downward-oriented discharge opening configured to emit microwave energy at a downward angle from horizontal.

10. The system of claim 8, further comprising at least two movable reflectors configured to raster microwave energy emitted from said first split launcher into said microwave heater, wherein each of said movable reflectors is associated with one of said discharge openings.

11. The system of claim 1, further comprising a vacuum system operable to reduce the pressure in said microwave heater to less than 350 torr, wherein said microwave heater has an internal volume of at least 100 cubic feet.

12. The system of claim 1, further comprising a chemical modification reactor operable to chemically modify at least a portion of said bundle of wood and a transportation system operable to transport said bundle of wood from said chemical modification reactor to said microwave heater.

13. The system of claim 12, wherein said chemical modification reactor is an acetylation reactor operable to acetylate at least a portion of said bundle of wood, wherein said transportation system is operable to transport said bundle of wood from said acetylation reactor to said microwave heater.

* * * * *